(12) United States Patent
Deak et al.

(10) Patent No.: US 8,142,832 B2
(45) Date of Patent: Mar. 27, 2012

(54) VEGETABLE PROTEIN FRACTIONIZATION PROCESS AND COMPOSITIONS

(75) Inventors: Nicolas Alejo Deak, Ames, IA (US); Lawrence A. Johnson, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 376 days.

(21) Appl. No.: 11/577,241

(22) PCT Filed: Oct. 20, 2005

(86) PCT No.: PCT/US2005/037943
§ 371 (c)(1),
(2), (4) Date: Apr. 13, 2007

(87) PCT Pub. No.: WO2006/047308
PCT Pub. Date: May 4, 2006

(65) Prior Publication Data
US 2008/0095914 A1 Apr. 24, 2008

Related U.S. Application Data

(60) Provisional application No. 60/620,922, filed on Oct. 21, 2004.

(51) Int. Cl.
*A23J 1/00* (2006.01)
*A23J 1/14* (2006.01)

(52) U.S. Cl. .......................... 426/656; 426/634; 530/378

(58) Field of Classification Search ........................ None
See application file for complete search history.

(56) References Cited

U.S. PATENT DOCUMENTS

| 4,368,151 | A | 1/1983 | Howard et al. |
| 4,370,267 | A | 1/1983 | Lehnhardt et al. |
| 5,858,449 | A | 1/1999 | Crank et al. |
| 6,171,640 | B1 * | 1/2001 | Bringe .................. 426/656 |
| 6,797,309 | B2 * | 9/2004 | Monagle .............. 426/590 |
| 2006/0057275 | A1 * | 3/2006 | Wu et al. .............. 426/656 |

OTHER PUBLICATIONS

Koshiyama, Agr. Biol. Chem. vol. 29, No. 9, p. 885-887, 1965.*
Wu et al., J. Agric. Food Chem, 2000, vol. 2702-2708.*

* cited by examiner

*Primary Examiner* — Yunsoo Kim
(74) *Attorney, Agent, or Firm* — McKee, Voorhees & Sease, P.L.C.

(57) ABSTRACT

According to the invention a novel vegetable protein fractionation procedure is disclosed which includes a straightforward process to obtain β-conglycinin-rich and glycinin-rich isolated protein fractions with unique functional and nutritional properties desired by the food industry. The process is much simplified compared to the art and avoids multiple steps in the usual fractionation of soy protein and uses very small amounts of salts avoiding the necessity of excessive washing and desalting steps. The process yields high amounts of protein fractions with high isoflavone contents and improved functional properties.

23 Claims, 22 Drawing Sheets

VEGETABLE PROTEIN FRACTIONIZATION PROCESS AND COMPOSITIONS

GRANT REFERENCE

Work for this invention was funded in part by a grant from the USDA/CSREES Contract No. 2001-135503-10814. The Government may have certain rights in this invention.

FIELD OF THE INVENTION

The present invention relates to the field of protein extraction and purification from vegetable sources, particularly soybean.

BACKGROUND OF THE INVENTION

World soybean production has grown 400% over the last 30 years. Consumer acceptance of soybean protein products has been growing and the perception of soybean products as a healthy food is strong. The number of new soy-protein-based products in the food marketplace has increased 11.2% per year for the past 3 years. The market has become more specific and the challenge is to produce new soy-protein-based food ingredients to enhance consumer acceptance and health.

Soybeans provide a good source of low-cost protein and have become an important world commodity because they are ubiquitous, have unique chemical composition, good nutritional value, versatile uses, and functional health benefits. Yet, less than about 5% of the soybean protein available is used for food, but this percentage is likely to grow. One of the main bodies of research in recent years has focused on studying individual storage proteins (glycinin and β-conglycinin) and relating them to industrially important functional properties and functional health benefits. In spite of this extensive research these individual proteins or enriched fractions thereof are not widely available at competitive costs.

Recently, there has been increased interest in obtaining purified β-conglycinin fractions, mainly to study its health beneficial properties such as cholesterol lowering and prevention of certain types of cancer. β-Conglycinin is a trimeric protein with a molecular weight of about 180 kDa. It is composed of three subunits: α' (~71 kDa), α (~67 kDa), and β (~50 kDa).

Geneticists have been trying, with mixed success, to develop soybean lines high in glycinin and others high in β-conglycinin. Soy protein isolates have >90% of protein on dry weight basis (N×6.25). Commercial yields of soy protein isolate are approximately 33% of the starting solids in defatted white flakes, corresponding to approximately 60% of the total protein recovered in the soy protein isolate (Sathe, 1989). In general, defatted soybean flour is extracted with water under alkaline conditions and then the extract is acidified to a pH between 4 and 5 to precipitate much of the protein. The precipitate collected is the isolated soy protein. This curd can be spray-dried or neutralized and spray-dried. Some soy protein isolate processes may use a combination of salts (Saio, 1975), reducing agents (Hirotsuka et al., 1988), electro-acidification (Bazinet et al., 2000), membrane filtration (Lawton et al., 1979), high-temperature short-time thermal treatments, but the details of these commercial processes are usually not fully disclosed and vary among manufacturers.

Soy proteins are not a homogeneous group. Soy proteins have been traditionally classified by their sedimentation coefficients as analyzed by ultracentrifugation into four large groups 2S (largely albumins and enzymes), 7S (largely β-conglycinin), 11S (largely glycinin), and 15S (largely dimers of glycinin) with peak molecular weights of approximately 25,000, 160,000, 350,000, and 600,000 respectively. A typical commercial process would yield approximately 22% 2S, 37% 7S, 31% 11S, and 11% 15S proteins as extracted by water, but these amounts may vary significantly depending on variety, crop year, handling and previous thermal treatment.

There have been complex laboratory procedures developed to fractionate these proteins from each other. Such techniques cannot be practically applied for commercial scale production. Some of these techniques are also difficult to reproduce because small variations in the procedures significantly alter the final composition of the fractions. There are also several patents filed for different fractionation processes, none of them are of practical use (Howard et al., 1981; Lehnhardt et al., 1983; Masahiko et al., 1994; Samoto et al., 1996; Savolainen, 1999; and Kohno et al., 2001).

Among the known methods developed for fractionating soybean proteins, one of the first attempts is a method using low temperatures (Wolf, 1956). Wolf recovered a fairly pure 11S fraction and used the name of cold-insoluble fraction (CIF) to define it. This method is further reported as cryoprecipitation and some authors name glycinin as the cryoprotein from soybeans (Wolf and Sly, 1967). These approaches are focused on the recovery of the 11S fraction and most of them do not discuss the 7S protein fraction.

Probably the most widely utilized procedure for fractionating glycinin and β-conglycinin is the one described by Than and Shibasaki in 1976. The fractionation of 7S and 11S globulins of soybean protein was achieved by extracting soybean meal with a Tris-buffer solution containing beta-mercaptoethanol at pH 7.8, centrifuging to remove the insoluble materials (primarily fiber), adjusting the pH of the supernatant to 6.6, dialysing, centrifuging to fractionate into crude 11S-rich precipitate and 7S-rich extract, adusting the pH to the isoelectric point (~4.6) to precipitate the 7S-rich fraction, washing, and freeze-drying. To complete this purification of each fraction several column chromatography steps are required, which make this procedure far too expensive for industrial application.

The Japanese Patent Laid Open Publication No. 55010224 discloses a method utilizing the difference in reactivity with calcium wherein a small amount of calcium salt is added during extraction, allowing a 7S-rich fraction to be extracted. A similar method was reported by Saio et al. (1973, 1974, and 1975), where the calcium salt is added as the extraction buffer and the flour is first extracted to obtain a 7S-rich supernatant and the precipitate is redissolved and centrifuged to obtain a 11S-rich fraction. These methods have several drawbacks that make them impractical for industrial application. Beyond the processing drawbacks, the purities reported on an ultracentrifugal basis (a less accurate method than we employ) are about 60%, which are lower than the purities obtained by our invention.

Further, other experimental methods to fractionate soy proteins have been reported by Roberts et al., 1965; Eldrige et al., 1967; Nagano et al., 1992; and Thiering et al., 2001. These methods for fractionating soy proteins are too expensive for industrial purposes, especially for the industrial production of soy protein isolates, and in some cases utilize chemicals that are not food-grade.

Recently, another method was developed by Saito et al. (2001), where the soy protein extract is treated with the enzyme phytase in order to hydrolyze phytic acid. They claim that by means of adjusting the pH, two fractions are obtained. The first fraction is rich in glycinin and the second rich in β-conglycinin. They claim that they obtain purities of about 80% for both fractions. The method requires incubation times and temperatures that make it impractical for industrial purposes and difficult to reproduce (Aldin, 2004). because of long process times and potential for microbiological growth and activity. Another drawback is that, it uses enzymes that add to the cost of the process.

Some attempts have been made to scale up some of these processes from the laboratory and to adapt them to pilot-plant production. Wu et al. (1999) successfully scaled up a method developed by Nagano et al. (1992) to obtain kg quantities of the individual soy storage proteins. But, the fraction yields are very low and the procedure is extremely costly and complicated for industrial production. Later, this procedure was improved (Rickert et al., 2003) obtaining three protein fractions, one β-conglycinin-rich, one glycinin-rich, and an intermediate mixture of the former two proteins plus a significant amount of lipoxygenase. Two waste stream products were produced, the spent flakes and the whey. This process was successfully scaled up to pilot-plant production, but its commercial application is questionable since it requires several extraction, centrifugation, and desalting steps.

It is therefore a primary objective of the present invention to provide a method of producing two separate vegetable protein isolates and/or products—one enriched for β-conglycinin and another enriched for glycinin.

It is another objective of the present invention to provide a method which avoids multistage fractionations steps and uses very small amounts of salts avoiding excessive washing and desalting steps.

It is still another objective to provide soy protein products that are highly functional in their performance as ingredients and, when possible, deliver high contents of naturally occurring healthy phytochemicals.

These and other objectives will become apparent from the following description.

SUMMARY OF THE INVENTION

The present invention provides a straightforward and commercially useful procedure to fractionate soy proteins to obtain β-conglycinin-rich and glycinin-rich isolated protein fractions with unique functional and nutritional applicability in the food industry. The present invention avoids multistage fractionation steps and uses very small amounts a f salts avoiding the necessity of excessive washing and desalting steps, it also avoids managing large volumes of liquid since the invention utilizes a single extraction step and does not need dilution steps, which are common operations in previous attempts of the art. The protein isolates and products of the invention are highly soluble and dispersible, usually higher in isoflavone content, are better emulsifiers and foaming agents than are traditional soy protein products, and have unique viscosity control properties.

The present invention is a simple method to produce fractionated vegetable proteins, which comprises extracting the proteins from the vegetable source, such as soybeans (defatted white flakes with high protein dispersibility index preferred), soybean flour that is partially de-fatted or even with full fat may also be used according to the invention. Generally, proteins are extracted with a dilute alkali at pH values between 7.0 and 11.0, at temperatures between 4° C. and 80° C.; obtaining a protein extract that is a mixture of different proteins naturally present in the soybean source; and subsequently subjecting the resulting extract to a fractional precipitation by adding small amounts of one or more multivalent cationic salt, such as calcium, magnesium or zinc, or by adding one or more multivalent anions, such as ethylene diamine tetraacetic acid (EDTA), and a food-grade reducing agent, such us sodium bisulfite, sodium sulfite, or other reducing agent; adjusting the pH of the slurry to between 7.0 and 5.0 and the temperature to between 2° C. and 35° C. in order to obtain a precipitate that is mainly comprised of glycinin, and a supernatant that is enriched in β-conglycinin. The resulting supernatant can be adjusted to a pH between 6.0 and 3.0 in order to obtain a β-conglycinin-rich precipitate and a supernatant that will be rich in lipoxygenase and trypsin inhibitors. The protein precipitates can be dried by any conventional method with or without previous neutralization with dilute alkali. These precipitates are single-protein-enriched isolates and/or products with unique compositions and superior functional properties that enhance the performance of the protein in food or industrial systems. The products obtained by this invention are usually enriched in naturally occurring isoflavones and have significant process cost advantages over alternative soy protein fractionation processes.

The combination of a multivalent salt and a reducing agent in combination with pH adjustment, with or without temperature reduction, in order to precipitate two protein fractions is a unique approach. The combination of these factors is new to the art. The resulting protein fractions can be used for a number of different processes and products, which are further detailed herein.

DETAILED DESCRIPTION OF THE FIGURES

Figure 4:
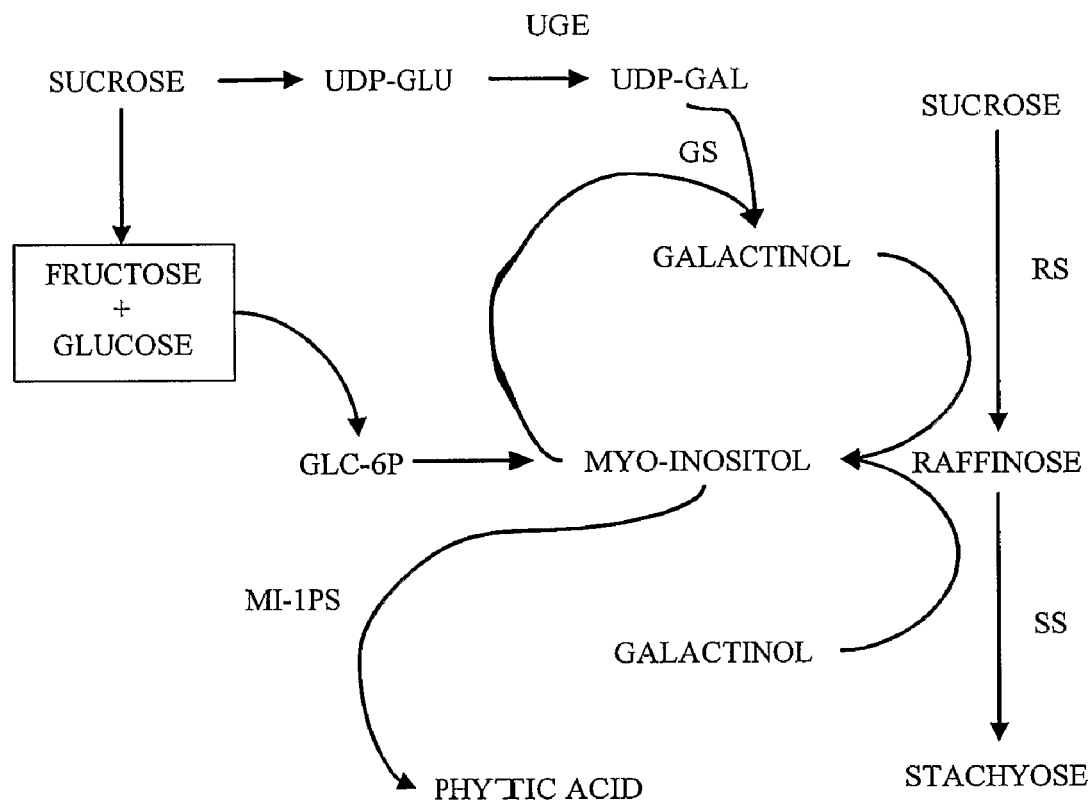

FIG. 4 is a diagram showing the biosynthetic pathway of oligosaccharide synthesis in soybeans. Adapted from Wilson (2001). UGE denotes UDP-glucose-4'-epimerase; GS, galactinol synthase; RS, raffinose synthase; SS, stachyose synthase; and MI-1PS, myo-inositol phosphate synthase.

Figure 5:
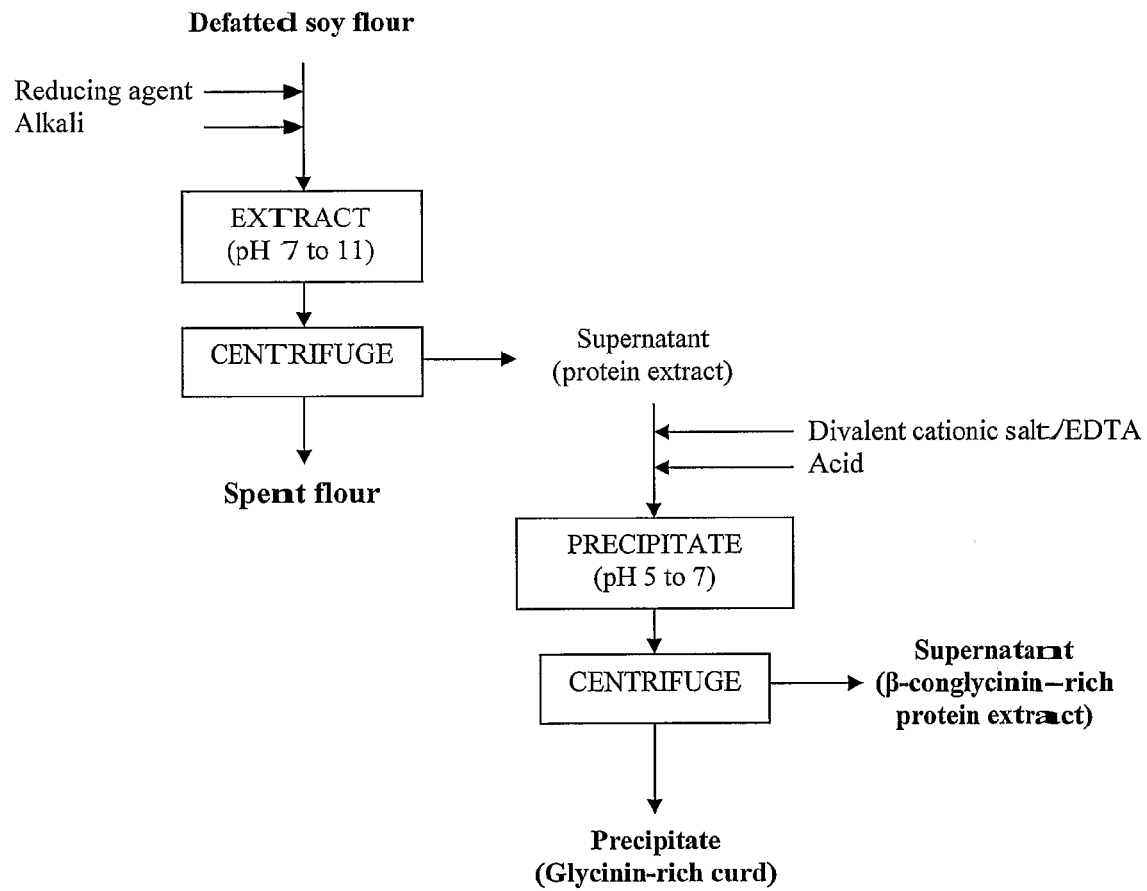

FIG. 5 is a flowchart showing the initial steps of the invention.

Figure 6A:
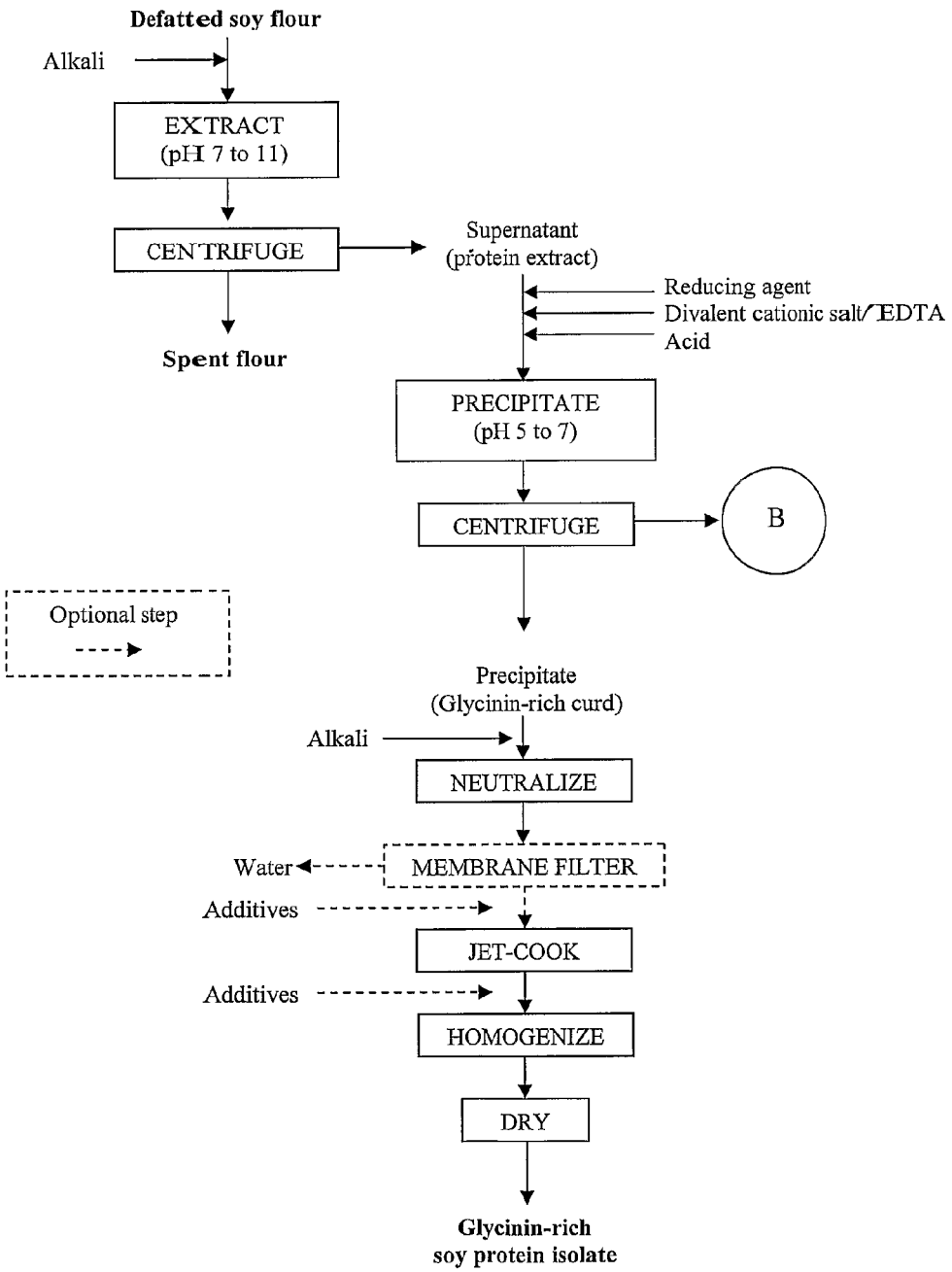
Figure 6B:
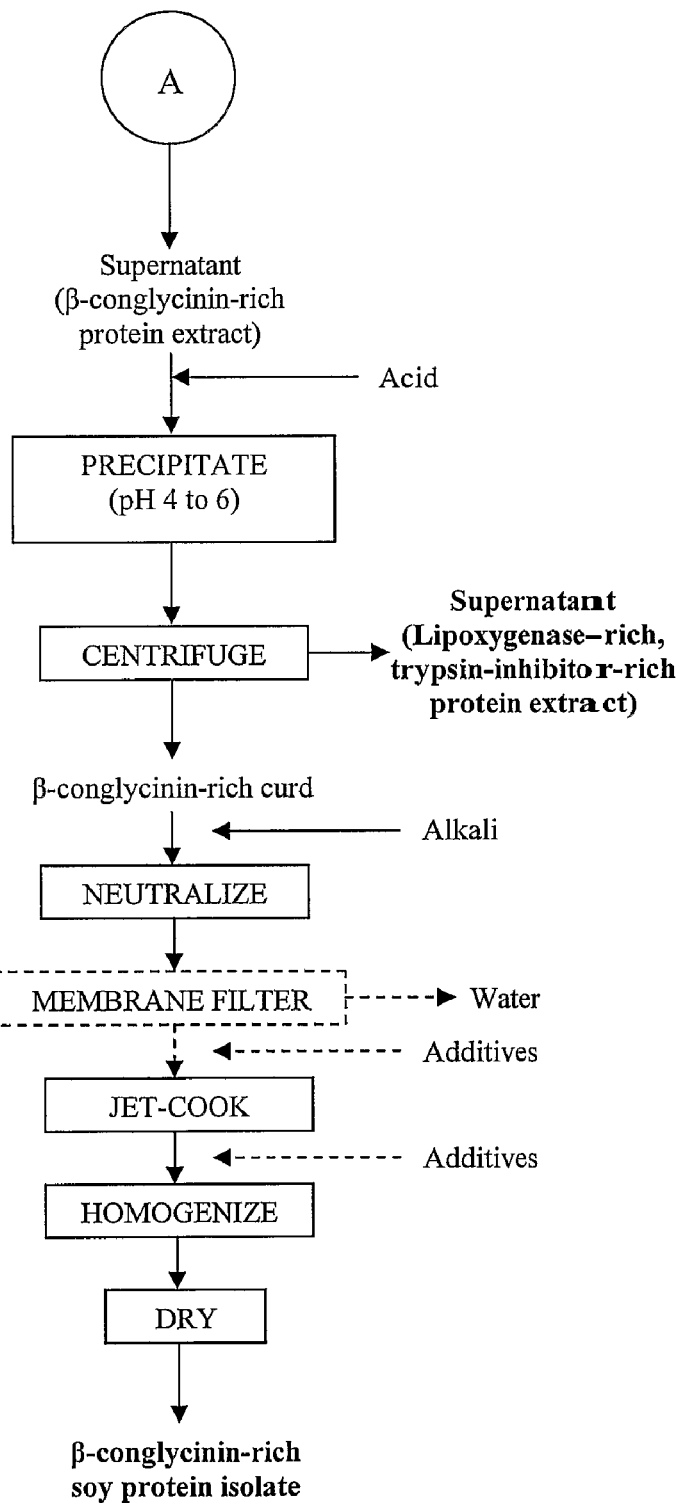

FIG. 6 is a flowchart showing the modification where the reducing agent is added during the initial protein extraction.

Figure 7A:
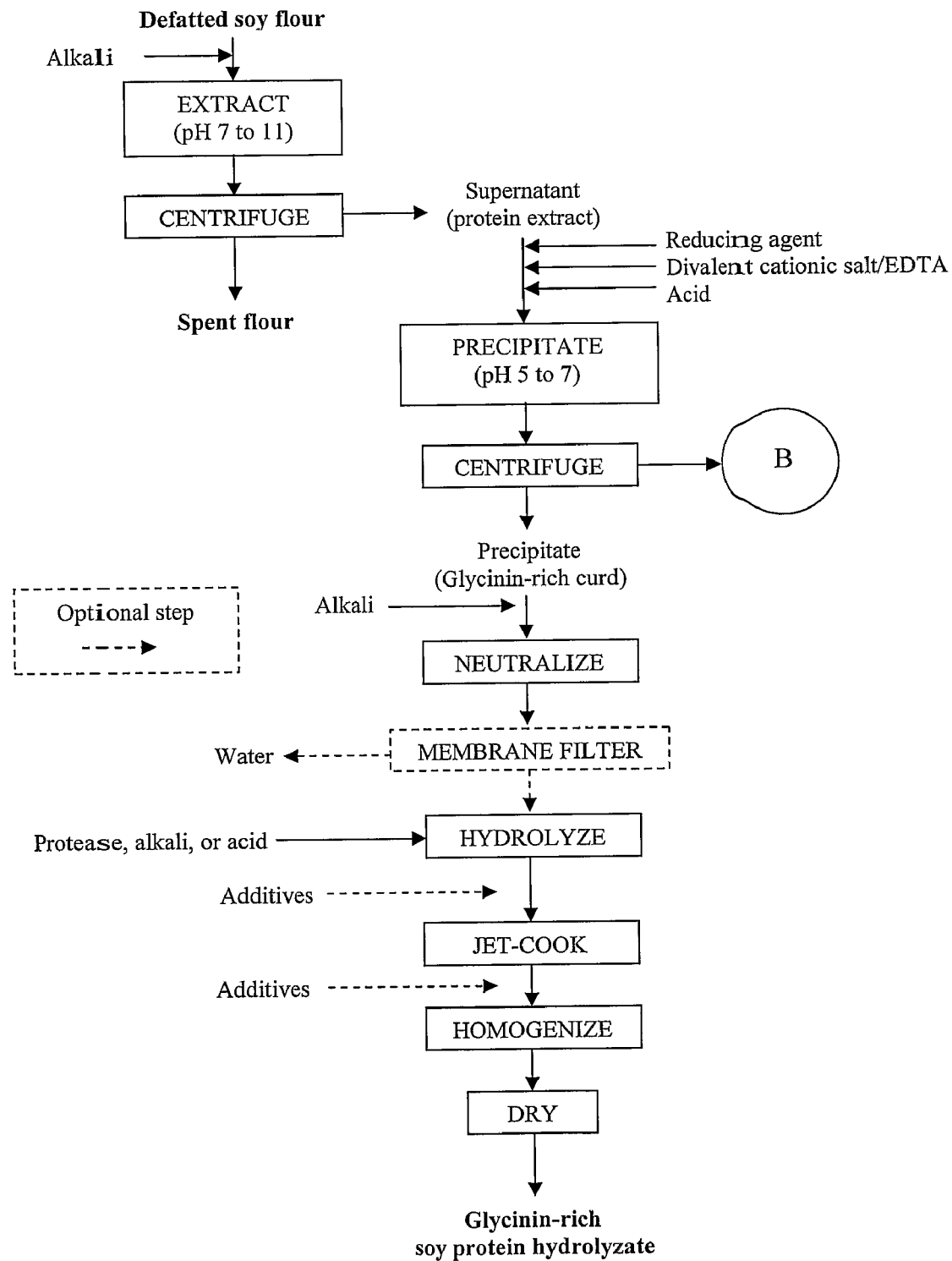
Figure 7B:
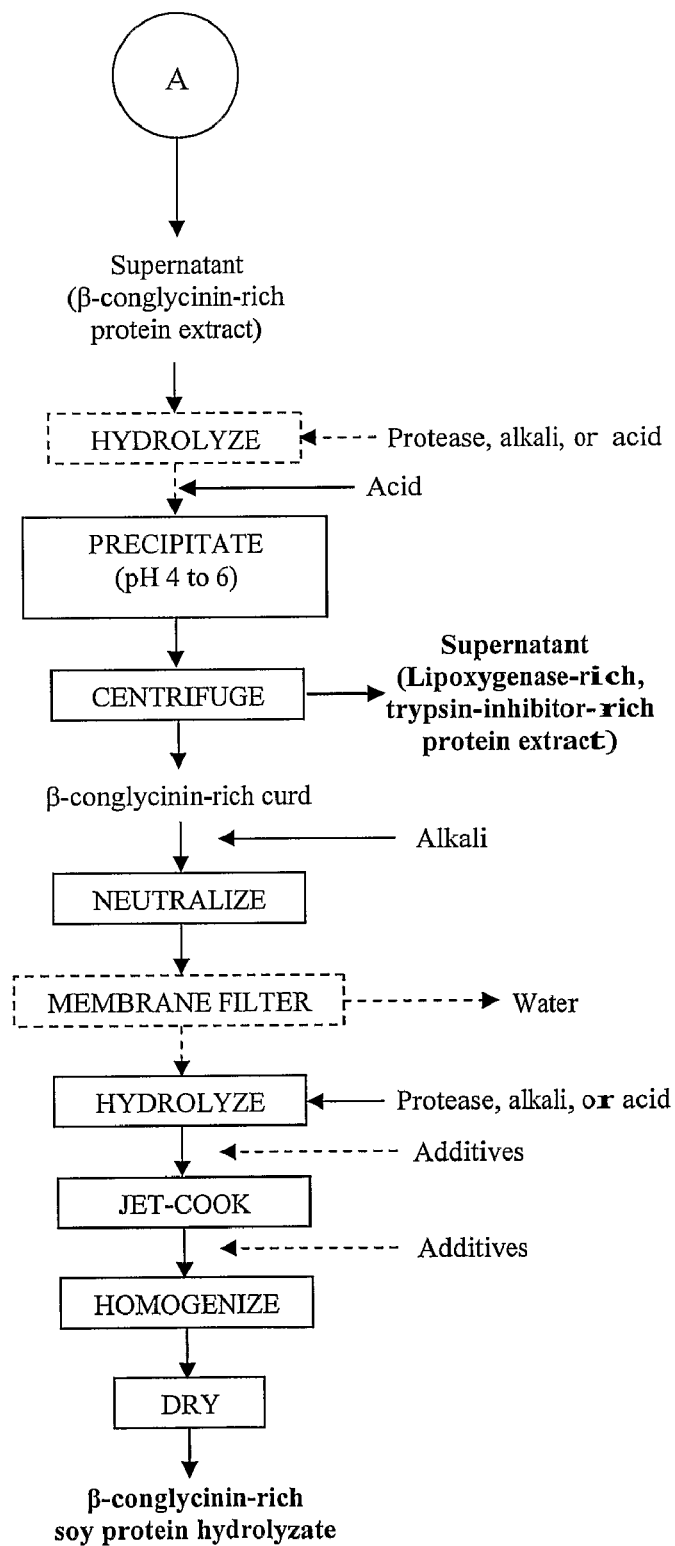

FIG. 7 is a flowchart depicting modifications including membrane filtration.

Figure 8A:
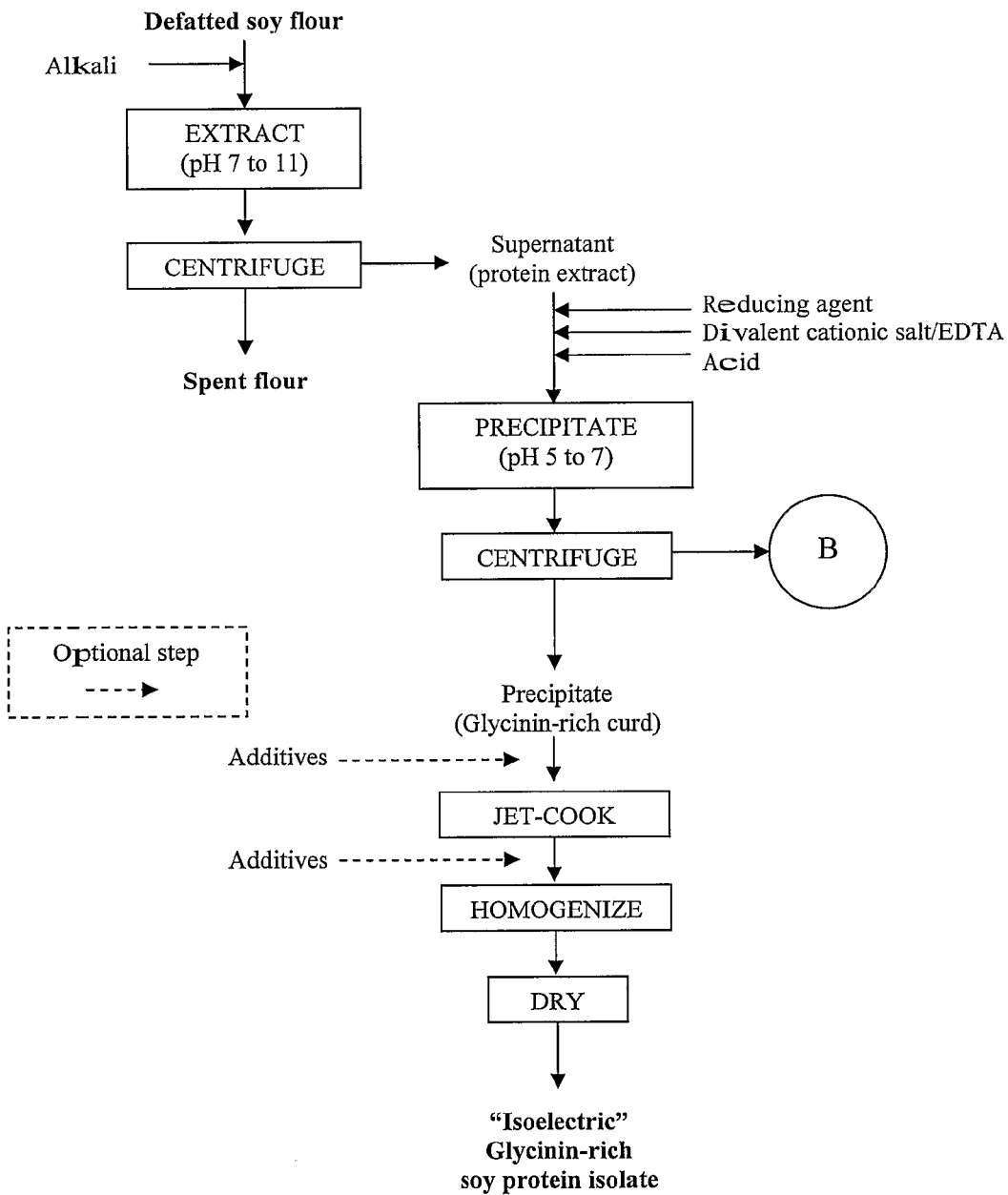
Figure 8B:
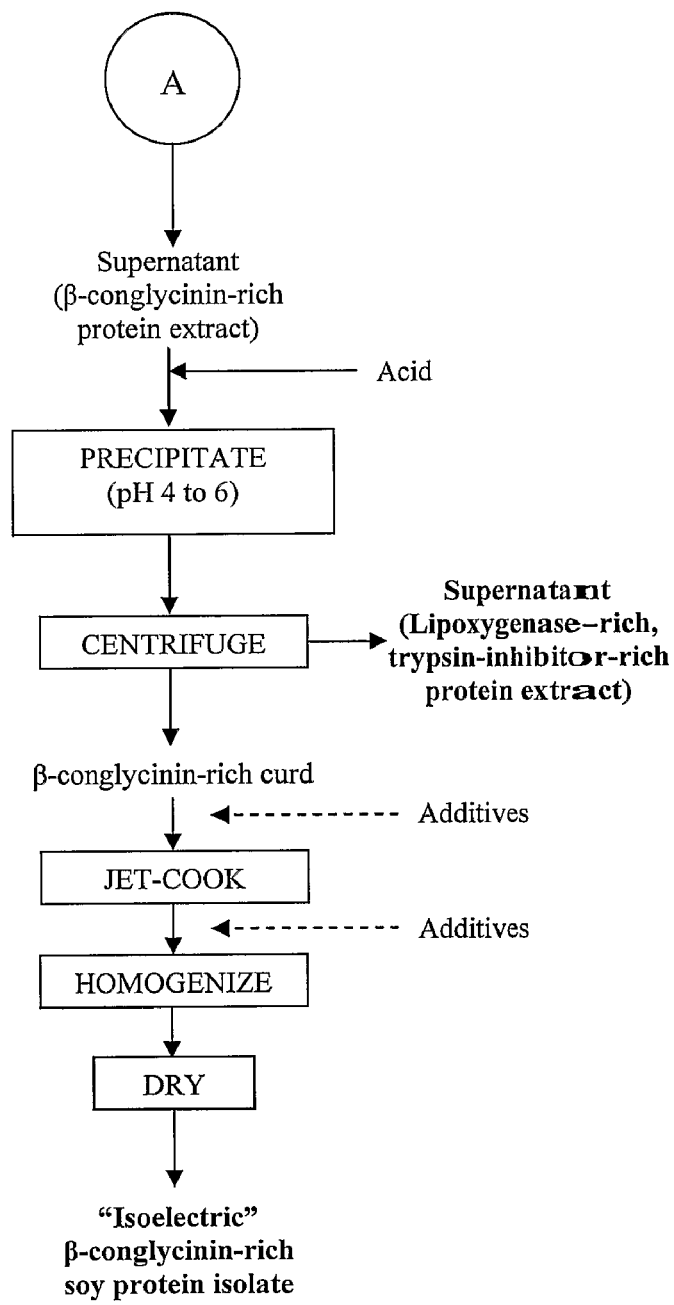

FIG. 8 is a flow chart depicting modifications including hydrolyzing, jet-cooking homogenizing and drying.

Figure 9A:
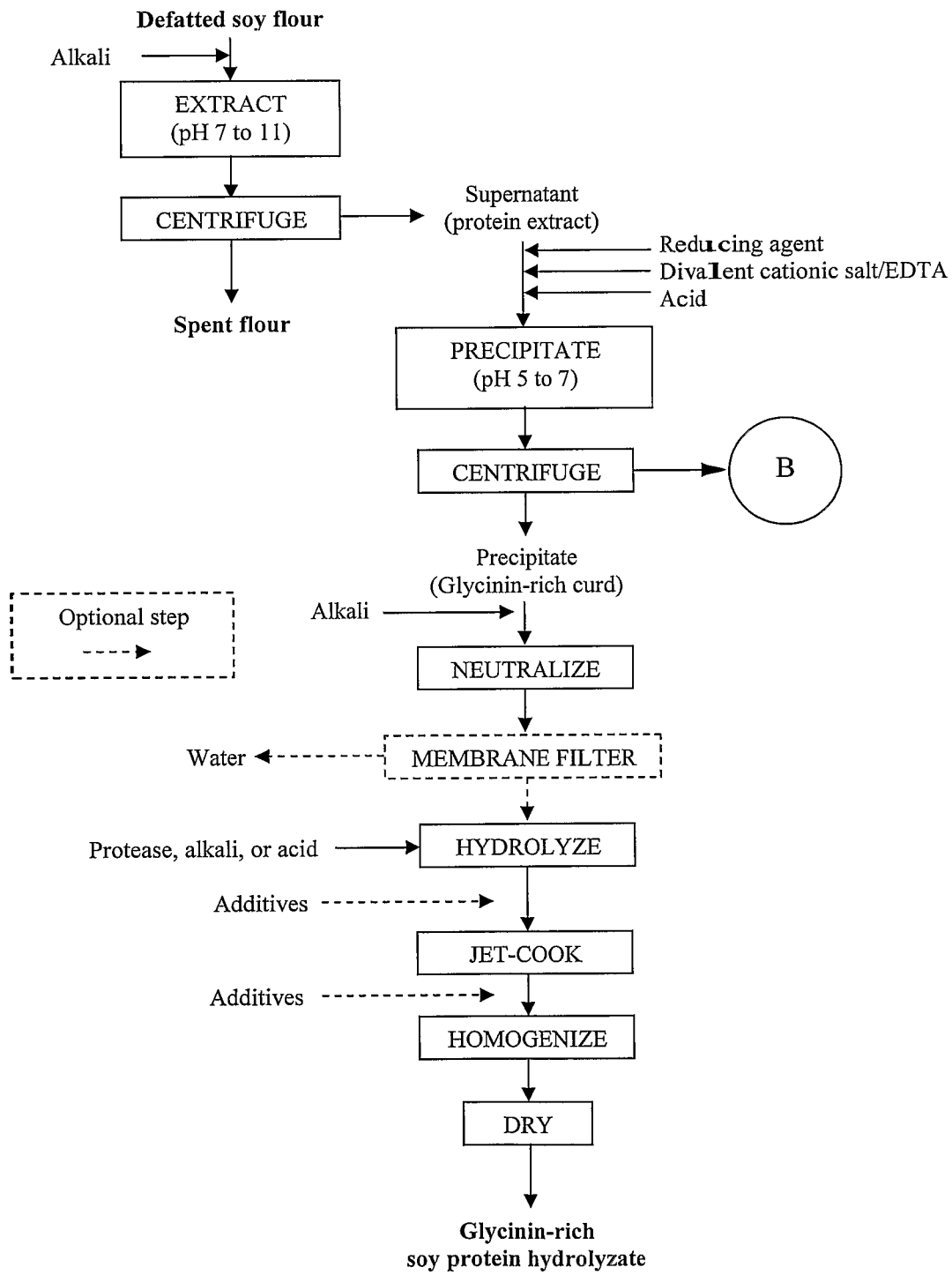
Figure 9B:
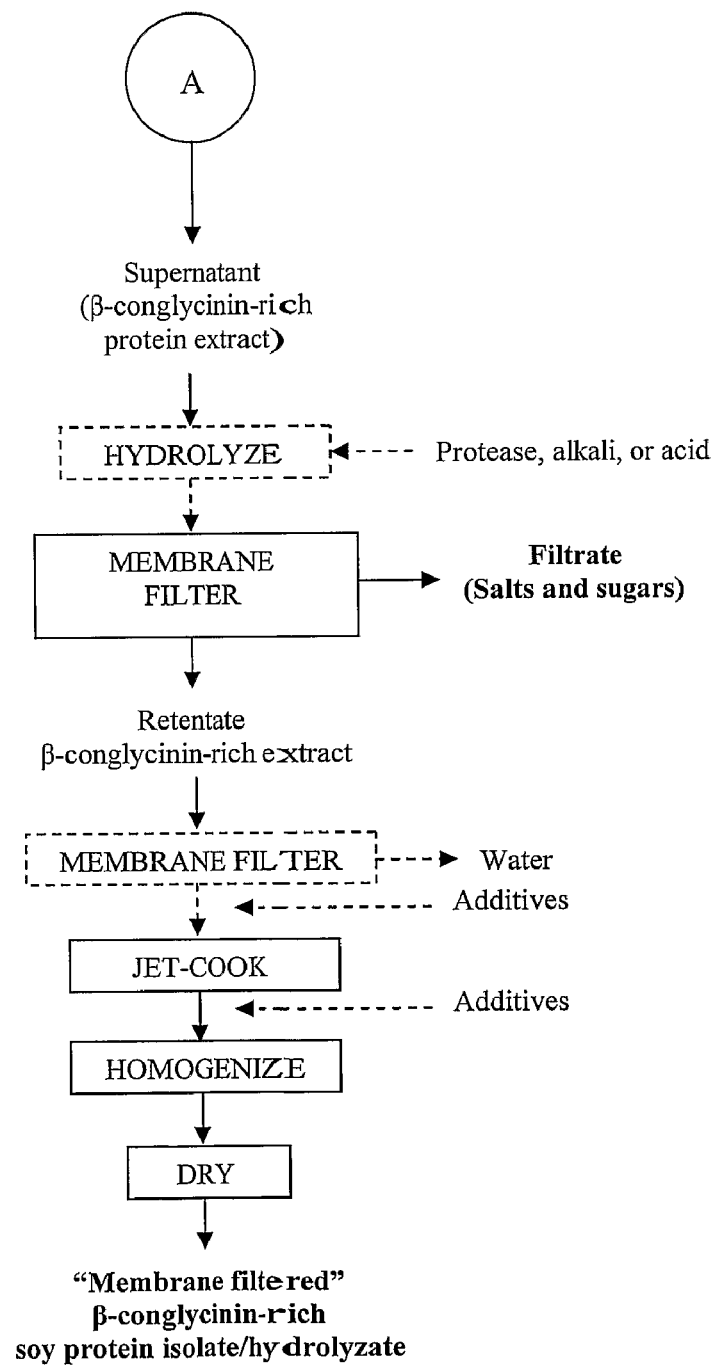

FIG. 9 is a flow chart showing the production of an isoelectric soy protein isolate.

Figure 10:
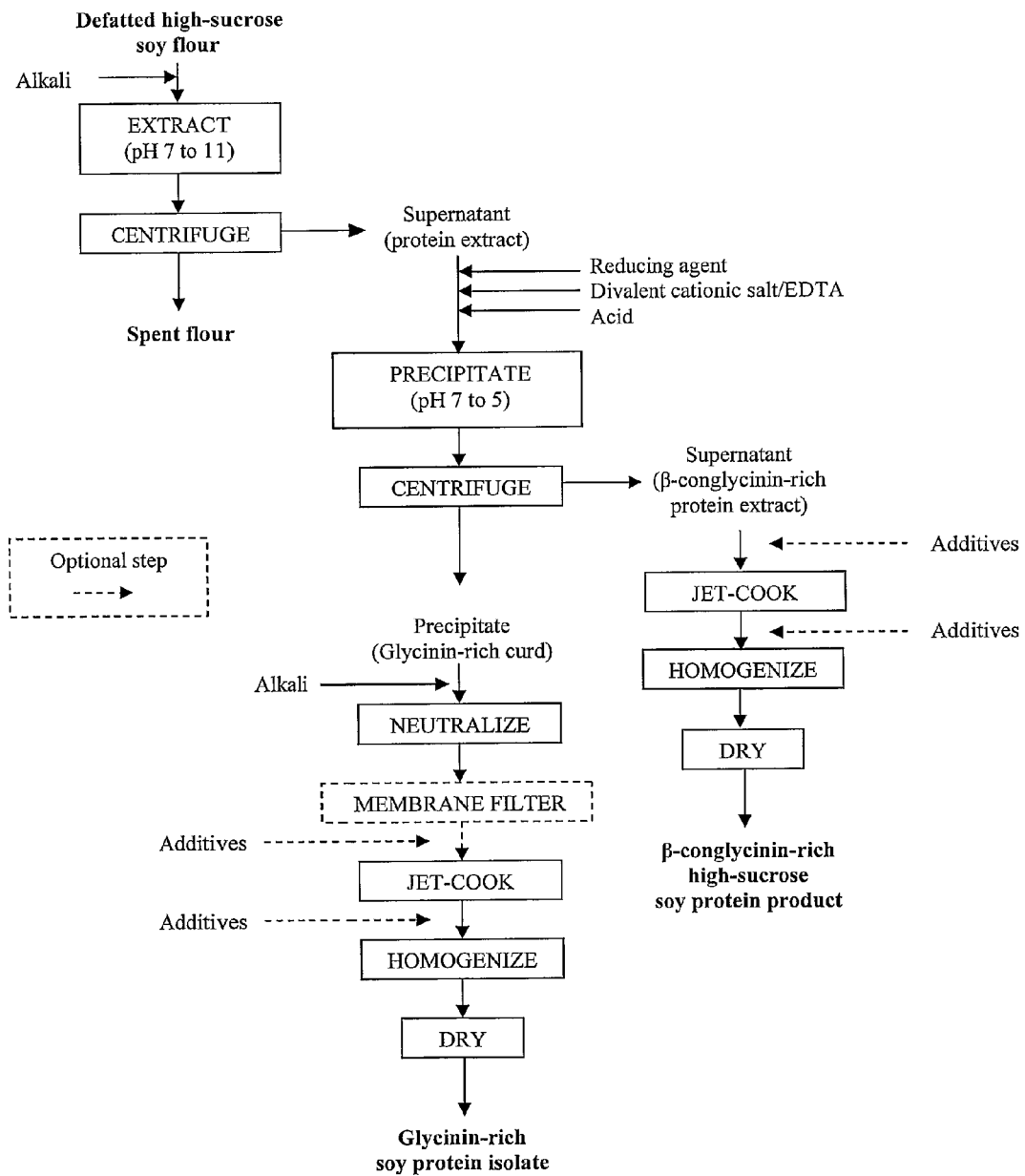

FIG. 10 is a flow chart showing the membrane-filtered soy protein hydrolyzate.

Figure 11:
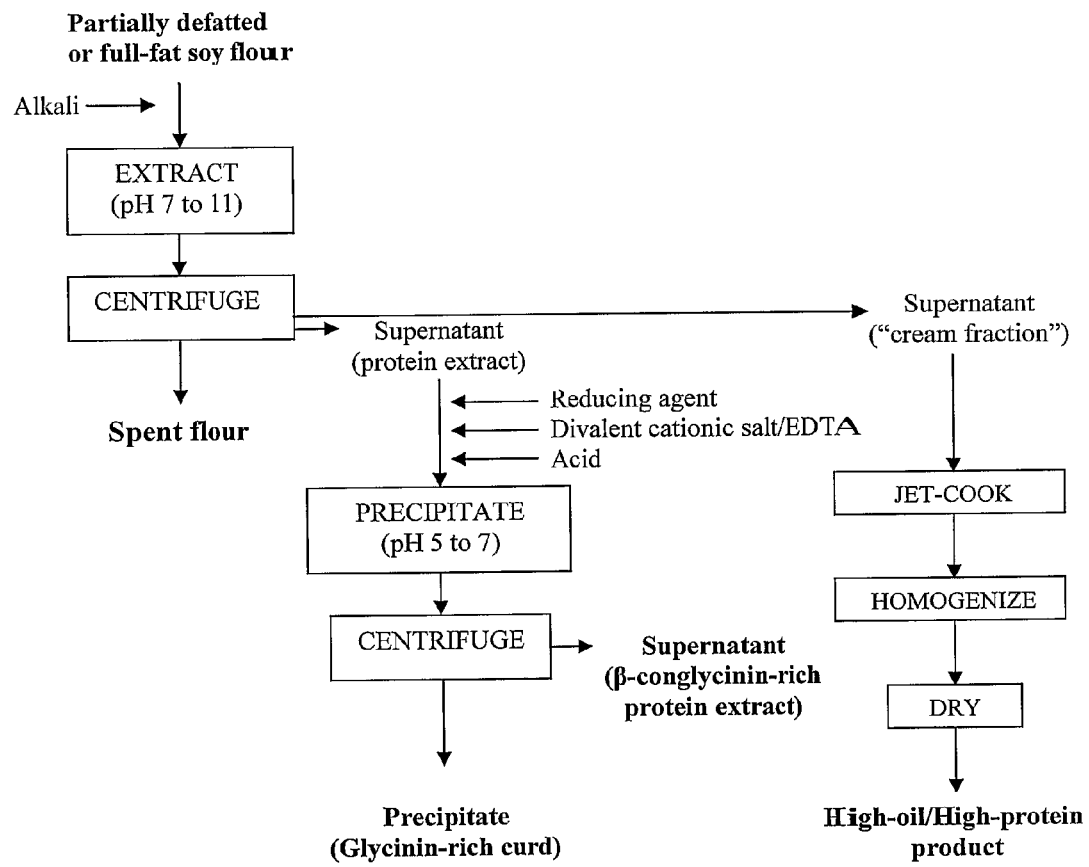

FIG. 11 is a flow chart showing the preparation of high-sucrose soy products.

Figure 12:
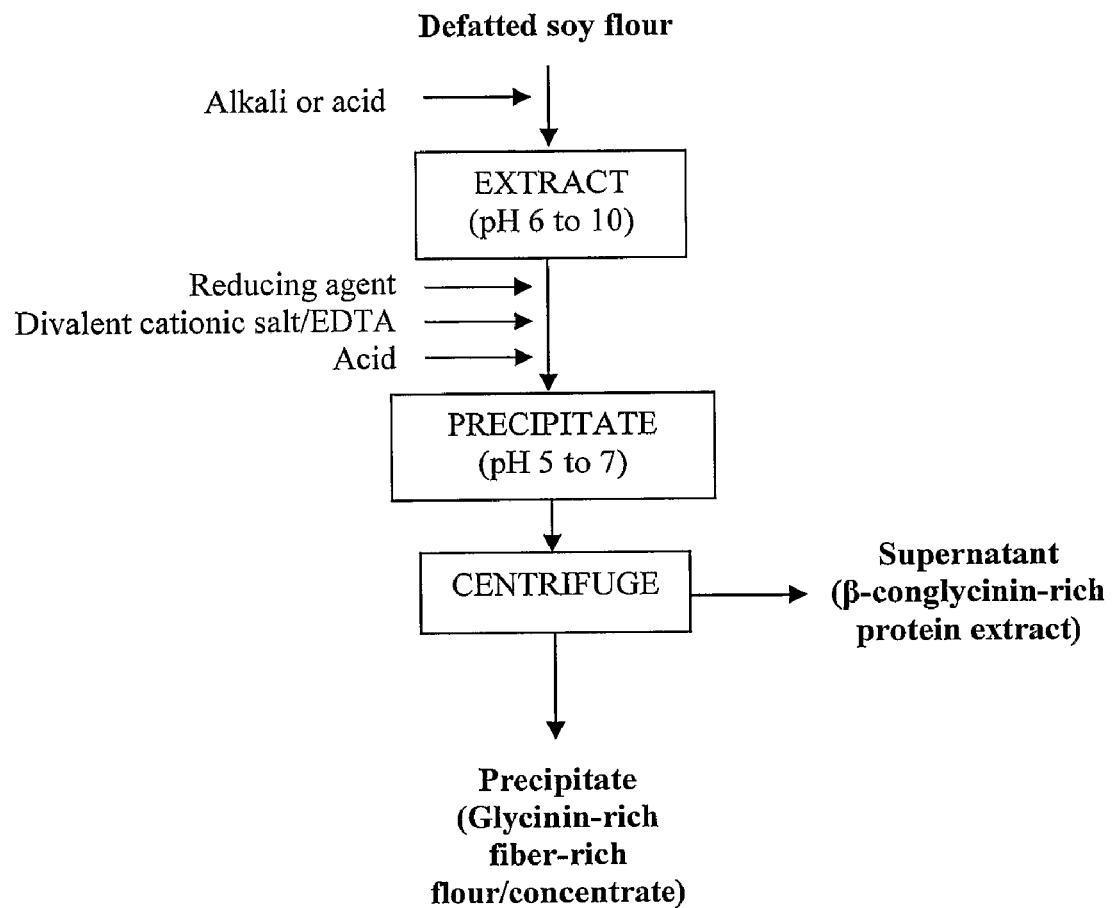

FIG. 12 is a flow chart showing the preparation of products from partially de-fatted or fall-fat soy flour.

Figure 13:
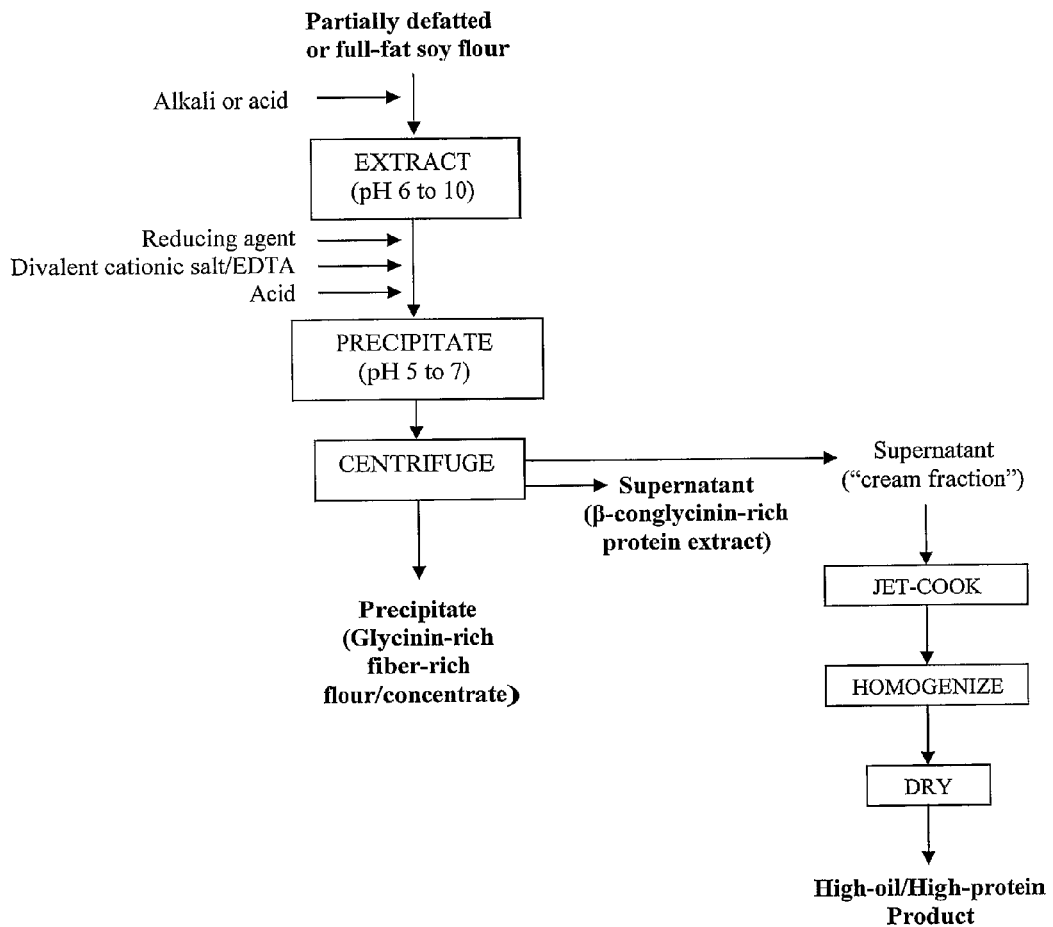

FIG. 13 is a flow chart showing the invention using defatted soy flour where both the reducing agent and calcium salt are added to the extraction step in order to produce a glycinin-rich flour and a β-conglycinin-rich extract.

Figure 14:
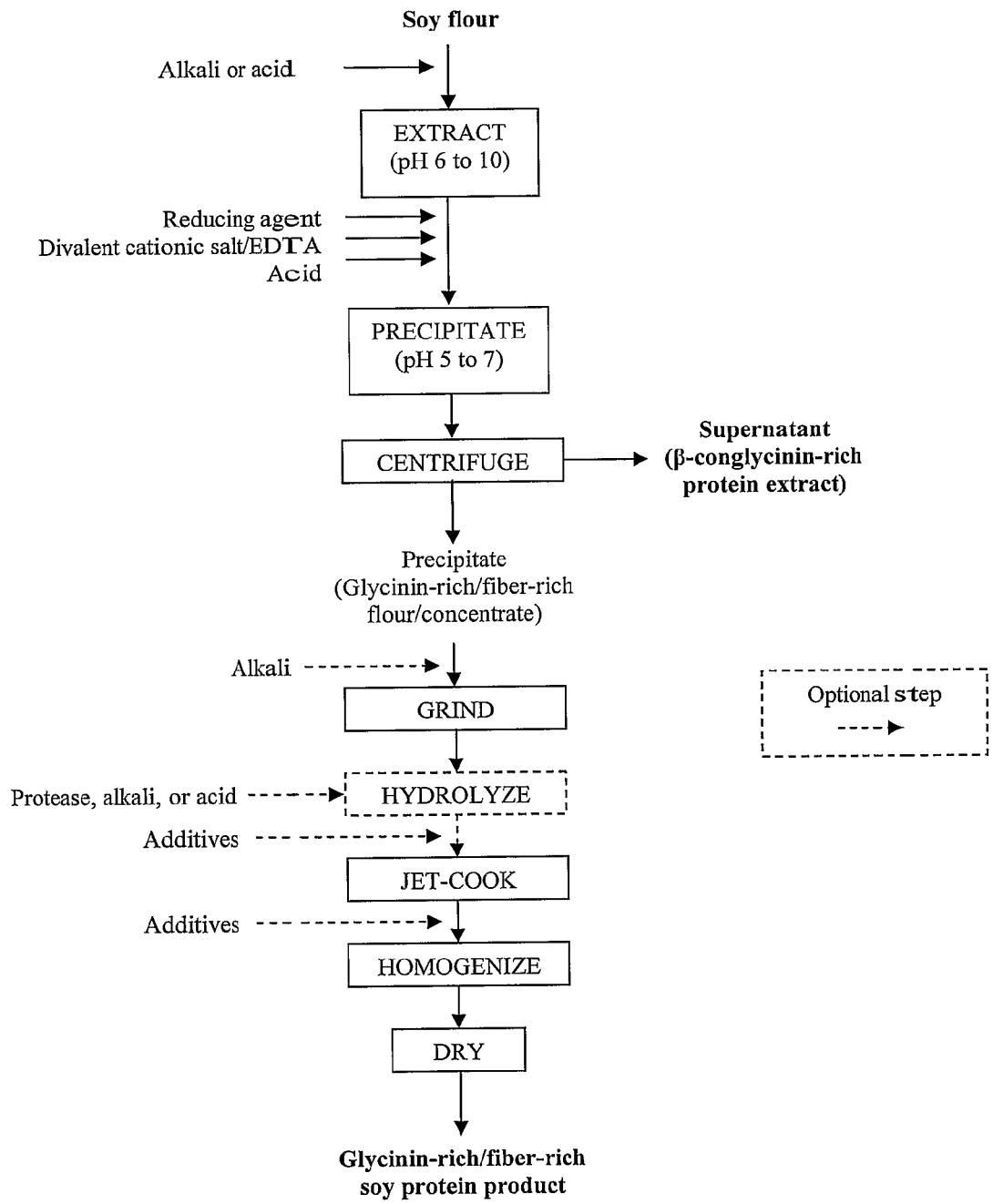

FIG. 14 is a flow chart showing the invention using partially defatted or full-fat soy flour.

Figure 15:
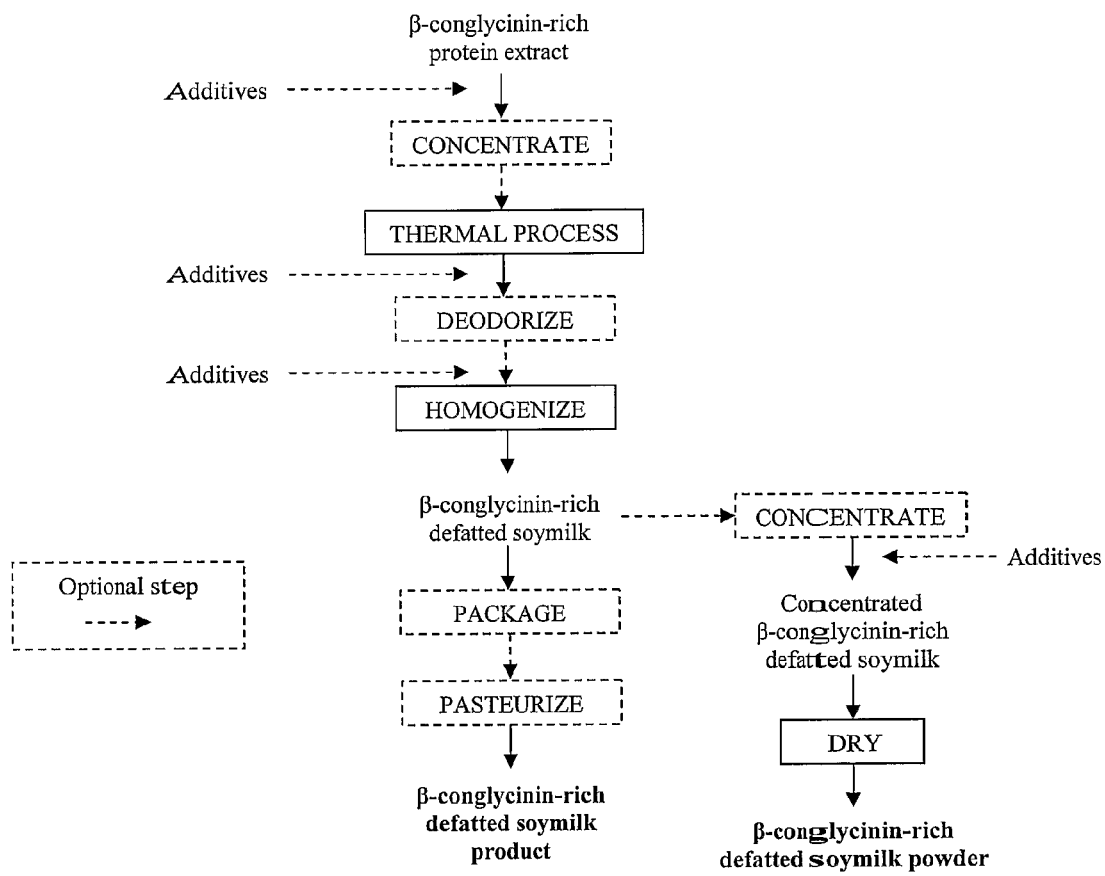

FIG. 15 is a flow chart showing the process when the starting material is soy flour.

Figure 16:
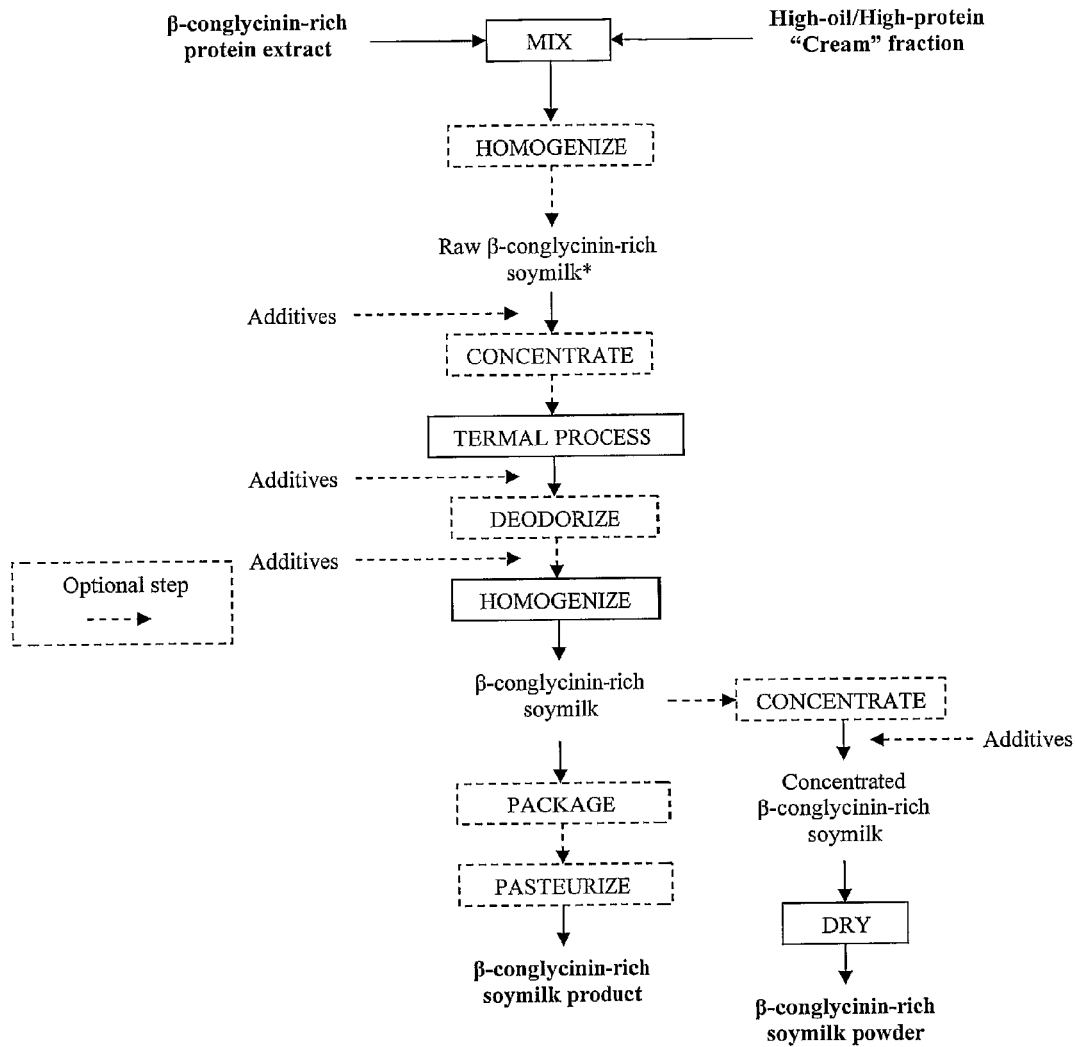

FIG. 16 shows the products of the invention further modified to produce soymilk products.

DETAILED DESCRIPTION OF THE PREFERRED EMBODIMENT

The process of the invention gives an alternative to genetic modification to produce soy protein isolates high in either glycinin or high in β-conglycinin from traditional soybean lines. This is of particular interest for exports of these products to Europe and Japan, where there is resistance to consuming genetically modified products. The process of the invention obtains two high value products by using a single protein fractionation step. This is a significant benefit compared to previous approaches. One of the problems associated with protein fractionation is that there are usually large losses of protein to less valuable fractions. Phytochemical recovery (specifically but not limited to isoflavones) is significantly higher in this invention, since the process does not require desalting steps nor excessive washing, which are two critical points of phytochemical loss in previous approaches. Additionally, the salts used in our process are healthier than the traditionally used ones. An added benefit of this invention is that it produces highly functional food ingredients that make them appealing for industrial applications.

The invention is superior to the previously known procedures to the art, since it utilizes all food-grade chemicals, fewer operating steps, achieves higher yields of fractionated protein products, is more cost effective since the process utilizes less water and washing steps, and the products have superior functional properties and higher isoflavone contents. Over all, our invention is less expensive, less complicated, and produces less waste than previously known processes.

The present invention is a simple method to produce fractionated vegetable proteins. In a preferred embodiment the vegetable source is soybeans. This can include normal or naturally occurring soybean varieties, or soybeans modified by tradtitional breeding methods and/or genetic engineering (e.g. lipoxygenase-null, low-phytate, high-oleic, high-β-conglycinin, high-glycinin, high-cysteine, low-linolenic, etc.). First the proteins are extracted from the vegetable source. The protein source is preferably defatted, but with minor modifications as described herein, partially defatted or even full-fat soy material can be used. Defatted soybean white flakes with high protein dispersibility index are most preferred. The vegetable protein source is extracted with a dilute alkali at pH values between 7.0 and 11.0, at temperatures between 4° C. and 80° C.; thereby obtaining a protein extract that is a mixture of different proteins naturally present in the vegetable source. The resulting extract is then subjected to a fractional precipitation by adding small amounts of a multi-valent cationic salt, such as calcium, magnesium, zinc, etc. This step can also be performed with a multi-valent anionic salt, such as ethylene diamine tetraacetic acid and/or any of its salts. A food-grade reducing agent, such as sodium bisulfite, sodium sulfite, ascorbic acid, erythorbic acid, L-cysteine, or other reducing agent is also added. The reducing agents can be added during the protein extraction step (before or after alkali conditions) rather than added to the protein extract. Next, the pH of the slurry is adjusted to between 7.0 and 5.0 and the temperature to between 2° C. and 35° C. in order to obtain a precipitate that is mainly comprised of the glycinin, and a supernatant that is enriched in β-conglycinin. The resulting supernatant can be adjusted to a pH between 6.0 and 3.0 in order to obtain a β-conglycinin-rich precipitate and a supernatant rich in lipoxygenase and trypsin inhibitors. The glycinin and β-conglycinin protein extracts and/or curds can be further processed in any of a number of ways depending upon the desired use. Several of such processes and uses are further detailed herein.

The precipitates can be dried by any conventional method with or without previous neutralization with dilute alkali. These precipitates are single protein enriched isolates with unique compositions and superior functional properties. The products obtained by this invention are usually enriched in isoflavones and have significant process cost advantages over alternative soy protein fractionation processes.

In a further embodiment (see FIG. 7), the β-conglycinin-rich precipitate can be redissolved by neutralizing the precipitate with dilute alkali to obtain a neutralized β-conglycinin-rich protein slurry. The neutralized slurry can then be membrane filtered and neutralized to obtain a concentrated β-conglycinin-rich protein slurry retentate and a filtrate composed mostly of water and minerals. This process can also involve steps of jet-cooking or any other thermal processing of the neutralized β-conglycinin-rich protein slurries and subsequently homogenizing and/or drying to obtain a β-conglycinin-rich soy protein isolate powder. Lecithin and/or any other food-grade functional additives may be added prior to or after the thermal processing step as desired to said β-conglycinin-rich slurries, which may be followed by homogenizing and/or drying said mixture to obtain a β-conglycinin-rich soy protein product.

In another embodiment (FIG. 8), the said β-conglycinin-rich slurry may be hydrolyzed to obtain a β-conglycinin-rich hydrolyzed slurry. The β-conglycinin-rich hydrolyzed slurry may then be supplemented with lecithin or other food-grade functional additives and thermally processed and/or homogenized and/or dried to obtain a "hydrolyzed" β-conglycinin-rich soy protein isolate powder or a "hydrolyzed" β-conglycinin-rich soy protein product, or a "hydrolyzed" β-conglycinin-rich soy protein isolate product as desired.

In yet another embodiment (FIG. 9), the β-conglycinin rich curd can be jet-cooked or otherwise thermally processed and subsequently homogenized and/or dried to obtain an "isoelectric" β-conglycinin-rich soy protein isolate powder. Lecithin and/or other food-grade additives may also be added either before or after the thermal processing the protein slurry then may be homogenized and/or dried to obtain an "isoelectric" β-conglycinin-rich soy protein product.

In yet another embodiment (FIG. 10), the β-conglycinin-rich supernatant is membrane filtered to obtain a β-conglycinin-rich retentate and a filtrate that is mainly composed of salts and sugars. The retentate may then be subsequently homogenized and/or dried to obtain a "membrane filtered" β-conglycinin-rich soy protein isolate powder. Lecithin and/or any other food-grade additive may be added either before or after jet cooking or other thermal process, which may be followed by homogenizing and/or drying to form a "membrane filtered" β-conglycinin-rich soy protein isolate product.

In yet another embodiment (FIG. 8), the β-conglycinin-rich supernatant may be hydrolyzed to obtain a β-conglycinin-rich hydrolysate extract. The pH of the extract may then be adjusted to between about 4 and about 6 to obtain a hydrolyzed β-conglycinin-rich precipitate and a supernatant that is mainly composed of minerals and sugars. The precipitate may then be re-dissolved and neutralized with dilute alkali to obtain a neutralized hydrolyzed β-conglycinin-rich slurry, which may be membrane filtered said to obtain a concentrated hydrolyzed β-conglycinin-rich slurry retentate and a filtrate that is mainly composed of water and salts. As before, the neutralized hydrolyzed β-conglycinin-rich protein slurry may be jet-cooked or otherwise thermally processed, and/or homogenized and/or dried to obtain a hydrolyzed β-conglycinin-rich soy protein isolate powder. A hydrolyzed β-conglycinin-rich soy protein isolate product may be formed by adding lecithin or any other food-grade additive either prior to or after thermal processing.

In yet another embodiment (FIG. 10), the β-conglycinin-rich hydrolysate extract may be membrane filtered to obtain a hydrolyzed β-conglycinin-rich retentate and a filtrate that is mainly composed of minerals and sugars. The retenate may then be jet cooked or otherwise thermally processed, and/or homogenized and/or dried to obtain a hydrolyzed β-conglycinin-rich soy protein isolate powder. Lecithin or other additives may be added prior to or subsequent to the thermal processing to form a hydrolyzed β-conglycinin-rich soy protein product.

In yet another embodiment (FIG. 7), the glycinin-rich precipitate may be re-dissolved by neutralizing with dilute alkali to obtain a neutralized glycinin-rich slurry. The slurry may then be membrane filtered to obtain a concentrated glycinin-rich slurry retentate and a filtrate that is mainly composed of water and minerals. The neutralized glycinin-rich protein slurries may then be jet cooked or otherwise thermal processed, and/or homogenized and/or dried to obtain a glycinin-rich soy protein isolate powder. Lecithin or other food-grade additives may be added just before or after thermal processing to produce a glycinin-rich soy protein product.

In still another embodiment (FIG. 8), the glycinin-rich slurry may be hydrolyzed to obtain a hydrolyzed glycinin-rich slurry. As before, the slurry may then be jet cooked, or otherwise thermally processed, and/or homogenized and/or dried to obtain a "hydrolyzed" glycinin-rich soy protein isolate powder. To obtain a "hydrolyzed" glycinin-rich soy protein product, lecithin or other food-grade additives may be added just before or after thermal processing.

In yet another embodiment (FIG. 9), the glycinin-rich precipitate slurry may be jet-cooked or otherwise thermally processed and/or subsequently homogenized and/or dried to obtain an "isoelectric" glycinin-rich soy protein isolate powder. Lecithin and other food-grade additives may be added prior to or after thermal processing to form an "isoelectric" glycinin-rich soy protein product.

In yet a further embodiment, the soybean source may be High-sucrose/Low-stachyose soybeans (FIG. 11) and the method includes further steps of jet cooking or any other thermal processing said enriched β-conglycinin extract and/or subsequently, homogenizing, and/or drying said extract to obtain a β-conglycinin-rich high-sucrose protein product. Lecithin and other food additives may be added prior to or subsequent to the thermal processing to from a β-conglycinin-rich high-sucrose protein product.

In still another embodiment, the defatted vegetable source is obtained through organic solvent or supercritical $CO_2$ extraction of the fat from the soybean matrix (FIG. 10). The defatted vegetable source may also be obtained through screw pressing and/or Gas-Supported Screw Pressing (GSSP) and/or other mechanical oil extraction method, such as the Extruding-expelling Process, that produces a partially defatted soybean source. In this embodiment the partially defatted soybean source is subsequently extracted with a dilute alkali of approximately pH 7 to approximately pH 11 to form a mixture of proteins present in said vegetable source, and then centrifuged to obtain a supernatant oil-rich "cream" fraction and a supernatant protein extract from said mixture, then the protein extract is subjected to fractional precipitation and reducing agents as described previously. The resulting product may then be jet cooked or otherwise thermally processed and/or thereafter homogenized and/or dried to obtain a dried high-oil/high-protein product.

In yet another embodiment (FIG. 13), the method for obtaining a β-conglycinin-rich isolated protein fraction and/or a glycinin-rich fiber-rich flour/concentrate fraction from a soybean source comprises, obtaining a defatted soybean source; extracting said source with dilute alkali or acid of pH of about approximately 6 to approximately 10 to form a mixture of proteins present in said vegetable source; subjecting said mixture to fractional precipitation with a multi-valent salt and a reducing agent to form a slurry; adjusting said slurry to a pH of approximately 7 to approximately 5 to obtain a precipitate, which is enriched in glycinin and fiber, and a supernatant, which is enriched in β-conglycinin as compared to percentage protein in the original mixture. The extract may be treated as described earlier to form protein isolates and products. Multi-valent cationic salts useful in the foregoing can include but is not limited to calcium, magnesium or zinc, and their mixtures, or in as alternative, the multi-valent anion EDTA and/or any of its salts may be used. Reducing agents may include but is not limited to sodium bisulfite, sodium sulfite, ascorbic acid, erythorbic acid, L-cysteine or other food-grade reducing agents. Soybean sources can include normal or naturally occurring soybean varieties, genetically modified soybeans such as High-sucrose/Low-stachyose soybeans, which are processed as described earlier. The vegetable source may also be obtained through hexane extraction of the fat from the vegetable matrix or through supercritical $CO_2$ extraction or through screw pressing and/or Gas-Supported Screw Pressing (GSSP) and/or other mechanical oil extraction method, such as Extruding-expelling, that produces a partially defatted soybean source and is processed as described earlier. As shown in FIG. 14, partially defatted or full-fat soy flour may also be used according to the invention.

When the partially defatted soybean source is replaced by a full-fat soybean source comprising the processing steps therein described and obtained, the product and processes thereafter described have products that differ in that the products obtained will have higher oil content, a protein content of less than 90%, and a higher yield of oil-rich cream fraction. See FIGS. 14 and 15.

In yet another embodiment (FIG. 16), additional steps of deodorizing and/or packaging and/or sterilizing and/or packaging are shown to obtain a β-conglycinin-rich defatted soymilk, which may be dried to form powder or which may have lecithin or other food-grade additives added as described herein and shown in FIGS. 15 and 16.

In yet another embodiment, the β-conglycinin-rich extract/supernatant may be subjected to chemical modification, such as but not restricted to acylation, phosphorylation, and deamidation, to obtain a chemically modified β-conglycinin-rich extract. The extract may also be enzymatically modified by phytase and/or glycosidase, or any other enzyme to obtain an enzymatically modified β-conglycinin-rich extract.

The redissolving step and/or dispersing said glycinin-rich precipitate may also be subjected to chemical an enzymatic modification such as but not restricted to acylation, phosphorylation, and deamidation, to obtain a chemically modified glycinin-rich slurry. enzymatic modification such as but not restricted to phytase, and/or glycosidase and/or pectinase and/or cellulase to obtain an enzymatically modified glycinin-rich slurry which is then processed as described.

Since soybeans is an inexpensive commodity, methods to process it cannot be too sophisticated in order to preserve economical feasibility. Our invention addresses the following problems and solves them adequately:

(1) The starting extracts are obtained by using similar technologies to any other aqueous-alkali extraction; the process does not need new equipment.
(2) The chemicals utilized are food-grade to allow the use of the products in the food industry; the process not only uses food-grade chemicals, but also may employ calcium, a "healthy" salt.
(3) The method does not use excessive amounts of water (for dilutions or extractions) to increase the efficiency of the production; and is successful with single-stage extraction of protein and uses no dilution or desalting steps. This is a significant advantage compared to previous method, and the process is thus more environmentally friendly.
(4) The use of low temperatures should be avoided to reduce costs; the process of the invention has proven to be efficient without holding protein slurries at low temperatures, which almost all of the previous fractionation procedures require. This significantly reduces processing costs and speeds up production.
(5) The yields and purities of the fractions should be manageable to obtain consistency and uniformity of production; the invention achieves this goal, since it is a simple process, which in turn facilitates control and makes it reproducible. These two factors (production control and reproducibility) are of great importance when producing soy protein fractions on industrial scale.
(6) The invention allows us to produce different compositions of β-conglycinin and glycinin globulin proteins in arbitrary proportions giving a range of unique soy protein isolates and/or products, each with unique compositions and functionalities, by adjusting the multi-valent ion concentration and the pHs used to precipitate the fractions. None of the processes previously described in the art are able to do this.
(7) The process must be a simple straightforward procedure, avoiding multi-stage separations and precipitations. The invention is the simplest of all fractionation procedures known to the art.
(8) The process of the invention not only fractionates the β-conglycinin and glycinin globulins effectively, but also renders healthy products with broad applicability and superior functional properties compared to products previously known to the art.

While the methods disclosed herein specifically reference soybean, the invention is not so limited, it will be understood by those of skill in the art that any vegetable source can be used according to the invention to isolate and purify proteins therefrom with no more that routine experimentation according to the teachings herein.

EXAMPLE 1

The process of the invention was carried out in duplicate. Means of solids yields, protein yields and purity data are reported in Tables 1, 2 and 3, respectively.

All processes started from the same material, defatted soybean flour from IA 2020 variety, 1999 harvest, and defatted in our pilot plant in January 2000. The meal had a PDI of 93.8. The following flow charts are provided: the method of the invention (FIG. 1), control procedure (Modified Nagano, FIG. 2), and traditional soybean protein isolate procedure (FIG. 3).

All processes had the same starting step, the meal was extracted with de-ionized water at flour-to-water ratio of 1:15; the pH was adjusted to 8.5. The resulting slurry was stirred at 25° C., and after 1 hour the slurry was centrifuged at 14,000×g and 25° C. for 30 minutes to separate the spent flour (largely fiber) from the protein extract. The resulting protein extract, comprising 78.6% of the protein originally present in the flour, was divided in twelve aliquots.

To each of these aliquots a combination of $CaCl_2$ and $NaHSO_3$ was added at different concentrations, the pH was adjusted to 6.4, and stirred for 15 minutes. After this initial stirring, all samples were placed in a cold room at 4° C. overnight. The next day the extracts were stirred again and centrifuged at 14,000×g and 4° C. for 30 minutes, obtaining a glycinin-rich precipitate and a β-conglycinin-rich supernatant. The supernatant was adjusted to pH 4.8 and centrifuged again under the same conditions, recovering a β-conglycinin-rich curd, and an extract that is normally termed whey by those skilled in the art.

Additionally, two of these aliquots, in duplicate, were processed according to methods reported in the literature as a control, and an additional control was performed by not adding any chemicals to the extract (identified as Treatment #2 in the tables).

Figure 2A:
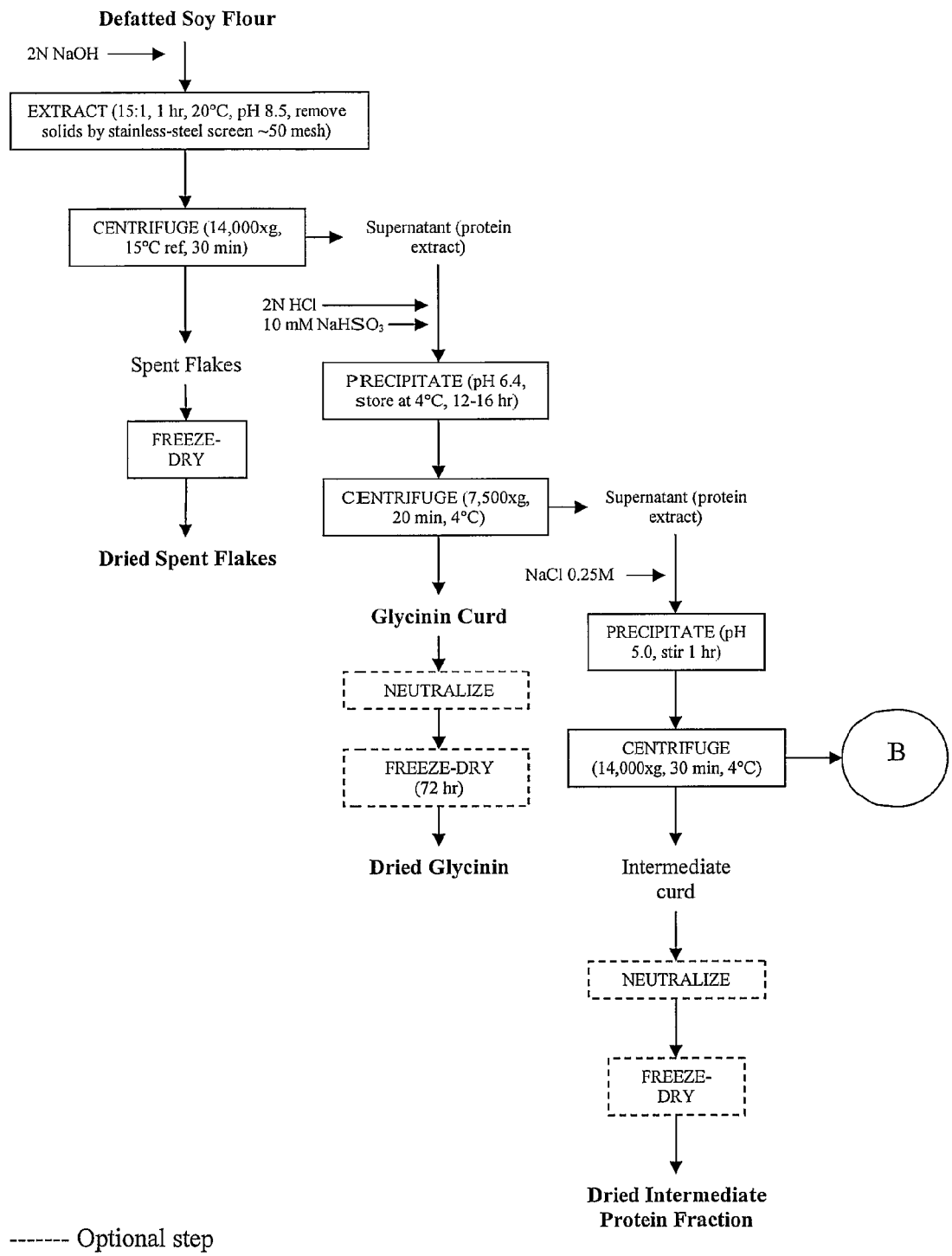
FIG. 2 is a flow chart showing the steps of a control procedure (Modified Nagano).
Figure 2B:
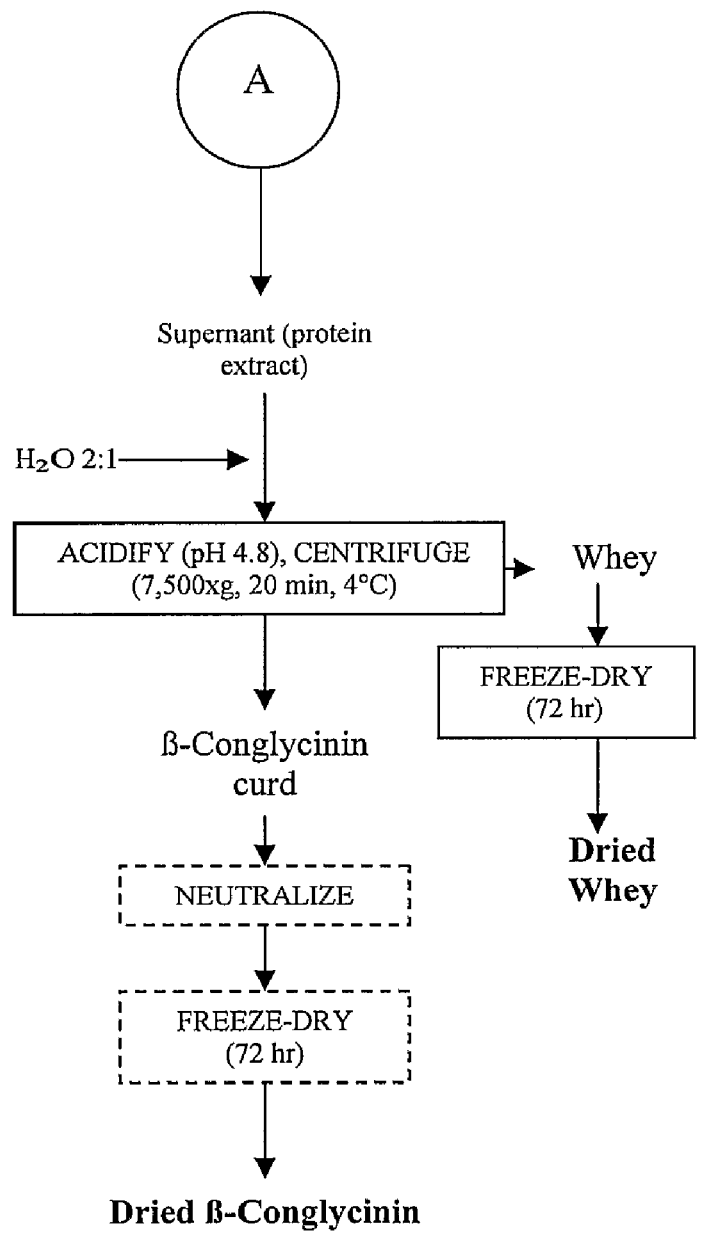
Figure 3:
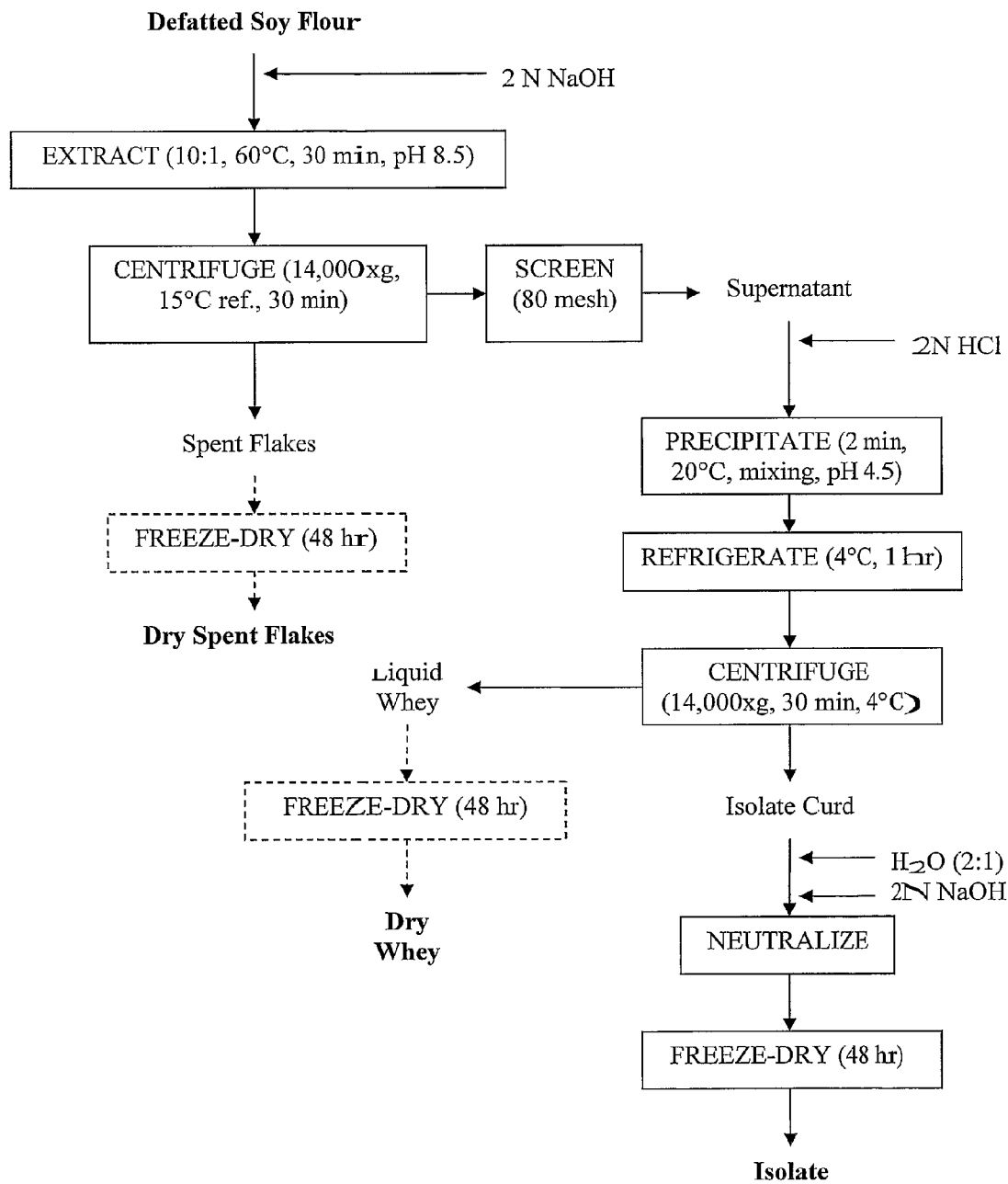
FIG. 3 is a flow chart showing the steps of traditional soybean protein isolate manufacture.

Treatments were as follows:

Treatment #1 control modified Nagano method, previous method (FIG. 2)

Treatment #2 control fractionation for only pH adjustment.

Figure 1A:
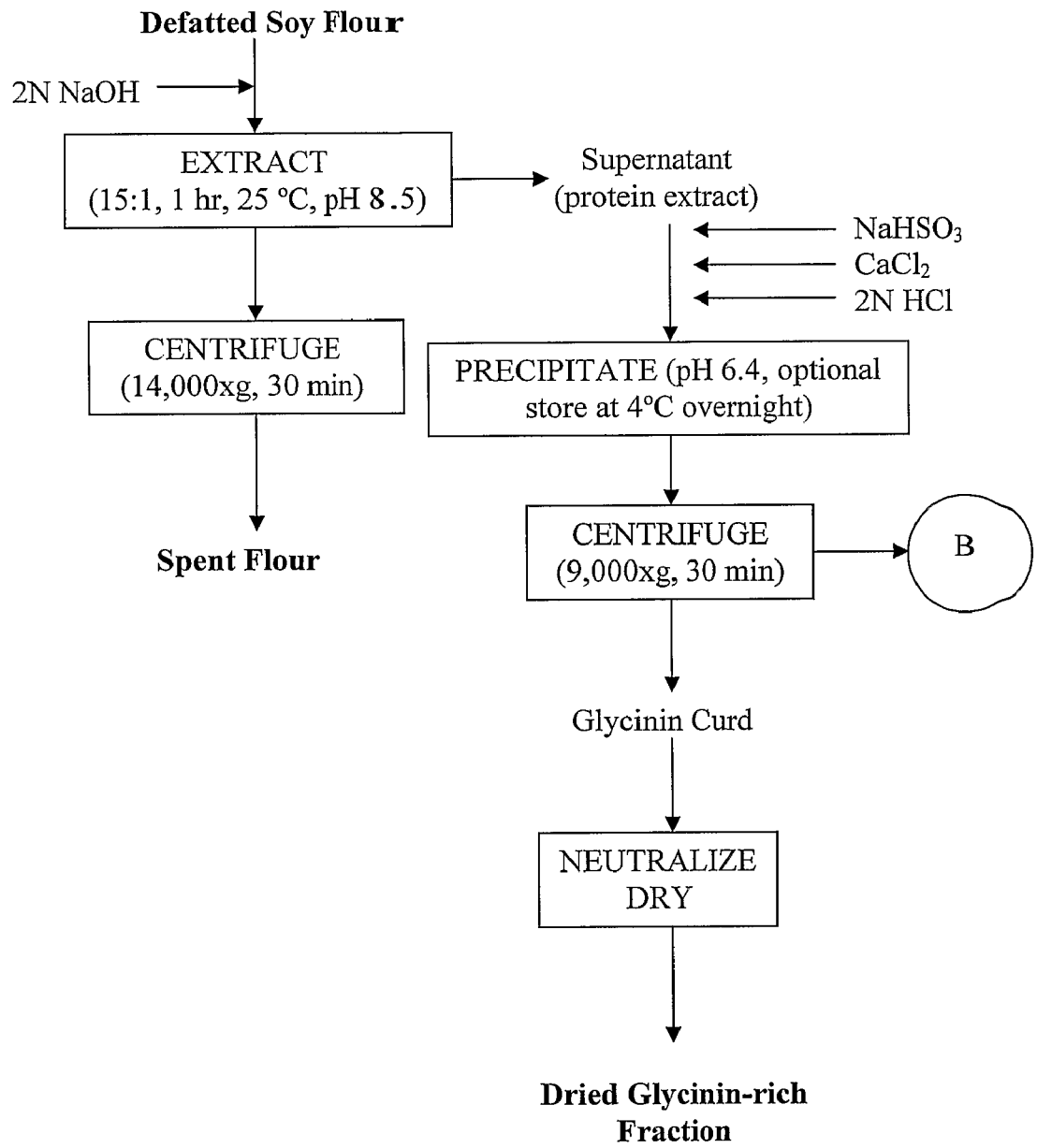
FIG. 1 is a flow chart showing the method of the invention.
Figure 1B:
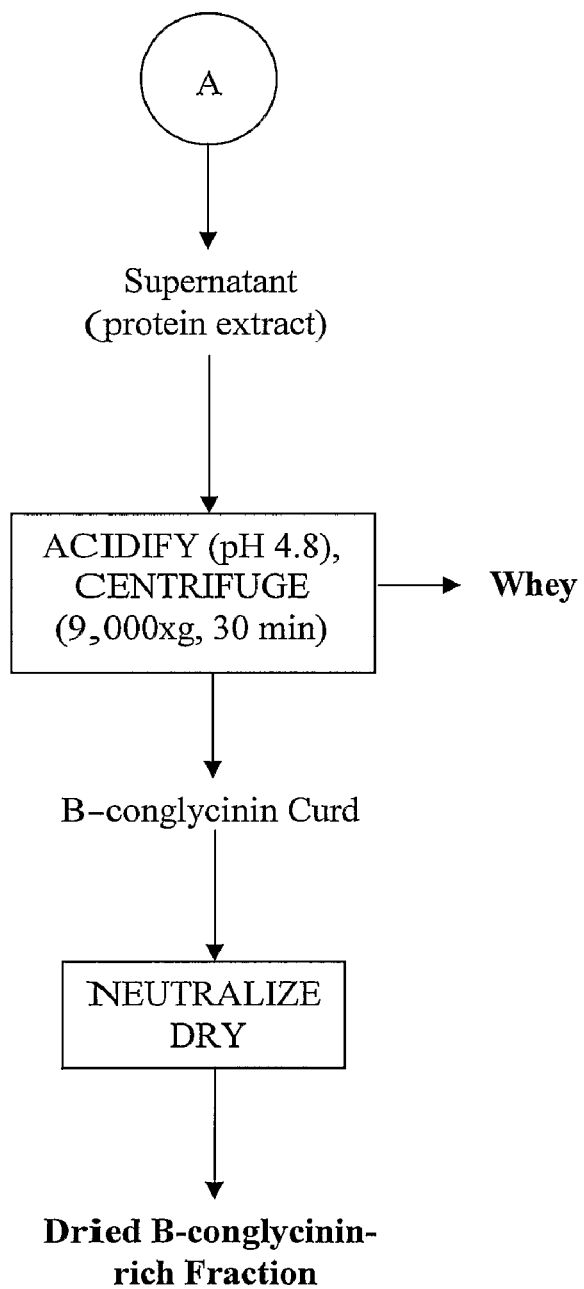

Treatment #3 fractionation with addition of 5 mM of $SO_2$ and 5 mM of $Ca^{2+}$. (FIG. 1, invention)

Treatment #4 fractionation with addition of 5 mM of $SO_2$ and 10 mM of $Ca^{2+}$. (FIG. 1, invention)

Treatment #5 fractionation with addition of 10 mM of $SO_2$ and 5 mM of $Ca^{2+}$. (FIG. 1, invention)

Treatment #6 fractionation with addition of 10 mM of $SO_2$ and 10 mM of $Ca^{2+}$. (FIG. 1, invention)

Solids and Protein Mass Balances were Performed and Purities were Assessed by urea-SDS-PAGE gel electrophoresis. Significant differences between different treatments were revealed by using paired t-tests at $\alpha=0.05$.

TABLE 1

Solids yield for each fraction and treatment

| Treatment | Glycinin (%) | β-conglycinin (%) |
|---|---|---|
| Treatment #1 (prior method) | 12.96 a, b | 10.06 a |
| Treatment #2 (control with no chemicals) | 11.29 a | 26.56 d |
| Treatment #3 (new) | 16.05 c | 22.32 c |
| Treatment #4 (new) | 18.22 d | 19.40 b |
| Treatment #5 (new) | 14.13 b | 23.70 c |
| Treatment #6 (new) | 17.76 d | 18.86 b |

N = 2.

Means in the same column followed by different letters are statistically different at $\alpha = 0.05$.

From the data shown in Table 1, it can be seen that the new processes give significantly higher solids yields in the products obtained compared to the prior method. These yields are in some cases more than 100% better for the β-conglycinin fraction; this is the fraction that current research and industry attention are focused on because of its potential health beneficial properties.

TABLE 2

Protein yield for each fraction and treatment

| Treatment | Glycinin-rich Fraction (%) | β-conglycinin-rich Fraction (%) |
|---|---|---|
| Treatment #1 (prior method) | 24.76 a | 18.51 a |
| Treatment #2 (control, with no chemicals) | 21.23 a | 48.38 b |
| Treatment #3 (new) | 27.97 a, c | 40.16 c |
| Treatment #4 (new) | 31.46 c | 35.45 d |
| Treatment #5 (new) | 25.81 a | 41.48 c |
| Treatment #6 (new) | 32.44 c | 34.46 d |

Means in the same column followed by different letters are statistically different at $\alpha = 0.05$.

From the data shown in Table 2, it can be seen that the new processes have significantly higher protein yields in the products compared to the prior method. These yields are in some cases more than 100% better for the β-conglycinin fraction than achieved by methods previously known to those skilled in the art.

TABLE 3

Fraction purity for each fraction and treatment

| Product | Treatment | Lipoxygenase (%) | β-Conglycinin (%) | Glycinin (%) | Others (%) |
|---|---|---|---|---|---|
| Protein Extract | | 4.52 | 41.36 | 50.70 | 3.42 |
| Glycinin-rich fraction | Trt. #1 (prior method) | 6.96 a | 14.19 d | 72.38 b | 6.47 b |
| | Trt. #2 | 3.33 c | 28.62 a | 62.72 d | 5.32 c |
| | Trt. #3 (new) | 0.00 d | 25.09 b | 74.91 a | 0.00 e |
| | Trt. #4 (new) | 4.27 b | 29.48 a | 57.65 e | 8.60 a |
| | Trt. #5 (new) | 0.00 d | 20.36 c | 75.20 a | 4.45 d |
| | Trt. #6 (new) | 4.31 b | 28.33 a | 67.35 c | 0.00 e |
| β-Conglycinin rich fraction | Trt. #1 (prior method) | 5.07 c | 81.26 a | 13.67 d | 0.00 |
| | Trt. #2 | 7.01 a | 64.76 d | 27.76 a | 0.00 |
| | Trt. #3 (new) | 5.25 c | 76.95 b | 17.81 b, c | 0.00 |
| | Trt. #4 (new) | 5.84 b, c | 78.94 a | 15.22 c, d | 0.00 |
| | Trt. #5 (new) | 5.13 c | 74.65 c | 20.22 b | 0.00 |
| | Trt. #6 (new) | 6.35 b | 78.38 a, b | 15.27 c, d | 0.00 |

N = 2.
Means in the same column, for a given fraction, followed by different letters are statistically different at $\alpha = 0.05$.

From the data provided in Table 3, it can be seen that the new processes have similar or better purities to the ones obtained by Treatment #1 (prior method).

Treatment #3 was selected for scale up at a lab level in order to produce enough samples for further characterizing these new products.

The procedures were as follows: 100 g of defatted soybean meal (IA 2020 variety, 1999 harvest, defatted in our pilot plant in January 2000) was treated according to the conditions explained for Treatment #3 (FIG. 1), in addition to this, Treatment #3 was repeated without the chilling step, and from the same flour we produced two controls, a traditional isolated soy protein (FIG. 3), and the modified Nagano procedure (FIG. 2).

Once the products were obtained, they were dried and stored in sealed containers until analyzed. All procedures were replicated in duplicate. Solids and ash contents were determined according to standard methods. Protein was determined by using the Dumas method. Protein composition was measured by using urea-SDS-PAGE according to a method reported by Wu et al. (1999). Isoflavones were analyzed according to the method described by Murphy et al. (1999). Thermal behaviors of these samples were determined by using differential scanning calorimetry (DSC) (Rickert et al., 2004). Solubility was measured according to Dias et al. (2003). Surface hydrophobicity was measured according to methods described by Wu et al. (1999). Emulsification properties were determined according methods described by Rickert et al. 2004. Foaming properties were determined according methods described by Bian et al. (2003). Rheological behavior was determined by using a cone and plate viscometer (Rickert et al., 2004). All measurements were made at least in triplicate.

Statistical analysis was performed with SAS program, LS means, GLM, Analysis of variance and least significant differences (LSD) were determined to analyze the data.

Yields were determined as follows:

Yield %=(mass of a component in the given fraction/total mass of the same component in the initial material)*100. All yields were calculated on a dry weight basis.

TABLE 4

Yields of solids, protein and isoflavones for traditional isolate, modified Nagano's procedure, and the new process

| Process | Product | Yield of Solids (%) | Yield of Protein (%) | Yield of Isoflavones (%) |
|---|---|---|---|---|
| Traditional | Isolate | 40.70 a | 69.71 a | 54.41 a |
| Nagano's | Glycinin | 11.60 e | 24.76 f | 9.60 f |
| | Intermediate | 18.16 c | 26.76 e | 20.91 d |
| | β-Conglycinin | 11.51 e | 18.51 g | 3.28 g |
| New 4C | Glycinin | 15.51 d | 24.41 f | 20.55 d |
| | β-Conglycinin | 23.10 b | 37.16 b | 37.50 b |
| New RT | Glycinin | 15.70 d | 29.92 d | 15.86 e |
| | β-Conglycinin | 23.34 b | 32.41 c | 34.83 c |
| LSD | | 2.18 | 1.92 | 2.59 |

LSD = least significant difference, means followed by different letters in the same column are statistically different.
N = 2.
Nagano's = Treatment # 1 (prior method)
New 4C = Treatment #3 with chilling step.
New RT = Treatment #3 at room temperature.

From the data provided in Table 4, we concluded that our invention yield a similar amount of solids to the traditional isolated soy protein. The new process yielded significantly higher amounts of solids when comparing the sum of yields of the glycinin and β-conglycinin-rich fractions against the similar sum of the control procedure. The control procedure, previous method, yielded a significant amount of solids in the so called "intermediate" fraction. Our process does not produce this lower quality fraction. The new process consistently yielded 62% of the protein originally present in the meal in the valuable fractions, whereas the control procedure only yielded 43%. The yields of isoflavones in our products were also significantly superior to the yields produced by the control procedure. The β-conglycinin-rich fraction yielded ten times more isoflavones using our invention, compared to the prior method; and our glycinin fraction yielded between 1.5 and 2 times more isoflavones compared to the control. Our invention has proven to yield more solids, more protein and more isoflavones compared to the control fractionation procedure (prior method).

TABLE 5

Protein, total isoflavone and ash contents of traditional soy protein isolate, modified Nagano's procedure, and our new processes

| Process | Product | Protein (%) | Total Isoflavones (µg/g) | Ash (%) |
|---|---|---|---|---|
| Traditional Nagano's | Isolate | 91.35 c, d | 2570 c | 4.24 e |
| | Glycinin | 96.68 b | 1591 g | 3.89 f |
| | Intermediate | 80.26 e | 2213 e | 14.27 a |
| | β-Conglycinin | 92.19 c | 548 h | 10.14 b |
| New 4C | Glycinin | 98.89 a | 2547 d | 3.22 g |
| | β-Conglycinin | 90.04 d | 3120 a | 6.05 c |
| New RT | Glycinin | 96.55 b | 1942 f | 2.99 g |
| | β-Conglycinin | 91.19 c, d | 2868 b | 5.30 d |
| LSD | | 1.43 | 192 | 0.24 |

LSD = least significant difference, means followed by different letters in the same column are statistically different.
N = 2.
Nagano's = Treatment # 1 (prior method)
New 4C = Treatment #3 with chilling step.
New RT = Treatment #3 at room temperature.

From the data provided in Table 5 it can be seen that all of our products contained at least 90% protein, the industrial standard for isolated soy protein. The total isoflavone contents were superior compared to the prior method, and the ash contents were significantly lower than the ash contents of the control procedure (prior method).

TABLE 6

Fraction purity for each fraction and treatment

| Process | Product | Lipoxygenase (%) | β-Conglycinin (%) | Glycinin (%) | Others (%) |
|---|---|---|---|---|---|
| Traditional Nagano's | Isolate | 3.92 c, d | 35.91 d | 52.73 b | 7.43 a |
| | Glycinin | 3.58 c, d | 17.31 f | 74.20 a | 4.90 c |
| | Intermediate | 9.24 a | 48.86 c | 41.90 c | 0.00 d |
| | β-Conglycinin | 4.12 c | 80.30 a | 15.57 e | 0.00 d |
| New 4C | Glycinin | 0.00 e | 17.91 f | 76.32 a | 5.77 b |
| | β-Conglycinin | 6.82 b | 82.17 a | 11.01 f | 0.00 d |
| New RT | Glycinin | 0.00 e | 26.85 e | 73.15 a | 0.00 d |
| | β-Conglycinin | 3.53 d | 75.00 b | 21.47 d | 0.00 d |
| LSD | | 0.58 | 2.41 | 3.52 | 0.79 |

LSD = least significant difference, different letters in the same column are statistically different.
N = 2.
Nagano's = Treatment #1 (prior method).
New 4C = Treatment #3 with chilling step.
New RT = Treatment #3 at room temperature.

From the data provided in Table 6, we concluded that the products obtained by our invention had, with a much simpler process, similar purities to the control process (prior method).

TABLE 7

Temperatures and enthalpies of denaturation

| Process | Product | β-Conglycinin Td (° C.) | Glycinin Td (° C.) | β-Conglycinin Enthalpy (mJ/mg) | Glycinin Enthalpy (mJ/mg) | Total Enthalpy (mJ/mg) |
|---|---|---|---|---|---|---|
| Traditional Nagano's | Isolate | 73.4 b, c, | 91.9 a, b | 1.18 d, e | 7.25 c | 8.43 d |
| | Glycinin | 74.7 a, b | 89.1 d | 0.32 e | 15.65 b | 15.97 b |
| | Intermediate | 74.8 a, b | 93.1 a | 1.48 d | 2.91 d | 4.31 f |
| | β-Conglycinin | 75.1 a | 88.9 d | 10.64 a | 0.06 f | 10.70 c |
| New 4C | Glycinin | 73.3 c, b | 91.0 b, c | 0.61 d, e | 19.23 a | 19.84 a |
| | β-Conglycinin | 75.1 a | 89.8 c, d | 6.47 b | 0.55 e, f | 7.01 e |
| New RT | Glycinin | 72.8 c | 91.3 b, c | 0.81 d, e | 19.33 a | 20.15 a |
| | β-Conglycinin | 74.7 a, b | 90.8 b, c$^e$ | 4.96 c | 1.19 e | 6.15 e |
| LSD | | 1.58 | 1.55 | 0.93 | 1.06 | 1.23 |

LSD = least significant difference, means followed by different letters in the same column are statistically different.
N = 2.
Nagano's = Treatment # 1 (prior method).
New 4C = Treatment #3 with chilling step.
New RT = Treatment #3 at room temperature.

From the data provided in Table 7, it can be seen that the glycinin-rich fractions obtained by our process had a significantly higher enthalpies of denaturation, making this protein more functional.

TABLE 8

Solubility and surface hydrophobicity

| Process | Product | Solubility at pH 7 (%) | Surface Hydrophobicity (dimensionless) |
|---|---|---|---|
| Traditional | Isolate | 90.97 a, b | 351.1 a |
| Nagano's | Glycinin | 88.09 b, c | 159.8 c |
|  | Intermediate | 39.70 f | 156.2 c |
|  | β-Conglycinin | 93.79 a | 177.7 c |
| New 4C | Glycinin | 85.16 c | 161.3 c |
|  | β-Conglycinin | 71.76 e | 226.4 b |
| New RT | Glycinin | 79.27 d | 153.4 c |
|  | β-Conglycinin | 80.52 d | 187.1 c |
| LSD |  | 3.90 | 39.2 |

LSD = least significant difference, means followed by different letters in the same column are statistically different.
N = 2.
Nagano's = Treatment #1 (prior method).
New 4C = Treatment #3 with chilling step.
New RT = Treatment #3 at room temperature.

From the data provided in Table 8, it can be seen that the products obtained by our invention had slightly lower solubilities, but still were highly soluble. The surface hydrophobicities of the new products were similar to those of the control.

TABLE 9

Emulsification properties

| Process | Product | Emulsification Capacity (g of oil emulsified/g of product) | Emulsification Activity (absorbance at 500 nm) | Emulsification Stability Index |
|---|---|---|---|---|
| Traditional | Isolate | 583.1 d | 0.283 b | 175.4 a, b |
| Nagano's | Glycinin | 350.7 e | 0.152 d, e | 84.3 c |
|  | Intermediate | 232.0 f | 0.168 d | 62.0 c |
|  | β-Conglycinin | 585.9 d | 0.306 a | 194.0 a |
| New 4C | Glycinin | 876.1 a | 0.140 e | 73.1 c |
|  | β-Conglycinin | 678.2 b | 0.276 b | 192.3 a |
| New RT | Glycinin | 683.7 b | 0.149 d, e | 68.8 c |
|  | β-Conglycinin | 647.0 c | 0.244 c | 151.5 b |
| LSD |  | 30.3 | 0.022 | 32.1 |

LSD = least significant difference, means followed by different letters in the same column are statistically different.
N = 2.
Nagano's = Treatment # 1 (prior method).
New 4C = Treatment #3 with chilling step.
New RT = Treatment #3 at room temperature.

From the data provided in Table 9, it can be seen that the products obtained by our invention had significantly better emulsification properties. In some cases, the improvement was 2.5 times more than those achieved by employing the prior method. This very important functional property is fundamental in food applications such as salad dressings, frozen disserts, and mayonnaise. Since the emulsification activity and stability of these new products were similar to those of the control, but had much superior emulsification capacity, we concluded that the products produced by the new process are superior to the prior method.

TABLE 10

Foaming properties

| Process | Product | Foaming Capacity (mL/mL) | Foaming Stability (k = 1/(mL*min)) | Rate of Foaming (vi = mL/min) |
|---|---|---|---|---|
| Traditional | Isolate | 1.096 c | 0.013 c, d | 11.1 d |
| Nagano's | Glycinin | 0.964 d | 0.089 a | 2.0 f |
|  | Intermediate | 0.958 d | 0.004 d | 17.2 c |
|  | β-Conglycinin | 1.069 c, d | 0.018 c | 12.4 d |
| New 4C | Glycinin | 1.428 b | 0.075 b | 8.4 e |
|  | β-Conglycinin | 1.597 a | 0.008 d | 32.0 b |
| New RT | Glycinin | 1.654 a | 0.068 b | 10.3 d, e |
|  | β-Conglycinin | 1.648 a | 0.007 d | 34.5 a |
| LSD |  | 0.130 | 0.009 | 2.3 |

LSD = least significant difference, means in the same column followed by different letters are statistically different.
N = 2.
Nagano's = Treatment #1 (prior method).
New 4C = Treatment #3 with chilling step.
New RT = Treatment #3 at room temperature.

From the data shown in Table 10, it can be seen that the new products have superior foaming capacities, superior foaming stabilities (the foaming stability as it is expressed in this table, the lower the better), and similar rates of foaming to those achieved by employing prior methods. Foaming capacities were in some cases between 50 and 60% better for our products than for the control (prior method) and the traditional soybean protein isolate.

TABLE 11

Dynamic viscosity behavior

| Process | Product | Consistency Coefficient (k) | Flow Behavior Index (n) |
|---|---|---|---|
| Traditional | Isolate | 0.1507 | 0.7282 |
| Nagano's | Glycinin | N/A | N/A |
|  | Intermediate | N/A | N/A |
|  | β-Conglycinin | N/A | N/A |
| New 4C | Glycinin | 0.0110 | 0.8673 |
|  | β-Conglycinin | 0.5211 | 0.5854 |
| New RT | Glycinin | 0.0103 | 0.9167 |
|  | β-Conglycinin | 0.0700 | 0.7886 |
| LSD |  | N/A | N/A |

N = 2.
Nagano's = Treatment #1 (prior method).
New 4C = Treatment #3 with chilling step.
New RT = Treatment #3 at room temperature.

From the data provided in Table 11, it can be seen that the β-conglycinin-rich fractions were more viscous than the glycinin-rich fractions, and that the traditional isolate gave an intermediate value. We could not compare the new processes to the control (prior method), since the control process did not yield enough sample to test this functional property.

EXAMPLE 2

Starting material: Air-desolventized, hexane-defatted white flakes (IA 2020 variety, 1999 harvest) were produced in the pilot plant of the Center for Crops Utilization Research, Iowa State University. The defatted flakes were milled with a Krups grinder achieving 100% of the material passing through a 50-mesh screen. The protein content of the flour was 57.3% on a dry weight basis, protein PDI (Protein Dispersibility Index) of the flour was 93.8 as determined by Silliker Laboratories (Minnetonka, Minn.).

Soy protein fractionation (Wu procedure, prior method): The soy protein fractionation procedure utilized as the control in this study is one reported by Wu and others (1999) and is a modification of Nagano and others (1992). About 200 g of defatted soy flour was extracted with de-ionized water at 15:1 water-to-flour ratio, the pH was adjusted to 8.5 with 2N NaOH, and the resulting slurry was stirred for 1 hour. After centrifuging at 14,300×g for 30 minutes at 15° C., the protein extract (first extract) was decanted and the amount of insoluble fiber residue was determined and sampled for proximate composition. Sufficient $NaHSO_3$ was added to the resulting protein extract to achieve 10 mM $SO_2$ and the pH was adjusted to 6.4 with 2N HCl. The resulting slurry was stored at 4° C. for 12-16 hour and centrifuged at 7,500×g and 4° C. for 20 minutes. A glycinin-rich fraction was obtained as the precipitated curd. This fraction was redisolved with de-ionized water and adjusted to pH 7 with 2N NaOH, sampled, and stored in sealed containers at −80° C. until freeze-dried. The supernatant, second protein extract, was adjusted to 250 mM NaCl and pH 5 with 2N HCl, and the slurry was stirred for 1 hour. The slurry was then centrifuged at 14,000×g and 4° C. for 30 minutes. An intermediate fraction (a mixture of glycinin and β-conglycinin) was obtained as the precipitated curd; this fraction was treated as previously described. The supernatant, third protein extract, was diluted with de-ionized water in a ratio of two times the volume of the third protein extract, and the pH adjusted was to 4.8. The resulting slurry was centrifuged at 7,500×g and 4° C. for 20 minutes. The β-conglycinin-rich fraction was obtained as the precipitated curd. This fraction was treated as previously described, and the amount of supernatant (whey) was determined and sampled for proximate composition.

Calcium effects on the Wu soy protein fractionation procedure: To show the effects of replacing NaCl with $Ca^{2+}$ salts the overall fractionation scheme was followed was described previously. The second protein extract, starting point for this example, was divided into nine aliquots of ~150 g each. To each of these aliquots we added sufficient $CaSO_4$ or $CaCl_2$ to obtain 5, 10, 20, 50, 100, 200, 500, and 1000 mM $Ca^{2+}$ and the previously described fractionation procedure was carried out. All procedures for both calcium salts were duplicated.

Modified Wu soy protein fractionation procedure: The soy protein fractionation procedure previously described was modified by introducing changes after obtaining the glycinin-rich fraction and starting with the second extract. The second protein extract was divided into nine aliquots of ~150 g each. One aliquot had no salt and the fractionation procedure was followed as described before with the exception that no dilution step was employed to precipitate the β-conglycinin-rich fraction. The other eight aliquots were divided into two groups; $CaCl_2$ was added to obtain concentrations of 5, 10, 20, and 50 mM $Ca^{2+}$ in one group and the fractionation procedure was followed as was previously described with the exception that no dilution step was employed to obtain the β-conglycinin-rich fraction; in the second group $CaCl_2$ was added to obtain concentrations of 5, 10, 20, and 50 mM $Ca^{2+}$ and the pH was adjusted to 6.4 and the slurry was stirred for 1 hour. The slurries were centrifuged at 14,000×g and 4° C. for 30 minutes. An intermediate fraction (mixture of glycinin and β-conglycinin) was obtained as the precipitated curd. The supernatant, third protein extract, was adjusted to pH 4.8 with 2N HCl and without the addition of extra water. The resulting slurry was centrifuged at 7,500×g and 4° C. for 20 minutes. A β-conglycinin-rich fraction was obtained as the precipitated curd. This fraction was treated as previously descried and the amount of supernatant (whey) was determined and sampled for proximate composition. Each treatment was duplicated.

New simplified soy protein fractionation procedure: Based on results obtained by the previously described fractionation method we developed a second soy protein fractionation procedure. About 200 g of defatted soy flour was extracted with de-ionized water at 15:1 water-to-flour ratio, the pH was adjusted to 8.5 with 2N NaOH, and the resulting slurry was stirred for 1 hour. After centrifuging at 14,300×g and 15° C. for 30 minutes, the protein extract (first extract) was decanted and the amount of insoluble fiber residue was determined and sampled for proximate composition. This extract was divided into eight aliquots of about 250 g each. A different treatment was applied to each of these extracts.

One aliquot was treated as described by the traditional modified Nagano process previously described (Wu and others 1999). The second extract was treated with no salts and pH adjusted to 6.4 with 2N HCl. The resulting slurry was stored at 4° C. for 12-16 hours and centrifuged at 14,000×g and 4° C. for 30 minutes. A glycinin-rich fraction was obtained as the precipitated curd and was neutralized and treated as above. The supernatant, second protein extract, was adjusted to pH 4.8 with HCl and the slurry stirred for 1 hour. The slurry was then centrifuged at 14,000×g and 4° C. for 30 minutes. A β-conglycinin-rich fraction was obtained as the precipitated curd. This fraction was treated as was previously described, and the amount of supernatant (whey) was determined and sampled for proximate composition. This process was designated as the 00 control.

The remaining six aliquots were treated as was previously described for the simplified fractionation procedure (00 control) but with the following modifications introduced before adjusting to pH 6.4. A third aliquot was treated with no $NaHSO_3$ and sufficient $CaCl_2$ to obtain 5 mM $Ca^{2+}$; a fourth aliquot was treated with no $NaHSO_3$ and sufficient $CaCl_2$ to obtain 10 mM $Ca^{2+}$. A fifth aliquot was treated with $NaHSO_3$ to achieve 5 mM $SO_2$ and $CaCl_2$ to obtain 5 mM $Ca^{2+}$. A sixth aliquot was treated with sufficient $NaHSO_3$ to achieve 5 mM $SO_2$ and $CaCl_2$ to obtain 10 mM $Ca^{2+}$. A seventh aliquot was treated with sufficient $NaHSO_3$ to achieve 10 mM $SO_2$ and $CaCl_2$ to obtain 5 mM $Ca^{2+}$. An eighth aliquot was treated with sufficient $NaHSO_3$ to achieve 10 mM $SO_2$ concentration and $CaCl_2$ to obtain 10 mM $Ca^{2+}$. All fractions obtained were adjusted to pH 7.0 with 2N NaOH and stored at −80° C. until they were freeze-dried. All treatments were duplicated.

Calcium effects on the Wu soy storage protein fractionation process: The solids yields of the glycinin-rich fraction were 13.1±0.6% and 12.9±0.3% for $CaSO_4$ and $CaCl_2$ examples, respectively, and the total protein yields for this fraction were 23.5±2.1% and 24.8±1.3% for $CaSO_4$ and $CaCl_2$ examples, respectively. The starting point for both examples was the second extract, which had a solids yield of 55.9±2.1% and 56.2±2.8%, and total protein yields of 53.1±1.2% and 53.0±2.0% for $CaSO_4$ and $CaCl_2$ examples, respectively.

TABLE 12

Yields of solids and total protein (%) for the Wu soy protein fractionation procedure replacing NaCl with $CaSO_4$ and $CaCl_2$[a]

| Fraction/ | $CaSO_4$ | | $CaCl_2$ | |
|---|---|---|---|---|
| Treatment | Solids | Protein | Solids | Protein |
| Intermediate | | | | |
| 0 mM $Ca^{2+}$ | 25.9[e] | 41.8[a,b] | 26.7[a,b] | 42.2[b] |
| 5 mM $Ca^{2+}$ | 27.8[e] | 42.4[a] | 23.9[b,c] | 46.6[a] |
| 10 mM $Ca^{2+}$ | 28.5[e] | 42.3[a] | 27.7[a] | 46.0[a,b] |

TABLE 12-continued

Yields of solids and total protein (%) for the Wu soy protein fractionation procedure replacing NaCl with CaSO₄ and CaCl₂[a]

| Fraction/ | CaSO₄ | | CaCl₂ | |
|---|---|---|---|---|
| Treatment | Solids | Protein | Solids | Protein |
| 20 mM Ca²⁺ | 31.9[d,e] | 41.4[a,b] | 24.2[b,c] | 44.6[a,b] |
| 50 mM Ca²⁺ | 32.1[d] | 42.6[a] | 25.0[a,b,c] | 44.8[a,b] |
| 100 mM Ca²⁺ | 35.7[c] | 42.1[a] | 25.1[a,b,c] | 45.3[a,b] |
| 200 mM Ca²⁺ | 37.2[b,c] | 42.3[a] | 23.3[c] | 43.9[a,b] |
| 500 mM Ca²⁺ | 40.2[b] | 40.1[b] | 19.4[d] | 42.7[b] |
| 1000 mM Ca²⁺ | 45.4[a] | 42.7[a] | 15.5[e] | 42.8[b] |
| LSD | 3.6 | 2.0 | 2.9 | 3.5 |
| β-Conglycinin-rich | | | | |
| 0 mM Ca²⁺ | 3.1[a] | 3.3[a] | 4.5[a] | 2.9[a] |
| 5 mM Ca²⁺ | 2.0[b] | 0.3[b] | 1.9[b] | 0.4[b] |
| 10 mM Ca²⁺ | 1.6[b,c] | 0.4[b] | 1.6[b] | 0.4[b] |
| 20 mM Ca²⁺ | 1.1[b,c] | 1.1[b] | 1.4[b] | 0.5[b] |
| 50 mM Ca²⁺ | 1.0[c] | 0.1[b] | 0.9[b] | 0.5[b] |
| 100 mM Ca²⁺ | 0.8[c] | 0.2[b] | 1.1[b] | 0.7[b] |
| 200 mM Ca²⁺ | 0.9[c] | 0.2[b] | 0.7[b] | 0.6[b] |
| 500 mM Ca²⁺ | 1.6[b,c] | 1.2[b] | 1.7[b] | 1.2[b] |
| 1000 mM Ca²⁺ | 1.7[b,c] | 1.1[b] | 2.0[b] | 1.1[b] |
| LSD | 1.0 | 1.1 | 1.4 | 0.9 |
| Whey | | | | |
| 0 mM Ca²⁺ | 29.7[a] | 9.4[b] | 28.1[f] | 9.9[b] |
| 5 mM Ca²⁺ | 27.9[a] | 11.2[b] | 30.7[e] | 10.5[a,b] |
| 10 mM Ca²⁺ | 29.5[a] | 11.1[b] | 31.2[e] | 11.6[a,b] |
| 20 mM Ca²⁺ | 25.1[b] | 11.2[b] | 32.0[d,e] | 11.6[a,b] |
| 50 mM Ca²⁺ | 24.8[b] | 11.2[b] | 31.9[e] | 12.1[a] |
| 100 mM Ca²⁺ | 23.3[b] | 12.0[a,b] | 33.3[d] | 11.9[a] |
| 200 mM Ca²⁺ | 20.9[c] | 11.2[b] | 34.8[c] | 10.5[a,b] |
| 500 mM Ca²⁺ | 17.9[d] | 12.2[a,b] | 39.3[b] | 12.0[a] |
| 1000 mM Ca²⁺ | 13.1[e] | 13.5[a] | 42.6[a] | 11.9[a] |
| LSD | 2.4 | 1.9 | 1.4 | 2.0 |

[a]N = 2.
Means within a column for each fraction followed by different superscripts are significantly different at p < 0.05.
LSD denotes least significant difference at p < 0.05.

Modified Wu soy protein fractionation procedure: To further show how Ca²⁺ can be used as a soy protein-fractionating agent we introduced several changes to the method of Wu and others (1999). Because of its higher solubility, we continued our examples using CaCl₂. Two different pHs were used (5.0 and 6.4) to precipitate the intermediate fraction. We also eliminated the dilution step prior to precipitating the β-conglycinin-rich fraction. As in the previous example the starting point for Ca²⁺ addition was the second extract obtained after the glycinin-rich fraction was precipitated.

TABLE 13

Yields (%) of solids and protein and protein composition (%) of fractions obtained with the modified Wu soy protein fractionation procedure[a].

| Fraction | Flour | First Extract | Glycinin-rich | Second Extract |
|---|---|---|---|---|
| Yields | | | | |
| Solids | 100.0 | 67.6 ± 1.2 | 12.5 ± 0.5 | 56.3 ± 1.8 |
| Protein | 100.0 | 75.0 ± 1.4 | 22.7 ± 0.4 | 52.9 ± 0.9 |
| Storage Protein yield and protein composition | | | | |
| Storage protein | 72.9 ± 0.4 | 77.8 ± 0.6 | 91.8 ± 0.2 | 79.8 ± 1.3 |
| Glycinin | 61.6 ± 0.4 | 57.3 ± 4.2 | 83.5 ± 0.2 | 31.7 ± 1.4 |
| Acidic | 60.1 ± 1.4 | 61.0 ± 0.7 | 52.4 ± 1.6 | 43.2 ± 0.6 |
| Basic | 39.9 ± 1.4 | 39.0 ± 0.7 | 47.6 ± 1.6 | 56.8 ± 0.6 |
| β-Conglycinin | 38.4 ± 0.4 | 42.7 ± 4.2 | 16.5 ± 0.2 | 68.3 ± 1.4 |
| α' | 33.6 ± 1.5 | 30.1 ± 0.3 | 0.0 ± 0.0 | 29.1 ± 1.9 |
| α | 33.5 ± 2.2 | 34.5 ± 1.4 | 48.7 ± 1.0 | 33.6 ± 0.8 |
| β | 32.9 ± 0.7 | 35.4 ± 1.1 | 51.2 ± 1.0 | 37.3 ± 0.7 |

[a]N = 2.
Means ± one standard deviation

TABLE 14

Yields (%) of solids and protein and protein composition (%) of fractions obtained using the modified Wu soy protein fractionation procedure[a]

| Fraction/Treatment | Fraction Yields | | Storage Proteins Yield and Composition | | |
|---|---|---|---|---|---|
| (CaCl₂, pH of int. fr. ppt) | Solids | Protein | Total | β-Conglycinin | Glycinin |
| Intermediate | | | | | |
| 0 mM CaCl₂, pH 5.0 | 25.8[c] | 41.8[c] | 79.5[a,b] | 64.1[c,d] | 35.9[c,d] |
| 5 mM CaCl₂, pH 5.0 | 28.0[a,b,c] | 46.2[a] | 76.7[b] | 61.4[d,e] | 38.6[b,c] |
| 10 mM CaCl₂, pH 5.0 | 28.4[a,b] | 46.0[a] | 76.3[b] | 65.2[b,c] | 34.8[d,e] |
| 20 mM CaCl₂, pH 5.0 | 27.5[a,b,c] | 44.5[a,b] | 75.8[b] | 63.6[c,d] | 36.4[c,d] |
| 50 mM CaCl₂, pH 5.0 | 29.1[a] | 44.0[b] | 77.2[b] | 63.4[c,d] | 36.6[c,d] |
| 5 mM CaCl₂, pH 6.4 | 15.1[e] | 22.8[f] | 82.5[a] | 37.7[f] | 62.3[a] |
| 10 mM CaCl₂, pH 6.4 | 19.3[d] | 28.1[e] | 80.9[a] | 59.5[e] | 40.5[b] |
| 20 mM CaCl₂, pH 6.4 | 26.5[b,c] | 38.6[d] | 81.3[a] | 68.7[a,b] | 31.3[e,f] |
| 50 mM CaCl₂, pH 6.4 | 27.4[a,b,c] | 40.8[c] | 82.2[a] | 70.2[a] | 29.8[f] |
| LSD | 2.3 | 2.0 | 3.3 | 3.7 | 3.7 |
| β-Conglycinin-rich | | | | | |
| 0 mM CaCl₂, pH 5.0 | 3.2[d,e] | 2.9[d] | 82.2[b] | 89.9[b] | 10.1[d] |
| 5 mM CaCl₂, pH 5.0 | 2.2[e,f] | 0.6[f] | 58.8[g] | 72.5[c] | 27.5[c] |
| 10 mM CaCl₂, pH 5.0 | 1.8[e,f] | 0.6[f] | 59.6[g] | 70.1[d] | 29.9[b] |
| 20 mM CaCl₂, pH 5.0 | 1.6[e,f] | 1.6[e,f] | 69.4[f] | 62.7[e] | 37.3[a] |
| 50 mM CaCl₂, pH 5.0 | 1.0[f] | 0.5[f] | 85.1[a] | 89.2[b] | 10.8[d] |
| 5 mM CaCl₂, pH 6.4 | 15.2[a] | 24.7[a] | 75.8[d] | 100.0[a] | 0.0[e] |
| 10 mM CaCl₂, pH 6.4 | 11.1[b] | 18.0[b] | 78.1[c] | 100.0[a] | 0.0[e] |
| 20 mM CaCl₂, pH 6.4 | 5.1[c] | 7.2[c] | 75.1[d,e] | 100.0[a] | 0.0[e] |

TABLE 14-continued

Yields (%) of solids and protein and protein composition (%) of fractions obtained using the modified Wu soy protein fractionation procedure[a]

| Fraction/Treatment | Fraction Yields | | Storage Proteins Yield and Composition | | |
|---|---|---|---|---|---|
| (CaCl$_2$, pH of int. fr. ppt) | Solids | Protein | Total | β-Conglycinin | Glycinin |
| 50 mM CaCl$_2$, pH 6.4 | 4.2[c,d] | 5.5[c] | 73.0[e] | 100.0[a] | 0.0[e] |
| LSD | 1.9 | 2.1 | 2.2 | 1.6 | 1.6 |
| Whey | | | | | |
| 0 mM CaCl$_2$, pH 5.0 | 28.3[c] | 9.2[c] | 60.0[f] | 23.4[b] | 76.6[c] |
| 5 mM CaCl$_2$, pH 5.0 | 30.2[a,b,c] | 10.1[b,c] | 73.1[d] | 11.3[d] | 88.7[a] |
| 10 mM CaCl$_2$, pH 5.0 | 31.1[a,b] | 11.6[a,b] | 74.1[c,d] | 10.4[d] | 89.6[a] |
| 20 mM CaCl$_2$, pH 5.0 | 31.0[a,b] | 12.1[a] | 74.4[c,d] | 11.4[d] | 88.6[a] |
| 50 mM CaCl$_2$, pH 5.0 | 31.1[a,b] | 12.1[a] | 88.4[a] | 19.7[c] | 80.3[b] |
| 5 mM CaCl$_2$, pH 6.4 | 29.1[b,c] | 9.7[c] | 69.5[e] | 10.7[d] | 89.3[a] |
| 10 mM CaCl$_2$, pH 6.4 | 29.4[a,b,c] | 9.4[c] | 69.5[e] | 11.2[d] | 88.8[a] |
| 20 mM CaCl$_2$, pH 6.4 | 31.2[a,b] | 9.8[b,c] | 75.0[c] | 9.0[d] | 91.0[a] |
| 50 mM CaCl$_2$, pH 6.4 | 31.8[a] | 9.9[b,c] | 81.8[b] | 30.4[a] | 69.6[d] |
| LSD | 2.5 | 1.9 | 1.9 | 3.1 | 3.1 |

[a]N = 2.
Means within a column for each fraction followed by different superscripts are significantly different at p < 0.05.
LSD denotes least significant difference at p < 0.05;
int. fr. ppt. denotes intermediate fraction precipitation pH.

TABLE 15

Glycinin and β-conglycinin subunit composition (%) of fractions obtained when using the modified Wu soy protein fractionation procedure[a]

| Fraction/Treatment | β-Conglycinin Subunit Composition | | | Glycinin Subunit Composition | |
|---|---|---|---|---|---|
| (CaCl$_2$; pH of int. fr.ppt) | α' | α | β | Acidic | Basic |
| Intermediate | | | | | |
| 0 mM CaCl$_2$, pH 5.0 | 28.0[d] | 34.8[a] | 37.2[b,c] | 45.9[b,c] | 54.1[c,d] |
| 5 mM CaCl$_2$, pH 5.0 | 29.5[c,d] | 32.8[a,b] | 37.7[b,c] | 50.5[a] | 49.5[e] |
| 10 mM CaCl$_2$, pH 5.0 | 30.2[c,d] | 33.7[a,b] | 36.1[c] | 49.7[a,b] | 50.3[d,e] |
| 20 mM CaCl$_2$, pH 5.0 | 30.6[c,d] | 32.5[b,c] | 36.9[c] | 48.7[a] | 51.3[e] |
| 50 mM CaCl$_2$, pH 5.0 | 29.9[c,d] | 30.7[c] | 39.3[b] | 45.2[c] | 54.8[c] |
| 5 mM CaCl$_2$, pH 6.4 | 32.1[b,c] | 26.2[d] | 41.7[a] | 52.0[a] | 48.0[e] |
| 10 mM CaCl$_2$, pH 6.4 | 33.9[a,b] | 26.8[d] | 39.3[b] | 39.3[d] | 60.7[b] |
| 20 mM CaCl$_2$, pH 6.4 | 34.9[a,b] | 29.6[c] | 35.5[c] | 35.8[d,e] | 64.2[a,b] |
| 50 mM CaCl$_2$, pH 6.4 | 36.0[a] | 27.2[d] | 36.8[c] | 35.3[e] | 64.7[a] |
| LSD | 3.0 | 2.2 | 2.3 | 3.9 | 3.9 |
| β-Conglycinin-rich | | | | | |
| 0 mM CaCl$_2$, pH 5.0 | 19.2[e,f] | 64.3[a] | 16.5[g] | 100.0[a] | 0.0[d] |
| 5 mM CaCl$_2$, pH 5.0 | 20.3[d,e] | 52.6[b] | 27.1[c,d] | 32.9[c] | 67.1[b] |
| 10 mM CaCl$_2$, pH 5.0 | 20.9[d] | 53.2[b] | 25.9[d] | 26.2[d] | 73.8[a] |
| 20 mM CaCl$_2$, pH 5.0 | 18.2[f] | 50.0[c] | 31.8[b] | 45.1[b] | 54.9[c] |
| 50 mM CaCl$_2$, pH 5.0 | 32.1[c] | 42.4[e] | 25.5[d] | 44.8[b] | 55.2[c] |
| 5 mM CaCl$_2$, pH 6.4 | 34.7[b] | 29.1[g] | 36.2[a] | 0.0[e] | 0.0[d] |
| 10 mM CaCl$_2$, pH 6.4 | 37.4[a] | 33.6[f] | 29.0[c] | 0.0[e] | 0.0[d] |
| 20 mM CaCl$_2$, pH 6.4 | 38.7[a] | 34.9[f] | 26.4[d,e] | 0.0[e] | 0.0[d] |
| 50 mM CaCl$_2$, pH 6.4 | 32.3[c] | 48.0[d] | 19.7[f] | 0.0[e] | 0.0[d] |
| LSD | 1.7 | 2.0 | 2.0 | 2.7 | 2.7 |
| Whey | | | | | |
| 0 mM CaCl$_2$, pH 5.0 | 0.0[b] | 0.0[c] | 100.0[a] | 60.8[a] | 39.2[d,e] |
| 5 mM CaCl$_2$, pH 5.0 | 0.0[b] | 0.0[c] | 100.0[a] | 45.5[e] | 54.5[a] |
| 10 mM CaCl$_2$, pH 5.0 | 0.0[b] | 0.0[c] | 100.0[a] | 44.1[e] | 55.9[a] |
| 20 mM CaCl$_2$, pH 5.0 | 0.0[b] | 0.0[c] | 100.0[a] | 54.7[b,c] | 45.3[c,d] |
| 50 mM CaCl$_2$, pH 5.0 | 0.0[b] | 51.6[a] | 48.4[b] | 55.0[a,c] | 45.0[c,d] |
| 5 mM CaCl$_2$, pH 6.4 | 0.0[b] | 0.0[c] | 100.0[a] | 51.3[c,d] | 48.7[b,c] |
| 10 mM CaCl$_2$, pH 6.4 | 0.0[b] | 0.0[c] | 100.0[a] | 51.4[c,d] | 48.6[b,c] |
| 20 mM CaCl$_2$, pH 6.4 | 0.0[b] | 0.0[c] | 100.0[a] | 47.2[d,e] | 52.8[a,b] |
| 50 mM CaCl$_2$, pH 6.4 | 25.8[a] | 45.0[b] | 29.2[c] | 56.0[b] | 44.0[d] |
| LSD | 1.0 | 1.4 | 1.5 | 4.4 | 4.4 |

[a]N = 2.
Means within a column for each fraction followed by different superscripts are significantly different at p < 0.05.
LSD denotes least significant difference at p < 0.05;
int. fr. ppt. denotes intermediate fraction precipitation pH.

New simplified soy storage protein fractionation procedure: We developed a new simplified fractionation method using mM amounts of CaCl$_2$ and sulfites as a reducing agent. The principal advantage of this new procedure is that it does not have an intermediate fraction, which is a mixture glycinin and β-conglycinin.

TABLE 16

Yields of solids and protein (%) and storage protein compositions (%) of fractions obtained when using the new simplified fractionation procedure[a]

| Fraction/Treatment | Fraction Yields | | Storage Proteins Yield and Composition | | |
|---|---|---|---|---|---|
| (SO$_2$ and CaCl$_2$) | Solids | Protein | Total | β-Conglycinin | Glycinin |
| Flour | 100.0 | 100.0 | 73.2 ± 0.2 | 38.1 ± 0.2 | 61.9 ± 0 |
| First extract | 69.9 ± 1.6 | 78.6 ± 2.0 | 78.5 ± 0.2 | 42.8 ± 0.7 | 57.2 ± 0. |

TABLE 16-continued

Yields of solids and protein (%) and storage protein compositions (%) of fractions obtained when using the new simplified fractionation procedure[a]

| Fraction/Treatment (SO$_2$ and CaCl$_2$) | Fraction Yields | | Storage Proteins Yield and Composition | | |
|---|---|---|---|---|---|
| | Solids | Protein | Total | β-Conglycinin | Glycinin |
| Glycinin-rich | | | | | |
| Wu | 13.0[d,e] | 27.8[c] | 86.4[a,b] | 16.2[d] | 83.8[b] |
| Control | 12.1[e] | 21.2[d] | 84.8[b] | 26.0[b] | 74.0[d] |
| 0 mM SO$_2$, 5 mM CaCl$_2$ | 15.1[c,d] | 25.1[c] | 84.5[b] | 26.0[b] | 74.0[d] |
| 0 mM SO$_2$, 10 mM CaCl$_2$ | 28.6[a] | 47.1[a] | 83.8[b] | 35.3[a] | 64.7[e] |
| 5 mM SO$_2$, 5 mM CaCl$_2$ | 15.5[c] | 27.8[c] | 88.1[a] | 14.8[d] | 85.2[b] |
| 5 mM SO$_2$, 10 mM CaCl$_2$ | 18.2[b] | 31.2[b] | 86.6[a,b] | 24.4[b] | 75.6[d] |
| 10 mM SO$_2$, 5 mM CaCl$_2$ | 14.0[c,d,e] | 25.5[c] | 85.5[a,b] | 11.9[e] | 88.1[a] |
| 10 mM SO$_2$, 10 mM CaCl$_2$ | 18.5[b] | 31.9[b] | 84.5[b] | 20.5[c] | 79.5[c] |
| LSD | 2.3 | 3.1 | 2.9 | 1.9 | 1.9 |
| Intermediate | | | | | |
| Wu | 7.8 ± 0.5 | 6.8 ± 0.2 | 77.1 ± 1.5 | 45.7 ± 1.1 | 54.3 ± 1. |
| β-Conglycinin-rich | | | | | |
| Wu | 10.1[e] | 18.5[f] | 85.1[a,b] | 81.9[a] | 18.1[d] |
| Control | 26.6[a] | 48.4[a] | 81.1[c] | 65.9[c] | 34.1[b] |
| 0 mM SO$_2$, 5 mM CaCl$_2$ | 25.5[a,b] | 43.2[b] | 86.8[a] | 58.9[d] | 41.1[a] |
| 0 mM SO$_2$, 10 mM CaCl$_2$ | 13.3[d] | 21.6[e] | 83.5[b] | 64.3[c] | 35.7[b] |
| 5 mM SO$_2$, 5 mM CaCl$_2$ | 23.6[b] | 39.7[c] | 79.8[c] | 80.9[a] | 19.1[d] |
| 5 mM SO$_2$, 10 mM CaCl$_2$ | 21.5[c] | 35.7[d] | 77.6[d] | 80.4[a] | 19.6[d] |
| 10 mM SO$_2$, 5 mM CaCl$_2$ | 24.9[a,b] | 41.2[b,c] | 80.5[c] | 75.3[b] | 24.7[c] |
| 10 mM SO$_2$, 10 mM CaCl$_2$ | 21.2[c] | 34.8[d] | 77.5[d] | 80.3[a] | 19.7[d] |
| LSD | 2.0 | 2.1 | 2.1 | 2.9 | 2.9 |
| Whey | | | | | |
| Wu | 36.9[a] | 12.8[a] | 72.5[b] | 30.9[a] | 69.1[e] |
| Control | 28.2[d] | 9.2[b] | 78.3[a] | 16.0[e] | 84.0[a] |
| 0 mM SO$_2$, 5 mM CaCl$_2$ | 31.2[b,c] | 9.8[b] | 66.9[c] | 24.3[b,c] | 75.7[c,d] |
| 0 mM SO$_2$, 10 mM CaCl$_2$ | 29.9[c,d] | 10.5[a,b] | 62.6[d] | 23.5[b,c,d] | 76.5[b,c] |
| 5 mM SO$_2$, 5 mM CaCl$_2$ | 32.7[b] | 10.5[a,b] | 59.3[e] | 25.8[b] | 74.2[d] |
| 5 mM SO$_2$, 10 mM CaCl$_2$ | 32.0[b,c] | 11.8[a,b] | 61.7[d] | 21.0[d] | 79.0[b] |
| 10 mM SO$_2$, 5 mM CaCl$_2$ | 32.8[b] | 11.6[a,b] | 61.8[d] | 24.0[b,c] | 76.0[c,d] |
| 10 mM SO$_2$, 10 mM CaCl$_2$ | 32.1[b,c] | 11.8[a,b] | 61.8[d] | 22.8[c,d] | 77.2[b,c] |
| LSD | 2.8 | 2.8 | 1.9 | 3.0 | 3.0 |

[a]N = 2.
Means within a column for each fraction followed by different superscripts are significantly different at p < 0.05.
LSD denotes least significant difference at p < 0.05.
LSD denotes least significant difference at p < 0.05;
Wu, Wu process;
Control, 0 mM SO$_2$ and 0 mM CaCl$_2$.

TABLE 17

Glycinin and β-conglycinin subunit compositions (%) of fractions obtained using the new simplified fractionation procedure[a]

| Fraction/Treatment (SO$_2$ and CaCl$_2$) | β-Conglycinin | | | Glycinin | |
|---|---|---|---|---|---|
| | α' | α | β | Acidic | Basic |
| Flour | 33.5 ± 0.3 | 35.0 ± 0.2 | 31.5 ± 0.1 | 58.9 ± 0.3 | 41.1 ± 0.3 |
| First extract | 30.1 ± 0.1 | 34.7 ± 0.3 | 35.2 ± 0.2 | 58.0 ± 1.6 | 42.0 ± 1.6 |
| Glycinin-rich | | | | | |
| Wu | 0.0[d] | 49.3[a] | 50.7[a] | 56.0[d] | 44.0[a] |
| Control | 28.6[a,b] | 32.0[c] | 39.4[d] | 60.3[c,d] | 39.7[a,b] |
| 0 mM SO$_2$, 5 mM CaCl$_2$ | 27.7[b,c] | 32.2[c] | 40.1[d] | 60.8[b,c] | 39.2[b,c] |
| 0 mM SO$_2$, 10 mM CaCl$_2$ | 30.1[a] | 34.7[b] | 35.2[e] | 58.7[c,d] | 41.3[a,b] |
| 5 mM SO$_2$, 5 mM CaCl$_2$ | 28.7[a,b] | 27.3[d] | 44.0[c] | 62.6[b,c] | 37.4[b,c] |
| 5 mM SO$_2$, 10 mM CaCl$_2$ | 29.3[a,b] | 26.6[d,e] | 44.1[c] | 65.0[a,b] | 35.0[c,d] |
| 10 mM SO$_2$, 5 mM CaCl$_2$ | 26.1[c] | 27.7[d] | 46.2[b] | 68.6[a] | 31.4[d] |
| 10 mM SO$_2$, 10 mM CaCl$_2$ | 28.3[a,b] | 25.3[e] | 46.4[b] | 68.3[a] | 31.7[d] |
| LSD | 1.9 | 2.1 | 1.8 | 4.4 | 4.4 |

TABLE 17-continued

Glycinin and β-conglycinin subunit compositions (%) of fractions obtained using the new simplified fractionation procedure[a]

| Fraction/Treatment (SO$_2$ and CaCl$_2$) | β-Conglycinin | | | Glycinin | |
|---|---|---|---|---|---|
| | α' | α | β | Acidic | Basic |
| Intermediate | | | | | |
| Wu | 26.0 ± 1.0 | 32.2 ± 0.8 | 41.8 ± 1.2 | 44.4 ± 0.9 | 55.6 ± 0.9 |
| β-Conglycinin-rich | | | | | |
| Wu | 28.7[d] | 37.1[b] | 34.1[a] | 45.5[c] | 54.5[b] |
| Control | 33.6[a] | 33.8[c] | 32.6[a] | 33.6[d] | 66.4[a] |
| 0 mM SO$_2$, 5 mM CaCl$_2$ | 30.2[c,d] | 39.5[a] | 30.3[b] | 43.5[c] | 56.5[b] |
| 0 mM SO$_2$, 10 mM CaCl$_2$ | 32.5[a,b] | 40.1[a] | 27.4[c] | 41.9[c] | 58.1[b] |
| 5 mM SO$_2$, 5 mM CaCl$_2$ | 30.9[b,c] | 35.8[b] | 33.3[a] | 54.2[a,b] | 45.8[c,d] |
| 5 mM SO$_2$, 10 mM CaCl$_2$ | 29.9[c,d] | 37.5[b] | 32.6[a] | 52.2[b] | 47.8[c] |
| 10 mM SO$_2$, 5 mM CaCl$_2$ | 31.1[b,c] | 35.7[b] | 33.2[a] | 45.0[c] | 55.0[b] |
| 10 mM SO$_2$, 10 mM CaCl$_2$ | 32.4[a,b] | 37.1[b] | 30.5[b] | 57.0[a] | 43.0[d] |
| LSD | 2.0 | 2.0 | 1.9 | 4.8 | 4.8 |
| Whey | | | | | |
| Wu | 0.0[d] | 46.8[a] | 53.2[e] | 57.8[a] | 42.2[d] |
| Control | 0.0[d] | 0.0[b] | 100.0[a] | 49.2[b] | 50.8[c] |
| 0 mM SO$_2$, 5 mM CaCl$_2$ | 45.8[a] | 0.0[b] | 54.2[d,e] | 38.6[d] | 61.4[a] |
| 0 mM SO$_2$, 10 mM CaCl$_2$ | 42.1[b] | 0.0[b] | 57.9[c] | 38.6[d] | 61.4[a] |
| 5 mM SO$_2$, 5 mM CaCl$_2$ | 43.3[b] | 0.0[b] | 56.7[c,d] | 44.2[c] | 55.8[b] |
| 5 mM SO$_2$, 10 mM CaCl$_2$ | 42.8[b] | 0.0[b] | 57.2[c] | 39.9[d] | 60.1[a] |
| 10 mM SO$_2$, 5 mM CaCl$_2$ | 41.3[b] | 0.0[b] | 58.7[b,c] | 39.6[d] | 60.4[a] |
| 10 mM SO$_2$, 10 mM CaCl$_2$ | 38.7[c] | 0.0[b] | 61.3[b] | 37.7[d] | 62.3[a] |
| LSD | 2.1 | 0.4 | 2.6 | 3.3 | 3.3 |

[a]N = 2.
Means within a column for each fraction followed by different superscripts are significantly different at p < 0.05.
LSD denotes least significant difference at p < 0.05;
Wu, Wu process;
Control, 0 mM SO$_2$ and 0 mM CaCl$_2$.

These examples clearly show calcium can be effectively used to fractionate soybean storage proteins. The fractionation process with CaCl$_2$ is highly pH dependent. CaCl$_2$ can be effectively used to precipitate the remaining glycinin from solution in a three steps fraction process when this precipitation is made at pH 6.4. No additional dilution is needed to obtain the β-conglycinin-rich fraction. The addition of sulfites plays an important role in the effectiveness of Ca$^{2+}$ as a fractionating agent. A new procedure was developed, avoiding an intermediate fraction, for a two-step fractionation process that yielded significantly higher amounts of glycinin-rich and β-conglycinin-rich fractions with similar purities to those obtained by previous soy protein fractionation procedures.

EXAMPLE 3

Materials: Samples were prepared from air-desolventized, hexane-defatted white flakes (from IA2020 variety, 1999 harvest) produced in the pilot plant of the Center for Crops Utilization Research, Iowa State University. These flakes had 57.3% protein, and 1922 μg/g total isoflavones as determined in our laboratory and 93.8 protein dispersibility index (PDI) as determined by Silliker Laboratories (Minnetonka, Minn.). The flakes were milled until 100% of the material obtained passed through a 50-mesh screen by using a Krups grinder.

Modified Nagano's (Wu) soy protein fractionation procedure: The soy protein fractionation procedure utilized the same control as is described in the previous example.

New simplified soy protein fractionation procedure: About 100 g of defatted soy flour was extracted with de-ionized water at 15:1 water-to-flour ratio, the pH was adjusted to 8.5 with 2N NaOH, and the resulting slurry was stirred for 1 hour. After centrifuging at 14,300×g and 15° C. for 30 minutes, the protein extract (first extract) was decanted and the amount of insoluble fiber residue was determined and sampled for proximate composition. This extract was combined with sufficient NaHSO$_3$ and CaCl$_2$ to obtain 5 mM SO$_2$ and 5 mM Ca$^{2+}$ and the pH was adjusted to 6.4 with 2N HCl. The resulting slurry was stored at 4° C. for 12-16 hour (this treatment is denoted as New 4C) in one case, and stirred for 1 hour at ~25° C. (this treatment is denoted as New RT) in the other case. In both cases, protein fractionation was continued by centrifuging the slurry at 14,000 kg and 4° C. for 30 minutes. A glycinin-rich fraction was obtained as the precipitated curd; this curd was neutralized and treated as described before. The supernatant, second protein extract, was adjusted to pH 4.8 with HCl and the slurry was stirred for 1 hour. The slurry was centrifuged at 14,000×g and 4° C. for 30 minutes. A β-conglycinin-rich fraction was obtained as the precipitated curd. This fraction was treated as previously described, and the amount of supernatant (whey) was determined and sampled for proximate composition. Both treatments (New 4C and New PT) were replicated in duplicate and means reported.

Protein profile results were calculated as % composition; total storage protein in a given fraction=[(sum of storage protein subunit bands)/(sum of all bands)]×100, fraction purity/composition=[(sum of subunit bands)/(sum of storage protein bands)], and subunit composition of a specific protein=[(subunit band)/(sum of subunits for the specific protein)]. All measurements were replicated at least four times and means were reported.

TABLE 18

Yields and compositions (dry basis) of soy protein fractions prepared by using the Wu and new procedures[a].

| Fraction/Treatment | Solids Yield (%) | Protein Yield (%) | Isoflavone Yield (%) | Protein Content (%) | Ash (%) | Isoflavone Content (µg/g) |
|---|---|---|---|---|---|---|
| Wu glycinin | 11.6[b] | 22.3[c] | 9.6[c] | 96.7[b] | 3.9[a] | 1591[c] |
| N4C glycinin | 15.5[a] | 24.4[b] | 20.5[a] | 98.9[a] | 3.2[b] | 2547[a] |
| NRT glycinin | 15.7[a] | 29.9[a] | 15.9[b] | 96.6[b] | 3.0[c] | 1942[b] |
| LSD | 1.2 | 1.8 | 2.0 | 0.9 | 0.2 | 155 |
| Wu intermediate | 18.2 ± 1.0 | 26.8 ± 1.3 | 20.9 ± 1.2 | 80.3 ± 1.2 | 14.3 ± 0.2 | 2213 ± 130 |
| Wu β-conglycinin | 11.5[b] | 18.5[c] | 3.3[c] | 92.2[a] | 10.1[a] | 548[c] |
| N4C β-conglycinin | 23.1[a] | 37.1[a] | 37.5[a] | 90.0[b] | 6.0[b] | 3120[a] |
| NRT β-conglycinin | 23.3[a] | 32.4[b] | 34.8[b] | 91.2[a] | 5.3[c] | 2868[b] |
| LSD | 2.4 | 1.7 | 2.5 | 1.2 | 0.3 | 184 |
| LSD[b] | 2.2 | 1.9 | 2.6 | 1.4 | 0.2 | 192 |

[a] $N = 2$.
Means within a column for a specific fraction followed by different superscripts are significantly different at $p < 0.05$.
Wu denotes fractions produced with the Wu procedure;
N4C, fractions produced with the new fractionation procedure with a chilling step;
NRT, fractions produced with the new fractionation procedure without a chilling step;
glycinin, glycinin-rich fraction;
β-conglycinin, β-conglycinin-rich fraction; and
LSD, least significant difference at $p < 0.05$.
[b] Least significant difference for comparing all fractions within a column.

TABLE 19

Protein compositions and subunit profiles of the protein fractions prepared by using the Wu and new procedures[a].

| Fraction/Treatment | Storage Protein in Fraction (%) | β-Conglycinin % | Subunit Composition (%) α' | α | β | Glycinin % | Subunit Composition (%) A | B |
|---|---|---|---|---|---|---|---|---|
| Wu glycinin | 89.0[a] | 16.3[b] | 0.0[b] | 49.5[a] | 50.5[a] | 83.7[a] | 54.1[b] | 45.9[a] |
| N4C glycinin | 94.2[a] | 19.0[b] | 26.9[a] | 25.0[c] | 48.1[b] | 81.0[a] | 64.1[a] | 35.9[b] |
| NRT glycinin | 93.8[a] | 28.6[a] | 28.0[a] | 30.7[b] | 41.3[c] | 71.4[b] | 57.1[b] | 42.9[a] |
| LSD | 7.2 | 5.2 | 1.5 | 2.2 | 2.3 | 5.2 | 5.6 | 5.6 |
| Wu intermediate | 79.1 ± 2.0 | 45.3 ± 2.3 | 23.7 ± 1.2 | 31.7 ± 2.1 | 44.6 ± 1.0 | 54.7 ± 2.3 | 46.3 ± 4.0 | 53.7 ± 4.0 |
| Wu β-conglycinin | 85.2[a] | 83.8[b] | 28.7[a] | 36.7[a] | 34.6[a] | 16.2[b] | 43.5[a] | 56.5[c] |
| N4C β-conglycinin | 81.9[b] | 85.6[a] | 27.3[a] | 38.0[a] | 34.7[a] | 14.4[c] | 39.8[b] | 60.2[b] |
| NRT β-conglycinin | 84.3[a] | 78.6[c] | 29.4[a] | 38.5[a] | 32.0[b] | 21.4[a] | 31.9[c] | 68.1[a] |
| LSD | 2.2 | 0.4 | 2.8 | 3.6 | 2.2 | 0.4 | 1.8 | 1.8 |
| LSD[b] | 4.5 | 2.6 | 3.4 | 2.1 | 3.8 | 2.6 | 3.7 | 3.7 |

[a] $N = 2$.
Means within a column for a specific fraction followed by different superscripts are significantly different at $p < 0.05$.
Glycinin, glycinin-rich fraction; β-conglycinin, β-conglycinin-rich fraction;
A, acidic subunits of glycinin;
B, basic subunits of glycinin;
Wu, fractions produced by using the Wu procedure;
N4C, fractions produced by using the new fractionation procedure with a chilling step;
NRT, fractions produced by using the new fractionation procedure without a chilling step; and
LSD, least significant difference at $p < 0.05$.
[b] Least significant difference for comparing all fractions within a column.

TABLE 20

Isoflavone profiles of protein fractions prepared by using the Wu and new procedures[a].

| Fraction/Treatment | Din | MDin | AcDin | Dein | Glyin | MGly | Glyein | Gin | MGin | AcGin | Gein | Total |
|---|---|---|---|---|---|---|---|---|---|---|---|---|
| Flour | 0.73 | 2.18 | 0.05 | 0.13 | 0.22 | 0.25 | 0.00 | 1.01 | 2.44 | 0.08 | 0.10 | 7.20 |
| Wu glycinin | 0.20[a] | 0.73[b] | 0.03[a] | 0.59[b] | 0.13[a] | 0.22[b] | 0.25[a] | 0.66[a] | 1.69[c] | 0.36[a] | 0.96[c] | 5.92[c] |
| N4C glycinin | 0.24[a] | 1.42[b] | 0.05[a] | 0.84[a] | 0.09[b] | 0.17[b] | 0.11[b] | 0.69[a] | 3.99[a] | 0.09[c] | 1.34[a] | 9.52[a] |
| NRT glycinin | 0.22[a] | 1.91[a] | 0.05[a] | 0.60[b] | 0.07[b] | 0.13[c] | 0.08[c] | 0.57[a] | 2.85[b] | 0.17[b] | 1.09[b] | 7.26[b] |
| LSD | 0.08 | 0.10 | 0.13 | 0.02 | 0.03 | 0.01 | 0.01 | 0.19 | 0.05 | 0.02 | 0.10 | 0.28 |
| Wu intermediate | 0.44 | 0.90 | 0.05 | 1.09 | 0.25 | 0.25 | 0.31 | 1.31 | 1.82 | 0.15 | 1.60 | 8.26 |

TABLE 20-continued

Isoflavone profiles of protein fractions prepared by using the Wu and new procedures[a].

| Fraction/Treatment | Isoflavone Profile (μmol/g) | | | | | | | | | | | |
|---|---|---|---|---|---|---|---|---|---|---|---|---|
| | Din | MDin | AcDin | Dein | Glyin | MGly | Glyein | Gin | MGin | AcGin | Gein | Total |
| Wu β-conglycinin | 0.07[b] | 0.20[c] | 0.03[c] | 0.33[c] | 0.05[b] | 0.07[b] | 0.09[b] | 0.17[b] | 0.36[b] | 0.07[b] | 0.58[c] | 2.05[b] |
| N4C β-conglycinin | 0.40[a] | 2.48[a] | 0.05[b] | 1.13[a] | 0.11[a] | 0.22[a] | 0.11[a] | 1.11[a] | 4.20[a] | 0.08[b] | 1.79[a] | 11.68[a] |
| NRT β-conglycinin | 0.42[a] | 2.25[b] | 0.09[a] | 0.88[b] | 0.12[a] | 0.21[a] | 0.09[b] | 1.13[a] | 4.02[a] | 0.18[a] | 1.33[b] | 10.73[a] |
| LSD | 0.06 | 0.21 | 0.01 | 0.19 | 0.01 | 0.01 | 0.02 | 0.26 | 0.58 | 0.04 | 0.38 | 1.39 |
| LSD[b] | 0.15 | 0.13 | 0.07 | 0.10 | 0.06 | 0.02 | 0.02 | 0.37 | 0.30 | 0.02 | 0.19 | 0.82 |

[a]N = 2.
Means within a column followed by different superscripts are significant different at p < 0.05.
Din denotes daidzin;
MDin, malonyldaidzin;
AcDin, acetyldaidzin;
Dein, daidzein;
Gly, glycitin;
MGly, malonylglycitin;
Glyein, glycitein;
Gin, genistin;
MGin, malonylgenistin;
AcGin, acetylgenistin; and
Gein, genistein.
Glycinin denotes glycinin-rich fraction;
β-conglycinin, β-conglycinin-rich fraction;
Wu, fractions produced by using the Wu procedure;
N4C, fractions produced by using the new fractionation procedure with a chilling step;
NRT, fractions produced by using the new fractionation procedure without a chilling step; and
LSD, least significant difference at p < 0.05.
[b]Least significant difference for comparing all fractions within a column.

TABLE 21

Thermal behaviors of protein fractions prepared by using the Wu and new procedures[a].

| Fraction/Treatment | β-Conglycinin Td (° C.) | Glycinin Td (° C.) | β-Conglycinin Enthalpy (mJ/mg) | Glycinin Enthalpy (mJ/mg) | Total Enthalpy (mJ/mg) |
|---|---|---|---|---|---|
| Wu glycinin | 74.7[a] | 89.1[a] | 0.32[a] | 15.65[b] | 15.97[b] |
| N4C glycinin | 73.3[a] | 91.0[b] | 0.61[a] | 19.23[a] | 19.84[a] |
| NRT glycinin | 72.8[a] | 91.3[b] | 0.81[a] | 19.33[a] | 20.15[a] |
| LSD | 2.0 | 2.1 | 0.55 | 2.31 | 1.16 |
| Wu intermediate | 74.8 ± 1.1 | 93.1 ± 0.5 | 1.48 ± 0.37 | 2.91 ± 0.64 | 4.31 ± 0.59 |
| Wu β-conglycinin | 75.1[a] | 88.9[c] | 10.64[a] | 0.06[b] | 10.70[a] |
| N4C β-conglycinin | 75.1[a] | 89.8[b] | 6.47[b] | 0.55[a,b] | 7.01[b] |
| NRT β-conglycinin | 74.7[a] | 90.8[a] | 4.96[c] | 1.19[a] | 6.15[b] |
| LSD | 1.0 | 0.9 | 1.12 | 0.92 | 1.38 |
| LSD[b] | 1.6 | 1.5 | 0.93 | 1.06 | 1.23 |

[a]N = 2.
Means within a column for a specific fraction followed by different superscripts are significantly different at p < 0.05.
Wu denotes fractions produced with the Wu procedure;
N4C, fractions produced with the new fractionation procedure with a chilling step;
NRT, fractions produced with the new fractionation procedure without a chilling step;
glycinin., glycinin-rich fraction;
β-con., β-conglycinin-rich fraction;
Inter., intermediate fraction; and
LSD, least significant difference at p < 0.05.
[b]Least significant difference for comparing all fractions within a column.

TABLE 22

Solubilities and surface hydrophobicities of protein fractions prepared by using the Wu and new procedures[a].

| Fraction/Treatment | Solubility (%) | Surface Hydrophobicity (dimensionless) |
|---|---|---|
| Wu glycinin | 88.1[a] | 160[a] |
| N4C glycinin | 85.2[b] | 161[a] |
| NRT glycinin | 80.5[c] | 153[a] |
| LSD | 2.5 | 39 |
| Wu intermediate | 39.7 ± 2.1 | 156 ± 22 |
| Wu β-conglycinin | 93.8[a] | 178[b] |
| N4C β-conglycinin | 71.8[c] | 226[a] |
| NRT β-conglycinin | 80.5[b] | 187[b] |

TABLE 22-continued

Solubilities and surface hydrophobicities of protein fractions prepared by using the Wu and new procedures[a].

| Fraction/Treatment | Solubility (%) | Surface Hydrophobicity (dimensionless) |
|---|---|---|
| LSD | 5.1 | 35 |
| LSD[b] | 3.9 | 39 |

[a]$N = 2$.
Means within a column for a specific fraction followed by different superscripts are significantly different at $p < 0.05$.
Wu denotes fractions produced with the Wu procedure;
N4C, fractions produced with the new fractionation procedure with a chilling step;
NRT, fractions produced with the new fractionation procedure without a chilling step;
glycinin, glycinin-rich fraction;
β-conglycinin, β-conglycinin-rich fraction; and
LSD, least significant difference at $p < 0.05$.
[b]Least significant difference for comparing all fractions within a column.

TABLE 23

Emulsification properties of protein fractions prepared by using the Wu and new procedures[a].

| Fraction/Treatment | Emulsification Capacity (g of oil emulsified/g of product) | Emulsification Activity (absorbance at 500 nm) | Emulsification Stability Index (dimensionless) |
|---|---|---|---|
| Wu glycinin | 351[c] | 0.152[a] | 84[a] |
| N4C glycinin | 876[a] | 0.140[a] | 73[a] |
| NRT glycinin | 684[b] | 0.149[a] | 68[a] |
| LSD | 28 | 0.015 | 22 |
| Wu intermediate | 232 ± 29 | 0.168 ± 0.026 | 62 ± 26 |
| Wu β-conglycinin | 586[b] | 0.306[a] | 194[a] |
| N4C β-conglycinin | 678[a] | 0.276[a] | 192[a] |
| NRT β-conglycinin | 647[a] | 0.244[c] | 151[b] |
| LSD | 35 | 0.028 | 38 |
| LSD[b] | 30 | 0.022 | 32 |

[a]$N = 2$.
Means within a column for a specific fraction followed by different superscripts are significantly different at $p < 0.05$.
Wu denotes fractions produced with the Wu procedure;
N4C, fractions produced with the new fractionation procedure with a chilling step;
NRT, fractions produced with the new fractionation procedure without a chilling step;
glycinin, glycinin-rich fraction;
β-conglycinin, β-conglycinin-rich fraction; and
LSD, least significant difference at $p < 0.05$.
[b]Least significant difference for comparing all fractions within a column.

TABLE 24

Foaming properties of the protein fractions prepared by using the Wu and new procedures[a].

| Fraction/Treatment | Foaming Capacity (mL/mL) | Foaming Stability (k = 1/(mL * min)) | Rate of Foaming (Vi = mL/min) |
|---|---|---|---|
| Wu glycinin | 0.964[c] | 0.089[c] | 2.0[c] |
| N4C glycinin | 1.428[b] | 0.075[b] | 8.4[b] |
| NRT glycinin | 1.654[a] | 0.068[a] | 10.3[a] |
| LSD | 0.159 | 0.006 | 1.9 |
| Wu intermediate | 0.958 ± 0.059 | 0.004 ± 0.001 | 17.2 ± 3.1 |
| Wu β-conglycinin | 1.069[c] | 0.018[b] | 12.4[c] |
| N4C β-conglycinin | 1.597[b] | 0.008[a] | 32.0[b] |
| NRT β-conglycinin | 1.648[a] | 0.007[a] | 34.5[a] |
| LSD | 0.124 | 0.008 | 2.0 |
| LSD[b] | 0.130 | 0.009 | 2.3 |

[a]$N = 2$.
Means within a column for a specific fraction followed by different superscripts are significantly different at $p < 0.05$.
Wu denotes fractions produced with the Wu procedure;
N4C, fractions produced with the new fractionation procedure with a chilling step;
NRT, fractions produced with the new fractionation procedure without a chilling step;
glycinin, glycinin-rich fraction;
β-conglycinin, β-conglycinin-rich fraction; and
LSD, least significant difference at $p < 0.05$.
[b]Least significant difference for comparing all fractions within a column.

Dynamic viscosity: Dynamic viscosity is characterized by two factors: the flow consistency index (K), which is a measure of how much energy the system is taking up to flow; and the flow behavior index (n), which is a measure of how far the system behaves from an ideal Newtonian fluid.

TABLE 25

Dynamic viscosities of protein fractions prepared by using the Wu and new procedures[a].

| Fraction/Treatment | Flow Consistency Index (K = mPa * s) | Flow Behavior Index (n, dimensionless) |
|---|---|---|
| Wu glycinin | 0.010[a] | 0.925[a] |
| N4C glycinin | 0.011[a] | 0.867[a] |
| NRT glycinin | 0.010[a] | 0.917[a] |
| LSD | 0.008 | 0.079 |
| Wu intermediate | 0.167 ± 0.027 | 0.739 ± 0.051 |
| Wu β-conglycinin | 0.617[a] | 0.471[c] |
| N4C β-conglycinin | 0.521[b] | 0.585[b] |
| NRT β-conglycinin | 0.070[c] | 0.789[a] |
| LSD | 0.082 | 0.058 |
| LSD[b] | 0.049 | 0.067 |

[a]$N = 2$.
Means within a column for a specific fraction followed by different superscripts are significantly different at $p < 0.05$.
Wu denotes fractions produced with the Wu procedure;
N4C, fractions produced with the new fractionation procedure with a chilling step;
NRT, fractions produced with the new fractionation procedure without a chilling step;
glycinin, glycinin-rich fraction;
β-conglycinin, β-conglycinin-rich fraction; and
LSD, least significant difference at $p < 0.05$.
[b]Least significant difference for comparing all fractions within a column.

EXAMPLE 4

Starting materials: Starting material, hexane-defatted HS/LS white flakes were prepared from HS/LS soybeans (Low Stachyose, Lot-980B0001 OPTIMUM, 1999 crop years, Pioneer-DuPont, Johnston, Iowa), in the pilot plant at the Center for Crops Utilization Research. The white flakes were milled with a Krups grinder (Distrito Federal, Mexico) until 100% of the material obtained passed through a 50-mesh screen. The HS/LS defatted soy flour contained 58.3% protein with 95.0 protein dispersibility index.

Wu soybean storage protein fractionation procedure: This procedure was performed as described in Example 3.

New simplified fractionation procedure: This procedure was performed as described in Example 3.

TABLE 26

Yields and compositions (dry basis) of soy protein fractions prepared by using the Wu and new procedures[a].

| Fraction/Treatment | Solids Yield (%) | Protein Yield (%) | Protein Content (%) | Ash (%) |
|---|---|---|---|---|
| Wu glycinin | 15.4[b] | 31.7[a] | 96.4[a] | 4.1[a] |
| N4C glycinin | 18.0[a] | 25.7[b] | 97.3[a] | 3.6[b] |
| NRT glycinin | 14.3[b] | 25.5[b] | 94.7[a] | 3.4[b] |
| LSD | 1.8 | 3.5 | 4.4 | 0.3 |
| Wu intermediate | 8.8 ± 0.3 | 15.9 ± 0.7 | 80.9 ± 0.7 | 14.8 ± 0.1 |
| Wu β-conglycinin | 10.5[c] | 22.3[b] | 95.6[a] | 11.2[a] |
| N4C β-conglycinin | 20.5[b] | 29.3[a] | 92.2[b] | 6.1[b] |
| NRT β-conglycinin | 22.2[a] | 28.7[a] | 92.0[b] | 5.8[b] |
| LSD | 1.1 | 3.3 | 1.4 | 0.5 |
| LSD[b] | 1.1 | 2.4 | 2.3 | 0.3 |

[a]N = 2.
Means within a column for a specific fraction followed by different superscripts are significantly different at p < 0.05.
Wu denotes fractions produced with the Wu procedure;
N4C, fractions produced with the new fractionation process with a chilling step;
NRT, fractions produced with the new fractionation process without a chilling step;
glycinin, glycinin-rich fraction;
β-conglycinin, β-conglycinin-rich fraction; and
LSD, least significant difference at p < 0.05.
[b]Least significant difference for comparison of all fractions within a column.

TABLE 27

Protein compositions and subunit profiles (%) of protein fractions prepared by using the Wu and new procedures[a].

| Fraction/ Treatment | Storage Protein in Fraction (%) | β-Conglycinin % | β-Conglycinin Subunit Composition (%) α' | β-Conglycinin Subunit Composition (%) α | β-Conglycinin Subunit Composition (%) β | Glycinin % | Glycinin Subunit Composition (%) A | Glycinin Subunit Composition (%) B |
|---|---|---|---|---|---|---|---|---|
| Wu glycinin | 100.0[a] | 0.0[c] | 0.0[b] | 0.0[b] | 0.0[b] | 100.0[a] | 63.6[a] | 36.4[c] |
| N4C glycinin | 88.9[b] | 20.0[b] | 29.7[a] | 22.4[a] | 48.0[a] | 80.0[b] | 53.5[c] | 46.5[a] |
| NRT glycinin | 81.5[c] | 26.7[a] | 23.3[b] | 24.2[a] | 52.5[a] | 73.3[c] | 57.2[b] | 42.8[b] |
| LSD | 0.7 | 3.1 | 8.3 | 3.0 | 6.3 | 3.1 | 2.1 | 2.1 |
| Wu intermediate | 69.6 ± 2.3 | 51.0 ± 3.6 | 28.6 ± 1.0 | 28.0 ± 0.9 | 43.4 ± 0.2 | 49.0 ± 3.6 | 45.1 ± 3.3 | 54.9 ± 3.3 |
| Wu β-conglycinin | 100.0[a] | 100.0[a] | 32.7[a] | 38.5[a] | 28.8[a] | 0.0[b] | 0.0[b] | 0.0[b] |
| N4C β-conglycinin | 78.2[c] | 73.1[b] | 29.5[a] | 32.6[a,b] | 37.9[a] | 26.9[a] | 49.5[a] | 50.5[a] |
| NRT β-conglycinin | 81.2[b] | 71.9[b] | 30.9[a] | 28.9[b] | 40.1[a] | 28.1[a] | 46.7[a] | 53.3[a] |
| LSD | 0.3 | 1.5 | 10.7 | 6.4 | 4.7 | 1.5 | 3.4 | 3.4 |
| LSD[b] | 2.1 | 3.6 | 6.7 | 3.5 | 3.8 | 3.6 | 3.6 | 3.6 |

[a]N = 2.
Means within a column for a specific fraction followed by different superscripts are significantly different at p < 0.05.
Wu denotes fractions produced with the Wu procedure;
N4C, fractions produced with the new fractionation process with a chilling step;
NRT, fractions produced with the new fractionation process without a chilling step;
glycinin, glycinin-rich fraction;
β-conglycinin, β-conglycinin-rich fraction;
A, acidic subunits of glycinin;
B, basic subunits of glycinin; and
LSD, least significant difference at p < 0.05.
[b]Least significant difference for comparing all fractions within a column.

TABLE 28

Thermal behaviors of protein fractions prepared by using the Wu and new procedures[a].

| Fraction/Treatment | β-Conglycinin Td (° C.) | Glycinin Td (° C.) | β-Conglycinin Enthalpy (mJ/mg) | Glycinin Enthalpy (mJ/mg) | Total Enthalpy (mJ/mg) |
|---|---|---|---|---|---|
| Wu glycinin | 74.9[a] | 89.5[b] | 0.26[b] | 15.96[b] | 16.21[b] |
| N4C glycinin | 73.8[a,b] | 91.5[a] | 0.51[b] | 18.65[a] | 19.16[a] |
| NRT glycinin | 73.5[b] | 91.3[a] | 1.33[a] | 18.62[a] | 19.96[a] |
| LSD | 1.3 | 1.0 | 0.47 | 1.70 | 2.10 |
| Wu Intermediate | 75.5 ± 0.3 | 93.6 ± 0.2 | 1.06 ± 0.13 | 3.06 ± 0.10 | 4.08 ± 0.09 |
| Wu β-conglycinin | 75.3[a] | 90.0[b] | 10.33[a] | 0.17[c] | 10.47[a] |
| N4C β-conglycinin | 75.8[a] | 89.8[b] | 6.48[b] | 1.03[b] | 7.50[b] |
| NRT β-conglycinin | 75.3[a] | 91.7[a] | 5.35[b] | 1.77[a] | 7.13[b] |

TABLE 28-continued

Thermal behaviors of protein fractions prepared by using the Wu and new procedures[a].

| Fraction/Treatment | β-Conglycinin Td (° C.) | Glycinin Td (° C.) | β-Conglycinin Enthalpy (mJ/mg) | Glycinin Enthalpy (mJ/mg) | Total Enthalpy (mJ/mg) |
|---|---|---|---|---|---|
| LSD | 1.4 | 1.4 | 1.25 | 0.37 | 1.54 |
| LSD[b] | 0.9 | 0.9 | 0.66 | 0.85 | 1.27 |

[a]$N = 2$.
Means within a column for a specific fraction followed by different superscripts are significantly different at $p < 0.05$.
Wu denotes fractions produced with the Wu process;
N4C, fractions produced with the new fractionation process with a chilling step;
NRT, fractions produced with the new fractionation process without a chilling step;
glycinin, glycinin-rich fraction;
β-conglycinin, β-conglycinin-rich fraction;
Intermediate, intermediate fraction;
Td, peak denaturation temperature; and
LSD, least significant difference at $p < 0.05$.
[b]Least significant difference for comparing all fractions within a column.

TABLE 29

Solubilities and surface hydrophobicities of protein fractions prepared by using the Wu and new procedures[a].

| Fraction/Treatment | Solubility (%) | Surface Hydrophobicity (dimensionless) |
|---|---|---|
| Wu glycinin | 88.9[a] | 152[a] |
| N4C glycinin | 92.9[a] | 148[a] |
| NRT glycinin | 93.2[a] | 154[a] |
| LSD | 5.6 | 33 |
| Wu intermediate | 41.6 ± 0.8 | 179 ± 5 |
| Wu β-conglycinin | 92.8[a] | 185[a] |
| N4C β-conglycinin | 75.9[b] | 180[a] |
| NRT β-conglycinin | 70.4[b] | 130[b] |
| LSD | 6.2 | 23 |
| LSD[b] | 4.1 | 20 |

[a]$N = 2$.
Means within a column for a specific fraction followed by different superscripts are significantly different $p < 0.05$.
Wu denotes fractions produced with the Wu process;
N4C, fractions produced with the new fractionation process with a chilling step;
NRT, fractions produced with the new fractionation process without a chilling step;
glycinin, glycinin-rich fraction;
β-conglycinin, β-conglycinin-rich fraction; and
LSD, least significant difference at $p < 0.05$.
[b]Least significant difference for comparing all fractions within a column.

TABLE 30

Emulsification properties of protein fractions prepared by using the Wu and new procedures[a].

| Fraction/Treatment | Emulsification Capacity (g of oil emulsified/ g of product) | Emulsification Activity (absorbance at 500 nm) | Emulsification Stability Index (dimensionless) |
|---|---|---|---|
| Wu glycinin | 307[c] | 0.155[a,b] | 76[b] |
| N4C glycinin | 618[a] | 0.177[a] | 103[a] |
| NRT glycinin | 547[b] | 0.151[b] | 83[a,b] |
| LSD | 62 | 0.026 | 22 |
| Wu intermediate | 219 ± 5 | 0.194 ± 0.012 | 69 ± 6 |
| Wu β-conglycinin | 612[a] | 0.311[a] | 216[a] |
| N4C β-conglycinin | 564[b] | 0.301[a] | 216[a] |
| NRT β-conglycinin | 633[a] | 0.322[a] | 240[a] |
| LSD | 41 | 0.038 | 147 |
| LSD[b] | 36 | 0.025 | 73 |

[a]$N = 2$.
Means within a column for a specific fraction followed by different superscripts are significantly different at $p < 0.05$.
Wu denotes fractions produced with the Wu process;
N4C, fractions produced with the new fractionation process with a chilling step;
NRT, fractions produced with the new fractionation process without a chilling step;
glycinin, glycinin-rich fraction;
β-conglycinin, β-conglycinin-rich fraction; and
LSD, least significant difference at $p < 0.05$.
[b]Least significant difference for comparing all fractions within a column.

TABLE 31

Foaming properties of protein fractions prepared by using the Wu and new procedures[a].

| Fraction/Treatment | Foaming Capacity (mL/mL) | Foaming Stability (k = 1/(mL * min)) | Rate of Foaming (Vi = mL/min) |
|---|---|---|---|
| Wu glycinin | 1.090[c] | 0.092[a] | 2.3[a] |
| N4C glycinin | 1.300[b] | 0.173[b] | 4.4[a] |
| NRT glycinin | 1.514[a] | 0.164[b] | 5.0[a] |
| LSD | 0.083 | 0.035 | 2.9 |
| Wu intermediate | 1.141 ± 0.062 | 0.005 ± 0.001 | 21.9 ± 0.7 |
| Wu β-conglycinin | 1.184[c] | 0.018[a] | 13.7[b] |
| N4C β-conglycinin | 1.396[b] | 0.035[b] | 14.2[b] |
| NRT β-conglycinin | 1.671[a] | 0.012[a] | 30.4[a] |
| LSD | 0.186 | 0.007 | 4.5 |
| LSD[b] | 0.113 | 0.017 | 2.6 |

[a]$N = 2$.
Means within a column for a specific fraction followed by different superscripts are significantly different at $p < 0.05$.
Wu denotes fractions produced with the Wu process;
N4C, fractions produced with the new fractionation process with a chilling step;
NRT, fractions produced with the new fractionation process without a chilling step;
glycinin, glycinin-rich fraction;
β-conglycinin, β-conglycinin-rich fraction; and
LSD, least significant difference at $p < 0.05$.
[b]Least significant difference for comparing all fractions within a column.

EXAMPLE 5

The new fractionation method was used with Gas-Supported Screw Pressed partially defatted soybean cake. The starting cake was grinded in a Krups grinder until 100% of the soybean material passed through a mesh 50. The resulting flour had a protein content of 53.75%, a fat content of 4.6%, both on a dry basis, and a PDI of 54.5 as determined by Silliker Laboratories.

The new fractionation method was performed with this starting material. 100 g of cake was extracted with water at a ratio of 15:1 (treatment # 1) and 10:1 (treatment 2) and the pH of the slurry adjusted to 8.5 as described in previous examples. After centrifugation the respective protein extracts were added with sufficient NaHSO$_3$ and CaCl$_2$ as to obtain a 10 mM concentration of each salt in the extract and the pH was adjusted to 6.4, the resulting slurry centrifuged obtaining a glycinin-rich precipitate and a β-conglycinin-rich extract, which was father adjusted to a pH of 4.6 and centrifuged to obtain a β-conglycinin-rich precipitate. All resulting precipitates were re-dissolved in water and neutralized with dilute alkali to a pH of 7.0.

The resulting yields of solids, protein, protein contents and purities for protein fractions are shown in Table 32.

TABLE 32

Fraction yields and compositions of new fractionation procedures using gass supported screw pressed partially defatted soybean cake.

| Treatment/Fraction | Solids Yield (%) | Protein Yield (%) | Protein Content (%) | Purity[a] (%) |
|---|---|---|---|---|
| Treatment #1 | | | | |
| Glycinin-rich | 14.1 | 25.7 | 97.9 | 87.7 |
| β-conglycinin-rich | 17.5 | 29.1 | 89.3 | 70.4 |
| Total | 31.6 | 54.8 | | |
| Treatment #2 | | | | |
| Glycinin-rich | 13.3 | 24.5 | 98.8 | 91.3 |
| β-conglycinin-rich | 17.7 | 29.5 | 89.6 | 63.4 |
| Total | 31.0 | 54.0 | | |

[a]Purity expressed as % of storage protein present in said fraction

EXAMPLE 6

The potential of the new fractionation procedure using alternative reducing agents, multi-valent salts, EDTA, and pHs is shown in this example. The starting material was hexane-defatted and air desolventized white flakes from soybeans. The flakes were milled to obtain flour that passed through a #50 mesh screen. The protein content of said flour was 56.5%, the fat content 0.7% and had a PDI of 79.33 as determined by Silliker Laboratories.

All processes had the same starting step, the meal was extracted with de-ionized water at flour-to-water ratio of 1:10; the pH was adjusted to 8.5. The resulting slurry was stirred at 25° C., and after 1 hour the slurry was centrifuged at 14,000×g and 25° C. for 30 minutes to separate the spent flour from the protein extract. The resulting protein extract, yielding 65.6% of the protein originally present in the flour, was divided in twelve aliquots.

To each of these aliquots a combination of alternative reducing agents, multi-valent salts, and/or EDTA was added at different concentrations, the resulting pHs of the slurries were adjusted to different extents to obtain the glycinin-rich precipitate, and stirred for 15 minutes. After this initial stirring, all samples were placed overnight in a cold room at 4° C. The next day the extracts were stirred again and centrifuged at 14,000×g and 4° C. for 30 minutes, obtaining a glycinin-rich precipitate and a β-conglycinin-rich supernatant. The supernatant was adjusted to pH 4.6 in all cases and centrifuged again under the same conditions, recovering a β-conglycinin-rich curd, and an extract that we termed whey.

Treatments were as follows:

Treatment #1 New fractionation with addition of 5 mM of SO$_2$ and 5 mM of Ca$^{2+}$. The pH for obtaining the glycinin-rich curd was 6.0.

Treatment #2 New fractionation with addition of 10 mM of SO$_2$ and 10 mM of Ca$^{2+}$. The pH for obtaining the glycinin-rich curd was 6.4.

Treatment #3 New fractionation with addition of 5 mM of SO$_2$ and 5 mM of Mg$^{2+}$. The pH for obtaining the glycinin-rich curd was 6.4.

Treatment #4 New fractionation with addition of 5 mM of SO$_2$ and 5 mM of Mg$^{2+}$. The pH for obtaining the glycinin-rich curd was 5.8.

Treatment #5 New fractionation with addition of 10 mM of SO$_2$ and 10 mM of Mg$^{2+}$. The pH for obtaining the glycinin-rich curd was 6.0.

Treatment #6 New fractionation with addition of 5 mM of SO$_2$ and 5 mM of EDTA. The pH for obtaining the glycinin-rich curd was 5.6.

Treatment #7 New fractionation with addition of 10 mM of SO$_2$ and 10 mM of EDTA. The pH for obtaining the glycinin-rich curd was 5.8.

Treatment #8 New fractionation with addition of 10 mM of SO$_2$ and 10 mM of EDTA. The pH for obtaining the glycinin-rich curd was 5.6.

Treatment #9 New fractionation with addition of 5 mM of ascorbic acid and 5 mM of Ca$^{2+}$. The pH for obtaining the glycinin-rich curd was 6.4.

Treatment #10 New fractionation with addition of 5 mM of ascorbic acid and 5 mM of Ca$^{2+}$. The pH for obtaining the glycinin-rich curd was 5.6.

Treatment #11 New fractionation with addition of 10 mM of ascorbic acid and 10 mM of Ca$^{2+}$. The pH for obtaining the glycinin-rich curd was 6.4.

Treatment #12 New fractionation with addition of 5 mM of L-cystine and 5 mM of Ca$^{2+}$. The pH for obtaining the glycinin-rich curd was 6.4.

The resulting yields of solids, protein, protein contents and purities for protein fractions obtained are shown in Table 33.

TABLE 33

Fraction yields and compositions of new fractionation procedure utilizing alternative reducing agents, multi-valent salts, EDTA and pHs.

| Treatment/Fraction | Solids Yield (%) | Protein Yield (%) | Protein Content (%) | Purity[a] (%) |
|---|---|---|---|---|
| Treatment #1 | | | | |
| Glycinin-rich | 17.8 | 30.3 | 96.1 | 88.9 |
| β-Conglycinin-rich | 16.2 | 26.3 | 91.7 | 71.7 |
| Total | 34.0 | 56.6 | | |
| Treatment #2 | | | | |
| Glycinin-rich | 15.0 | 26.3 | 98.9 | 91.0 |
| β-Conglycinin-rich | 18.1 | 29.4 | 91.7 | 71.9 |
| Total | 33.1 | 55.7 | | |

TABLE 33-continued

Fraction yields and compositions of new fractionation procedure utilizing alternative reducing agents, multi-valent salts, EDTA and pHs.

| Treatment/Fraction | Solids Yield (%) | Protein Yield (%) | Protein Content (%) | Purity[a] (%) |
|---|---|---|---|---|
| Treatment #3 | | | | |
| Glycinin-rich | 13.5 | 23.7 | 99.1 | 85.6 |
| β-Conglycinin-rich | 20.1 | 32.7 | 91.8 | 68.6 |
| Total | 33.6 | 56.4 | | |
| Treatment #4 | | | | |
| Glycinin-rich | 19.6 | 33.5 | 96.6 | 82.2 |
| β-Conglycinin-rich | 16.7 | 26.8 | 90.7 | 73.3 |
| Total | 36.3 | 60.3 | | |
| Treatment #5 | | | | |
| Glycinin-rich | 18.0 | 31.3 | 98.4 | 84.3 |
| β-Conglycinin-rich | 16.1 | 26.8 | 94.2 | 72.4 |
| Total | 34.1 | 58.1 | | |
| Treatment #6 | | | | |
| Glycinin-rich | 19.5 | 33.1 | 96.0 | 83.6 |
| β-Conglycinin-rich | 15.2 | 25.1 | 93.2 | 75.5 |
| Total | 34.7 | 58.2 | | |
| Treatment #7 | | | | |
| Glycinin-rich | 15.5 | 27.0 | 98.3 | 83.3 |
| β-Conglycinin-rich | 16.3 | 27.0 | 93.6 | 69.9 |
| Total | 31.8 | 54.0 | | |
| Treatment #8 | | | | |
| Glycinin-rich | 18.9 | 32.3 | 96.7 | 81.3 |
| β-Conglycinin-rich | 12.9 | 21.1 | 92.6 | 75.8 |
| Total | 31.8 | 53.4 | | |
| Treatment #9 | | | | |
| Glycinin-rich | 13.5 | 23.7 | 99.2 | 88.8 |
| β-Conglycinin-rich | 20.4 | 33.2 | 92.0 | 67.8 |
| Total | 33.9 | 56.9 | | |
| Treatment #10 | | | | |
| Glycinin-rich | 26.3 | 45.3 | 97.3 | 69.1 |
| β-Conglycinin-rich | 7.4 | 12.3 | 94.1 | 70.6 |
| Total | 33.7 | 57.6 | | |
| Treatment #11 | | | | |
| Glycinin-rich | 18.6 | 32.3 | 98.0 | 71.0 |
| β-Conglycinin-rich | 14.4 | 24.3 | 95.5 | 68.7 |
| Total | 33.0 | 56.6 | | |
| Treatment #12 | | | | |
| Glycinin-rich | 13.8 | 23.7 | 97.0 | 88.8 |
| β-Conglycinin-rich | 20.3 | 32.7 | 90.9 | 60.5 |
| Total | 34.1 | 56.4 | | |

[a]Purity expressed as % of storage protein present in said fraction

EXAMPLE 7

Another alternative new fractionation procedure of this embodiment is to produce a glycinin-rich flour and a β-conglycinin-rich supernatant by scalping the majority of the β-conglycinin while leaving the majority of the glycinin with the fiber residue. The starting material for this example was hexane-defatted and air-desolventized white flakes from soybeans. The flakes were milled to obtain a flour that passed through a #50 mesh. The protein content of said flour was 56.5%, the fat content 0.7% and the resulting flour had a PDI of 79.33 as determined by Silliker Laboratories.

All processes in this example had the same starting step, the flour was first added to de-ionized water at flour-to-water ratio of 1:10; the resulting slurry was stirred for 30 minutes without pH adjustment; then sufficient NaHSO$_3$ and CaCl$_2$ was added to obtain 10 mM concentration of each salt and the pH was adjusted to specific values described as follows:

Treatment #1 pH 6.4.
Treatment #2 pH 6.2.
Treatment #3 pH 6.0.
Treatment #4 pH 5.8.
Treatment #5 pH 5.6.
Treatment #6 pH 5.4.

The resulting flour slurry was stirred at 25° C., and after 1 hour the slurry was centrifuged at 14,000×g and 25° C. for 30 minutes to separate the glycinin-rich flour from the protein extract. The products of these processes were a glycinin-rich flour and a β-conglycinin-rich extract as described in FIG. 13. The resulting yields of solids and protein, protein contents and protein purities for protein fractions obtained are shown in Table 34.

TABLE 34

Fraction yields and compositions of alternative fractionation when scalping β-conglycinin

| Treatment/Fraction | Solids Yield (%) | Protein Yield (%) | Protein Content (%) | Purity[a] (%) |
|---|---|---|---|---|
| Treatment #1 | | | | |
| Glycinin-rich | 52.0 | 57.0 | 61.4 | 68.6 |
| β-Conglycinin-rich | 48.0 | 43.0 | 50.6 | 70.0 |
| Treatment #2 | | | | |
| Glycinin-rich | 54.2 | 61.9 | 64.0 | 67.5 |
| β-Conglycinin-rich | 45.8 | 38.1 | 47.0 | 71.5 |
| Treatment #3 | | | | |
| Glycinin-rich | 57.8 | 68.0 | 65.9 | 66.8 |
| β-Conglycinin-rich | 42.2 | 32.0 | 42.8 | 72.5 |
| Treatment #4 | | | | |
| Glycinin-rich | 59.6 | 68.2 | 64.1 | 65.9 |
| β-Conglycinin-rich | 40.4 | 31.8 | 44.5 | 74.5 |
| Treatment #5 | | | | |
| Glycinin-rich | 64.5 | 79.9 | 69.4 | 60.1 |
| β-Conglycinin-rich | 35.5 | 20.1 | 32.0 | 84.0 |
| Treatment #6 | | | | |
| Glycinin-rich | 67.2 | 80.0 | 66.7 | 61.5 |
| β-Conglycinin-rich | 32.8 | 20.0 | 34.5 | 86.1 |

[a]Purity expressed as % of storage protein present in said fraction.

As an alternative to the above treatments, the processes were repeated with the following changes. The flour was first added to de-ionized water at 1:10 flour-to-water ratio; sufficient alkali was added to obtain pH 8.5 and stirred for 30 minutes at 25° C.; after sufficient NaHSO$_3$ and CaCl$_2$ were added to obtain 10 mM concentrations of each salt and the pH adjusted to a specific value described as follows:

Treatment #7 pH 6.4.
Treatment #8 pH 6.2.
Treatment #9 pH 6.0.
Treatment #10 pH 5.8.
Treatment #11 pH 5.6.
Treatment #12 pH 5.4.

The resulting flour slurry was stirred at 25° C., and after 1 hour the slurry was centrifuged at 14,000×g and 25° C. for 30 minutes to separate the glycinin-rich flour from the protein extract. The products of these processes were a glycinin-rich and fiber-rich product and a β-conglycinin-rich extract as described in FIG. 13. The resulting yields of solids and protein, protein contents and protein purities for the protein fractions obtained are shown in Table 35.

TABLE 35

Fraction yields and compositions of alternative fractionation when scalping β-conglycinin

| Treatment/Fraction | Solids Yield (%) | Protein Yield (%) | Protein Content (%) | Purity[a] (%) |
|---|---|---|---|---|
| Treatment #7 | | | | |
| Glycinin-rich | 49.5 | 53.2 | 60.1 | 65.4 |
| β-Conglycinin-rich | 50.5 | 46.8 | 52.4 | 60.7 |
| Treatment #8 | | | | |
| Glycinin-rich | 53.9 | 61.5 | 63.7 | 64.8 |
| β-Conglycinin-rich | 46.1 | 38.5 | 47.2 | 62.0 |
| Treatment #9 | | | | |
| Glycinin-rich | 55.5 | 64.1 | 64.4 | 63.5 |
| β-Conglycinin-rich | 44.5 | 35.9 | 45.6 | 63.4 |
| Treatment #10 | | | | |
| Glycinin-rich | 60.8 | 68.2 | 62.7 | 59.1 |
| β-Conglycinin-rich | 39.2 | 31.8 | 45.8 | 72.1 |
| Treatment #11 | | | | |
| Glycinin-rich | 64.3 | 75.3 | 65.4 | 58.5 |
| β-Conglycinin-rich | 35.7 | 24.7 | 39.1 | 74.3 |
| Treatment #12 | | | | |
| Glycinin-rich | 67.6 | 77.7 | 64.2 | 54.4 |
| β-nglycinin-rich | 32.4 | 22.3 | 38.9 | 75.6 |

[a]Purity expressed as % of storage protein present in said fraction

EXAMPLE 8

The new fractionation procedure can use full-fat soyflour. The starting material for this example was dehulled full-fat soybeans. Soybeans were milled to obtain a flour that passed through a #50 mesh screen. The protein content of said flour was 42.6% and the fat content 24.5% on a dry weight basis.

The flour was extracted with de-ionized water at 1:10 flour-to-water ratio and the pH was adjusted to 9.0. The resulting slurry was stirred at 25° C., and after 1 hour the slurry was centrifuged at 14,000×g and 25° C. for 30 minutes to separate the spent flour from the protein extract. The resulting protein extract, yielded 61.3% of the protein originally present in the flour.

To the resulting extract sufficient $NaHSO_3$ and $CaCl_2$ was added to obtain concentrations of 5 mM of each salt in said extract and the pH of the resulting slurry was adjusted to 6.0 to obtain the glycinin-rich precipitate and stirred for 15 minutes. After this initial stirring, the slurry was placed overnight in a cold room at 4° C. The next day the slurry was stirred again and centrifuged at 14,000×g and 4° C. for 30 minutes to obtain a glycinin-rich precipitate and a β-conglycinin-rich supernatant. The supernatant was adjusted to pH 4.6 and centrifuged again under the same conditions, recovering a β-conglycinin-rich curd, and an extract that we termed whey.

The resulting glycinin-rich precipitate yielded 16.0% of the solids and 31.8% of the protein originally present in the starting flour. This fraction contained 84.7% of the protein of which 61.5% was glycinin expressed as percentage of total storage protein present in said fraction. The resulting β-conglycinin-rich precipitate yielded 6.5% of the solids and 14.1% of the protein originally present in the starting flour. This fraction contained 92.5% of the protein of which 75.8% was β-conglycinin expressed as percentage of total storage proteins present in said fraction.

What is claimed is:

1. A method for obtaining a β-conglycinin-rich isolated protein fraction and a glycinin-rich isolated protein fraction from a vegetable protein source comprising:
   obtaining a defatted vegetable protein source;
   extracting said source with a dilute alkali with a pH of approximately 7 to approximately 11 to form a mixture of the proteins present in said vegetable source;
   obtaining a supernatant protein extract from said mixture, by adding a combination of a source of calcium to achieve an amount of from about 5 mM to about 10 mM calcium ions, and a reducing agent of sulfur dioxide to achieve an amount of sulfur dioxide of from about 5 mM to about 10 mM to form a slurry, wherein said combination of calcium and sulfur dioxide fractionating agents eliminate and intermediate fraction; and
   adjusting the pH of said slurry to a pH of approximately 7 to approximately 5 to obtain a precipitate which is enriched in glycinin and a supernatant which is enriched in β-conglycinin as compared to percentages of each protein in the original mixture.

2. The method of claim 1 further comprising the step of adjusting the pH of said β-conglycinin-enriched supernatant to a pH of between about 4 and about 6 to obtain a β-conglycinin-rich precipitate and a supernatant that is rich in lipoxygenase and trypsin inhibitors.

3. The method of claim 1 wherein said vegetable protein source is soybeans.

4. The method of claim 1 further comprising the step of:
   re-dissolving said glycinin-rich and β-eonglycinin-rich precipitates, respectively, by neutralizing said precipitates with dilute alkali to obtain a neutralized β-conglycinin-rich protein slurry and/or a neutralized glycinin-rich slurry.

5. The method of claim 1 wherein said vegetable protein source is a normal or naturally occurring soybean variety or varieties.

6. The method of claim 1 wherein said vegetable protein source are modified soybeans obtained through traditional breeding methods and/or genetic manipulation.

7. The method of claim 1 wherein said vegetable protein source is high-sucrose/low-stachyose soybeans.

8. The method of claim 1 wherein said defatted vegetable source is obtained through organic solvent or supercritical $CO_2$ extraction of the fat from a soybean matrix.

9. The method of claim 1 wherein said defatted vegetable source is obtained through aqueous processing or enzyme-assisted aqueous processing.

10. The method of claim 1 wherein said defatted vegetable source is obtained through screw pressing and/or Gas-Supported Screw Pressing (GSSP) and/or other mechanically oil extraction method, such as extruding-expelling, that produces a defatted vegetable source and further comprising the steps of:
   extracting said source with a dilute alkali of pH of about approximately 7 to approximately 11 to form a mixture of proteins present in said vegetable source;
   obtaining a supernatant oil-rich "cream" fraction and a supernatant protein extract from said mixture; and
   subjecting said protein extract to fractional precipitation as described in claim 1.

11. The method of claim 10 further comprising the step of jet cooking or any other thermal processing said cream fraction and subsequently homogenizing and/or drying said cream to obtain a dried high-oil/high-protein product.

12. A method for obtaining a β-conglycinin-rich isolated protein fraction and a glycinin-rich isolated protein fraction from a vegetable protein source consisting of:
  obtaining a full-fat vegetable protein source;
  extracting said source with a dilute alkali of pH of about approximately 7 to approximately 11 to form a mixture of proteins present in said vegetable source;
  obtaining a supernatant protein extract from said mixture,
  subjecting said supernatant to fractional precipitation with a combination of a multi-valent salt selected from the group consisting of calcium or EDTA, wherein said salt is added in an amount sufficient to achieve from about 5 mM to about 10 mM of ions, and a reducing agent of sulfur dioxide to form a slurry, wherein said combination of the multi-valent salt and sulfur dioxide fractionating agents eliminate an intermediate fraction; and
  adjusting the pH of said slurry to a pH of approximately 7 to approximately 5 to obtain precipitate, which is enriched in glycinin, and a supernatant, which is enriched in β-conglycinin, as compared to the percentages of each protein in the original mixture.

13. The method of claim 12 further comprising the step of drying said β-conglycinin-rich soy milk to create a β-conglycinin-rich soy milk powder.

14. A method for producing fractionated soy protein isolates with enriched levels of isoflavones comprising:
  obtaining a defatted vegetable protein source;
  extracting said source with a dilute alkali of pH of about approximately 7 to approximately 11 to form a mixture of proteins present in said vegetable source;
  obtaining a supernatant protein, extract from said mixture,
  subjecting said supernatant to fractional precipitation at a pH of approximately 7 to approximately 5 with a combination of a multi-valent calcium salt, and a sulfur dioxide reducing agent to form a slurry, wherein said combination of calcium salt and sulfur dioxide fractionating agents eliminate and intermediate fraction; thereby obtaining a precipitate which is enriched in glycinin and a supernatant which is enriched in β-conglycinin as compared to percentage protein the original mixture without the need for any further dilution or salting steps.

15. The method of claim 1 wherein said calcium source is calcium chloride.

16. The method of claim 1 wherein said sulfur dioxide source is $NaHSO_3$.

17. The method of claim 12 wherein said calcium source is calcium chloride.

18. The method of claim 12 wherein said reducing agent is sulfur dioxide.

19. The method of claim 12 wherein said sulfur dioxide is added in an amount sufficient to achieve a concentration of sulfur dioxide of from about 5 mM to about 10 mM.

20. The method of claim 14 wherein said calcium source is calcium chloride.

21. The method of claim 14 wherein said calcium chloride is added in an amount sufficient to achieve a concentration of calcium ions of from about 5 mM to about 10 mM.

22. The method of claim 14 wherein said sulfur dioxide source is $NaHSO_3$.

23. The method of claim 14 wherein said $NaHSO_3$ is added in an amount sufficient to achieve a concentration of from about 5 mM to about 10 mM of sulfur dioxide.

* * * * *